(12) United States Patent
Mages et al.

(10) Patent No.: US 6,185,306 B1
(45) Date of Patent: Feb. 6, 2001

(54) METHOD OF SECURE SERVER CONTROL OF LOCAL MEDIA VIA A TRIGGER THROUGH A NETWORK FOR LOCAL ACCESS OF ENCRYPTED DATA ON AN INTERNET WEBPAGE

(75) Inventors: Kenneth G. Mages, Highland Park; Jie Feng, Evanston, both of IL (US)

(73) Assignee: HyperLOCK Technologies, Inc., Skokie, IL (US)

( * ) Notice: Under 35 U.S.C. 154(b), the term of this patent shall be extended for 0 days.

(21) Appl. No.: 08/872,082

(22) Filed: Jun. 10, 1997

Related U.S. Application Data

(63) Continuation-in-part of application No. 08/792,092, filed on Jan. 31, 1997, now Pat. No. 5,937,164, which is a continuation-in-part of application No. 08/568,631, filed on Dec. 7, 1995, now abandoned, and a continuation-in-part of application No. 08/756,162, filed on Nov. 25, 1996, now Pat. No. 5,892,825.

(51) Int. Cl.[7] .................................................. A04L 9/00
(52) U.S. Cl. ............................................................ 380/203
(58) Field of Search ................................ 380/4, 5, 203

(56) References Cited

U.S. PATENT DOCUMENTS

| | | | |
|---|---|---|---|
| 4,930,158 | 5/1990 | Vogel | 380/5 |
| 5,319,705 | 6/1994 | Halter et al. | 380/4 |
| 5,457,746 | 10/1995 | Dolphin | 380/4 |
| 5,555,303 | 9/1996 | Stambler | 380/4 |
| 5,576,843 | 11/1996 | Cookson et al. | |
| 5,892,825 | * 4/1999 | Mages et al. | 380/5 |
| 5,937,164 | * 8/1999 | Mages et al. | 380/4 |

FOREIGN PATENT DOCUMENTS

| | | |
|---|---|---|
| 0665486 | 8/1995 | (EP) . |
| 0673034 | 9/1995 | (EP) . |
| 0715247 | 6/1996 | (EP) . |
| 0717338 | 6/1996 | (EP) . |
| 0768601 | 10/1996 | (EP) . |
| 34334 | 10/1996 | (JP) . |

\* cited by examiner

*Primary Examiner*—Salvatore Cangialosi
(74) *Attorney, Agent, or Firm*—Hamman & Benn

(57) ABSTRACT

A method of transmitting protected video and/or graphic data over the Internet from a Web site, by encrypting the video and/or graphic data and storing it at a Web site associated with a server, and by encrypting a video player and storing it at the Web site. Both are then downloaded to a requesting computer via the Internet or Intranet. The requesting computer decrypts the video and/or graphic data and video player via a previously supplied decryption key, so that the video may be played back by the decrypted player.

8 Claims, 10 Drawing Sheets

METHOD OF SECURE SERVER CONTROL OF LOCAL MEDIA VIA A TRIGGER THROUGH A NETWORK FOR LOCAL ACCESS OF ENCRYPTED DATA ON AN INTERNET WEBPAGE

CROSS REFERENCE TO RELATED APPLICATION

The present application is a continuation-in-part of application Ser. No. 08/792,092, filed on Jan. 31, 1997, now U.S. Pat. No. 5,937,164 which is a continuation-in-part of application Ser. No. 08/568,631, filed on Dec. 7, 1995 now abandoned, and a continuation-in-part of application Ser. No. 08/756,162, filed on Nov. 25, 1996, now U.S. Pat. No. 5,892,825.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a method of transmitting "triggering data" over a network to cause video and/or audio information data on a Internet Web Page.

The Internet is a conglomeration of computer networks that are linked together. Each network of the Internet may have one or more servers, and an operating system that may be different from that of others in the Internet. To link one network to another, and in order to overcome these operating differences between computer networks, the Internet system utilizes hardware and software devices called: bridges, routers, and gateways, all of which adapt the information being sent on one network to the operating and protocol requirements of the receiving network. For example, a gateway will connect, or "splice" a network operating on the Novell protocol to a network that operates on a DECnet or SNA protocol.

There are currently more than 10,000 computer networks that are linked together, worldwide, which together constitute the "Internet". Because they do not all operate on the same operating system, and because of different protocols, the data sent from one host computer of one network to a receiving computer of another network—which may be many thousands of miles away from the host computer—may take a relatively long time, since the gateways, bridges and routers must conform or adapt the protocol of the sending host computer to the receiving computer's protocol.

In addition to the time-delays associated with protocol variances, the Internet when connecting to an end-user via Plain Old Telephone Service (POTS), has a maximum data-transmission capacity of 3.6 kbytes per second, which is not enough for sending video images in real time.

The Internet system utilizes two types of file-transfer protocols (FTP) for copying a file from a host computer to the receiving computer: ASCII and binary. An ASCII file is a text file, while every other kind of file is binary. ASCII files are transmitted in seven-digit ASCII codes, while the binary files are transmitted in binary code. Because all data stored in computer memory is stored in binary format, when one sends a file in the Internet, it is sent in binary format. However, as discussed above, owing to the data-transmission constraints imposed by the Internet system because of the differing operating systems, and a multitude of gateways, routers, and bridges, the file data must be sent out in packets of a size no greater than 1536 bytes.

Since the size of just a thirty-second video may be as great as 2.5 megabytes, it may take up to one-half hour or more to send a thirty-second video over the Internet from a host computer to a receiving computer. Presently, there are compression techniques that compress the files in order to reduce this playback-time, which data is decompressed at the receiving computer. An example of such a system is VDOLive, manufactured by VDOnet Corp. of Santa Clara, Calif. However, these compression-systems still send the data in binary format, requiring packet-data sizes of no greater than 1536 bytes. Thus, even with these compression-systems, the length of time to receive a thirty-second video over the Internet after being buffered in the user's computer is near real time, but is unstable, choppy and drops as much as 96% of the video data over a conventional phone line.

In the Internet, there is an electronic-mail delivery system called E-mail. The E-mail system utilizes addresses to direct a message to the recipient, with each address having a mailbox code and a daemon, with the mail box and daemon being separated by the symbol @. In the E-mail delivery system, all of the messages or "mail" are routed through selected routers and gateways, until it reaches what may be called a "post office" that services the recipient to whom the electronic mail is to be delivered. The "post office" is a local server. The need for these local "post offices" is because there is every reason to assume that the recipient-computer, to which the mail is being sent, is either not powered up, or is performing a different task. Since most computers in the Internet are not multi-tasking machines, such as, for example, computers running on the DOS operating system, if such a computer be engaged in performing a task, it is not possible for it to receive the E-mail data at that time. Thus, the local "post office" or server stores the message until such a time as it may be delivered to the end-user to whom it is intended.

In the E-mail system, there has really been only one format standard for Internet messages. A variation has been the MIME version, which stands for Multipurpose Internet Mail Extensions, which defines a new header-field, which is intended for use to send non-text messages, such as multi-media messages that might include audio or images, by encoding the binary into seven-digit ASCII code. Before MIME, the limitation of E-mail systems was the fact that it would limit the contents of electronic mail messages to relatively short lines of seven-bit ASCII. This has forced users to convert any non-textual data that they may wish to send into seven-bit bytes representable as printable ASCII characters before invoking a local mail UA (User Agent, a program with which human users send and receive mail). Examples of such encodings currently used in the Internet include pure hexadecimal, uuencoded, the 3-in-4 base 64 scheme specified in RFC 1421, the Andrew Toolkit Representation [ATK], and many others. Even though a user's UA may not have the capability of dealing with the non-textual body part, the user might have some mechanism external to the UA that can extract useful information from the body part. Moreover, it does not allow for the fact that the message may eventually be gatewayed back into an X.400 message handling system (i.e., the X.400 message is "tunneled" through Internet mail), where the non-textual information would definitely become useful again. With MIME, video and/or audio data may be sent using the E-mail system. MIME uses a number of header-fields, such as "Content-Type" header field, which can be used to specify the type and subtype of data in the body of a message and to fully specify the native representation (encoding) of such data; "text" Content-Type value header field, which an be used to represent textual information in a number of character sets and formatted text description languages in a standardized manner; "multi-part" Content-Type value, which can be used to combine several body parts, possibly of differing types of data, into a single message; "application" Content-Type value, which can be used to transmit application data or binary data, and hence, among other users, to implement an electronic mail file transfer service; "message" Content-Type value, for encapsulating another mail message; "image" Content-Type value, for transmitting still image (picture) data; "audio" Content-Type value, for transmiting audio or voice data; "video" Content-Type value, for transmitting video or moving image data, possibly with audio as part of the composite video data format; "Content-Transfer-Encoding" header field, which can be used to specify an auxiliary encoding that was applied to the data in order to allow it to pass through mail transport mechanisms which may have data or character set limitations. Two additional header fields may be used to further describe the data in a message body: The "Content-ID" and "Content Description" header fields.

However, there are considerable drawbacks and deficiencies in transmitting video images and/or audio data over the Internet using E-mail's MIME. Firstly, there is often considerable time delays, such that it may take up to ten or more minutes to send a thirty-second video clip over the E-mail system. In times of high-traffic usage, the delay may even be more than ten minutes. Secondly, the video image or audio data cannot be viewed or listened to by the end-user, or recipient, until all of the data of the entire video or audio file has been received by the receiving computer, which, also, adds a considerable time lag to the actual viewing or listening. Thirdly, the end-user or recipient computer must have the necessary E-mail and MIME software for decoding the data. Fourthly, since MIME is an E-mail protocol system, the data is transmitted via the E-mail system, meaning that it is routed through one or more post offices and servers, which delay the transmission of the data, and which require that no other task be performed by the receiving computer if it is a single-tasking machine, like DOS-operating system machines. Fifthly, like all E-mail deliveries, the requisite E-mail software at the recipient computer must decode the encoded data received, and then cut-and-paste the data into a new file, such as NOTEPAD, which is time-consuming, before the new file is played back by a viewer or player.

SUMMARY OF THE INVENTION

It is the primary objective of the present invention to separate keys and data by providing a picture contained in a file or files on a Web Page accessible over the internet or intranet, having its informational data of picture, video and/or audio that is crippled, which data may only be read after it has been "uncrippled" by receiving "uncrippling" triggering data over the Internet from the end user's computer. This "key" has been provided by the Web Page via a data download after the end user has met certain requirements set by the party controling the Web Page. The company's host computer serving the Internet may transmit the "uncrippling" data over the Internet to an end-user's receiving computer in order to uncripple and, thereby, actuate the crippled file contained on or accessible through the Web Page, so that the data thereon may be read by the end-user's receiving computer only in volatile memory such as RAM.

It is another objective of the present invention to enable server control of the access to its files by providing the end user the key to the "crippled" files accessable via the Web Page such that content by a company on the Internet may be better controlled, and whereby in conjunction with the content, video and/or audio playback may be combined with any updated, textual information, such as current price of a product or products, location of a store or stores in the vicinity of the end-user's residence, etc. Specific tracks on the CD-ROM can thereby be controlled by the remote server.

It is another objective of the present invention to provide access to such "crippled" files, whereby the end user computer is provided with Internet start-up and connecting program that automatically and directly connects the end-user's computer to the company's or content provider's host server via the Internet, whereby, not only does such facilitate and encourage the connection of the end-user to the content provider's web page, but also provides the content provider with valuable marketing information, such as the physical location of the caller, whereby selected information unique to that caller may be downloaded to him over the Internet, such as name and addresses of stores of the company or advertiser nearest to the caller, etc.

It is another objective of the present invention to provide such file imaging, with or without audio, such that the data representing the picture or video and/or audio is not accessable off the end-user's computer, without first receiving the current "keyed" or de-crippling triggering data from the content provider's host server (URL) being a trigger as small as a few bytes.

It is another objective of the present invention to allow by server permission only, the end-user the ability to store said trigger on non-volatile media for permanent ownership of said data.

It is also an objective of the invention to provide a software program in the end-user computer called a "catcher" for catching the trigger data such as the file header, decoding it, and playing the file header data substantially "on the fly", so that the video and/or audio data on the CD-ROM may be played back on the end-user's computer substantially immediately after having received the trigger data.

It is also an objective of the invention to store both the video files and the video player for playing the video files in encrypted form at the Web site associated with a server of the Internet or Intranet, which encrypted video files and video player are downloaded to a requesting computer having the software decryption keys for the encrypted video files and player, whereby the video files are protected from unauthorized playback or copying by screen-dumping and other such methods of capturing images.

Toward these and other ends, the method of the invention for transmitting the de-crippling triggering data for video and/or audio over the Internet consists of encoding the data representing critical information of the file keys such as the header of the picture/video/audio files accessible via the Web Page controlled by the Web Page provider, and transmitting that encoded key to a local server of the local web of the Internet serving the caller, or directly to an end-user's computer. The local server may then establishes a point-to-point socket-connection between the transmitting, host computer, and the receiving or end-user computer. When the encoded key is received by the Web Page from the End user's computer, the data is decoded and matched to the picture/video/audio files of accessable via the Web Page over the Internet, whereupon, since the data files now have an associated and complete header, the data thereof may be read, to thus allow the transmission or playback of the picture, video, or audio data on the end user's comuter.

Since the encoded header data that is sent over the Internet is a necessity before the end-user may view or playback the picture/video/audio data obtained from the Web Page, the host computer may send along with the encoded data, additional information pertinent to the information contained in the encoded transmitted files, such as current prices, special offers or deals, locations of local stores or dealers, or any information that the host computer, content provider, would like the end-user to receive.

In order to encourage the end-user to view the picture/video/audio encoded files contained and accessable via the Web Page, the downloaded software may be provided with its own Internet dial-up program files for connecting to the host web server, so that very little time and effort is required on the part of the end-user.

BRIEF DESCRIPTION OF THE DRAWINGS

The invention will be more readily understood with reference to the accompanying drawings, wherein.

DETAILED DESCRIPTION OF THE INVENTION

Figure 1:
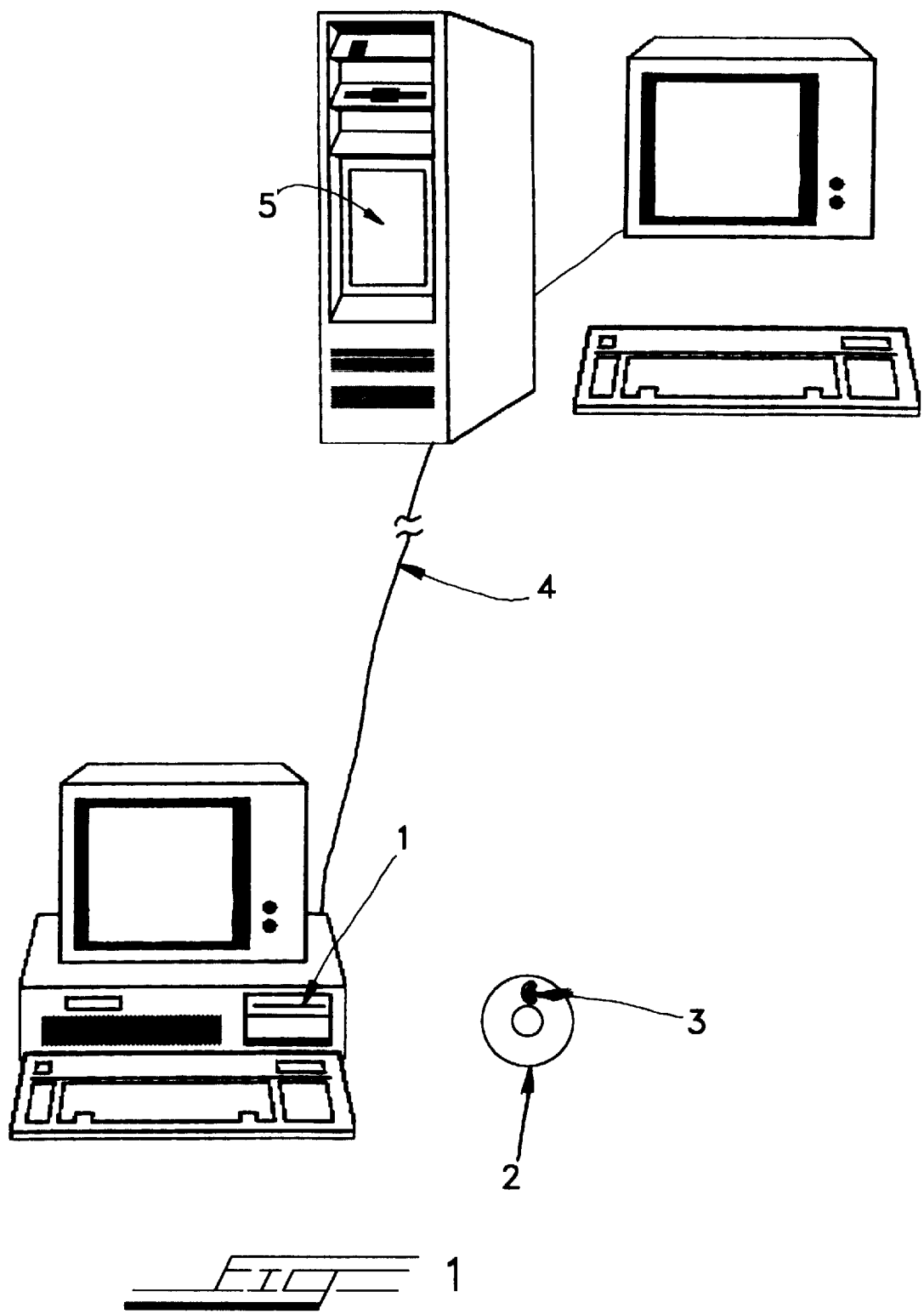
FIG. 1 is a pictorial representations of the hardware systems and software processes used for carrying out the present invention.
Figure 2:
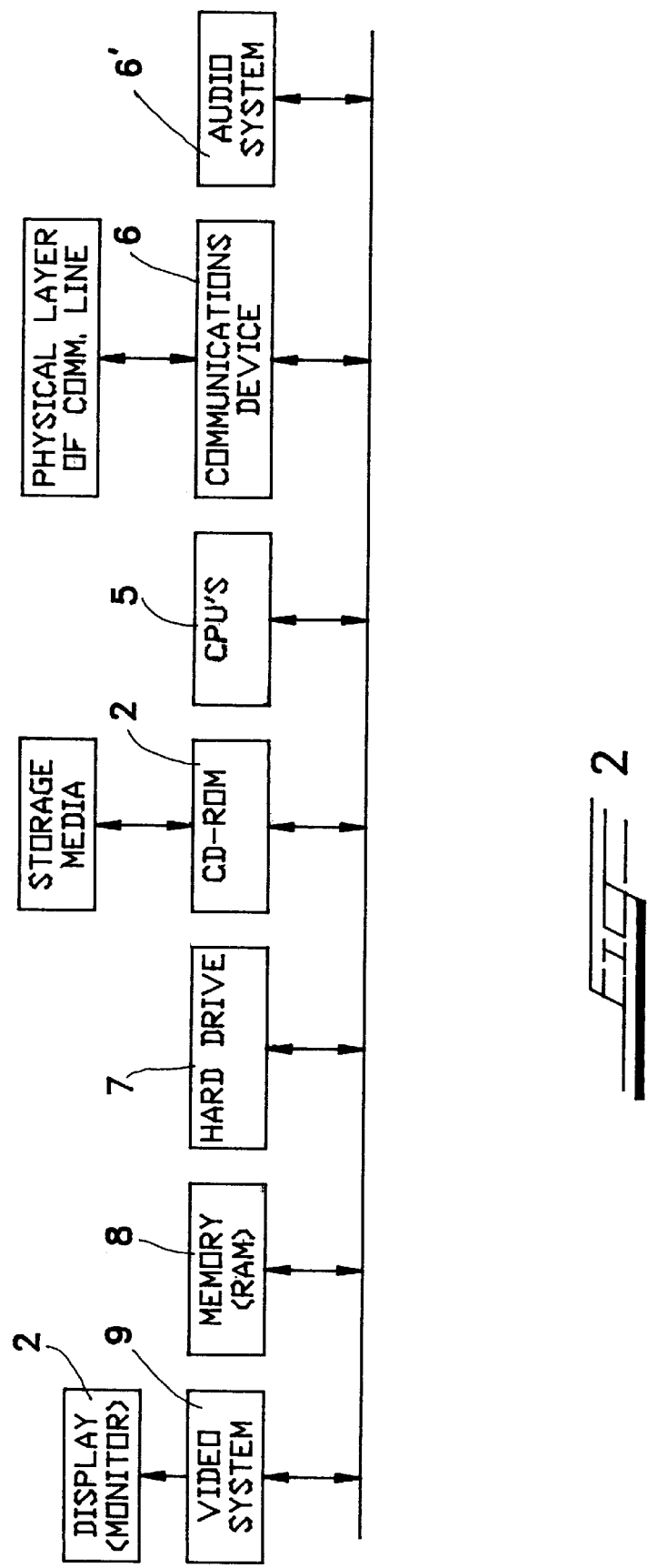
FIG. 2 is a block diagram showing the hardware of the end-user's computer used for carrying out the present invention.

Referring now to the drawings in greater detail, and to FIGS. 1 and 2 for now, the hardware used to carry out the present invention is shown. All of the hardware is conventional and well-known, and includes an end-user computer 1 having a CD-ROM drive 2 for playing a CD-ROM 3 having stored thereon crippled data 4 that is unreadable without first having received a trigger or uncrippling key 5. The end-user's computer 1 is connected via the Internet 6 to a host-computer server 7 which has stored thereat the uncrippling or triggering key 5 for the information stored on the end-user's CD-ROM 3. The end-user's computer 1 has a display and a CPU 9 and a communication-device, such as a modem 10 for establishing communication with the Internet 6. The computer 1 also has the CD-ROM drive 2, hard-drive 11, RAM 13, and video system 8 including monitor as well as audio system 13.

Figure 3:
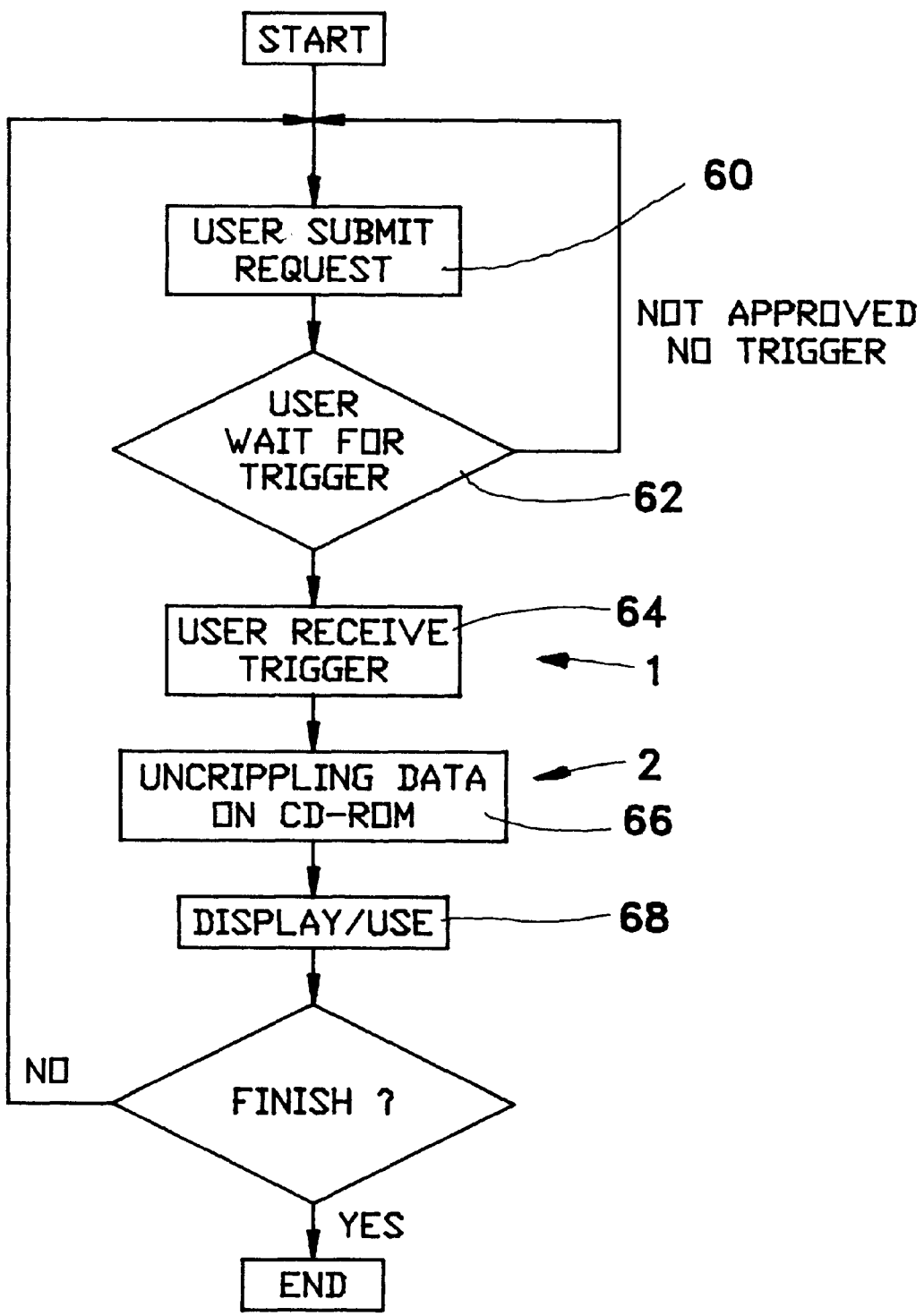
FIG. 3 is a flow chart at a user's computer for accessing the trigger-data from a web-site.

Referring to FIG. 3, there is shown the flow charts for receiving the uncrippling key. The end-user first submits a request over the Internet for the uncrippling key (block 60). The user then waits for that key (block 62), and if the user is not authorized, the request is denied. If the request is authorized, then the uncrippling key is sent by the server and received by the end-user's computer (block 64), whereupon the end-user's computer directs the uncrippling key into volatile memory such as RAM, not into a RAM-disk to be visible, but saved in a dynamically allocated data structure in RAM accessible only by the receiving program, combined with crippled data read from the CD-ROM and displays the video/animation (block 68).

Figure 4:
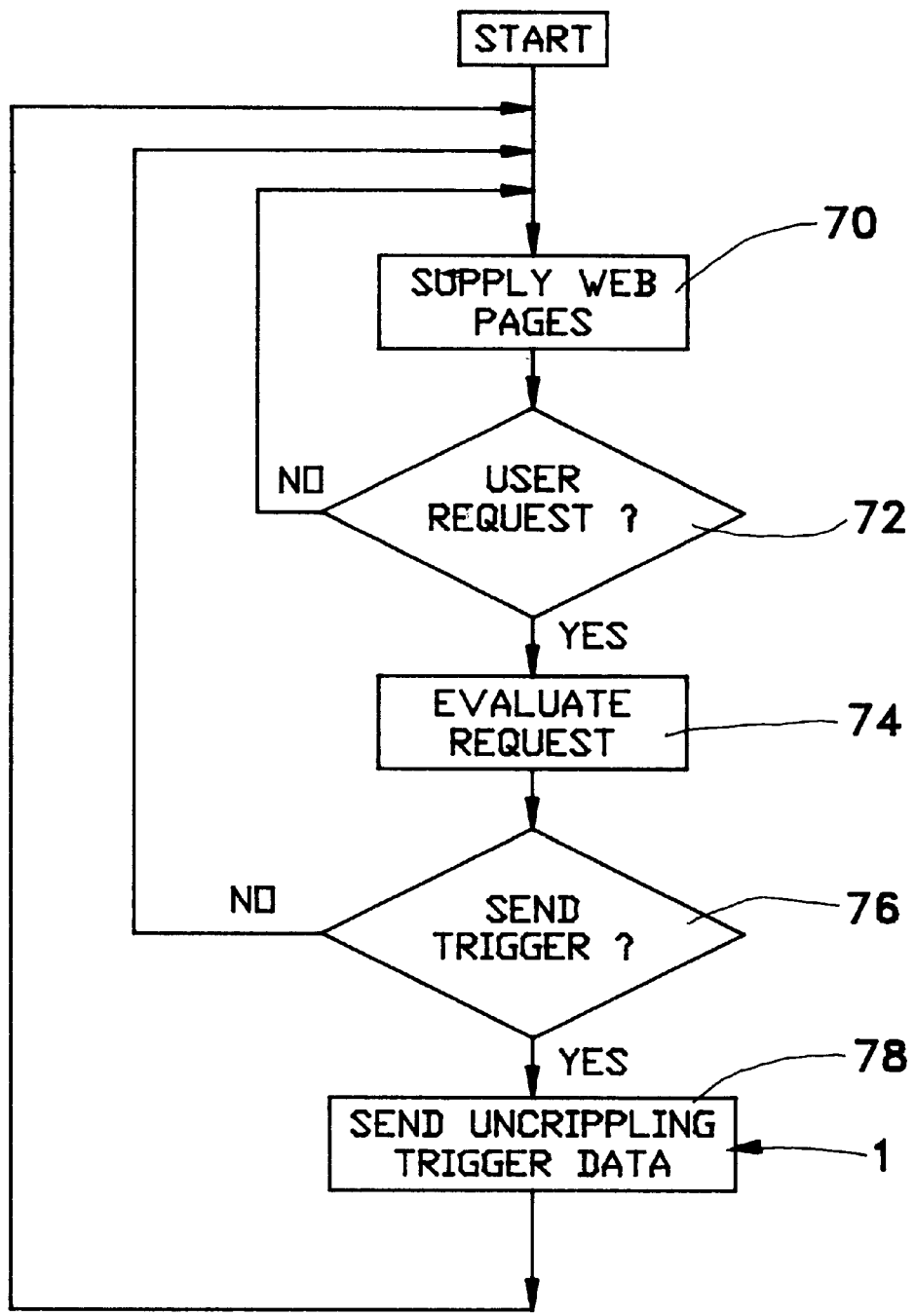
FIG. 4 is a flow chart for the server associated with the Internet for evaluating the trigger-request from the user's computer and for sending the trigger.

FIG. 4 shows the process-flow that at the server side. The server conventionally provides the web pages to the Internet users (block 70), and awaits a user-request (block 72). If a request is received from an end-user's computer, the server evaluates the request (block 74) in order to authorize the transfer of the uncrippling key (block 76). If an authorization is granted, then the uncrippling, trigger key is sent (block 78).

Figure 5:
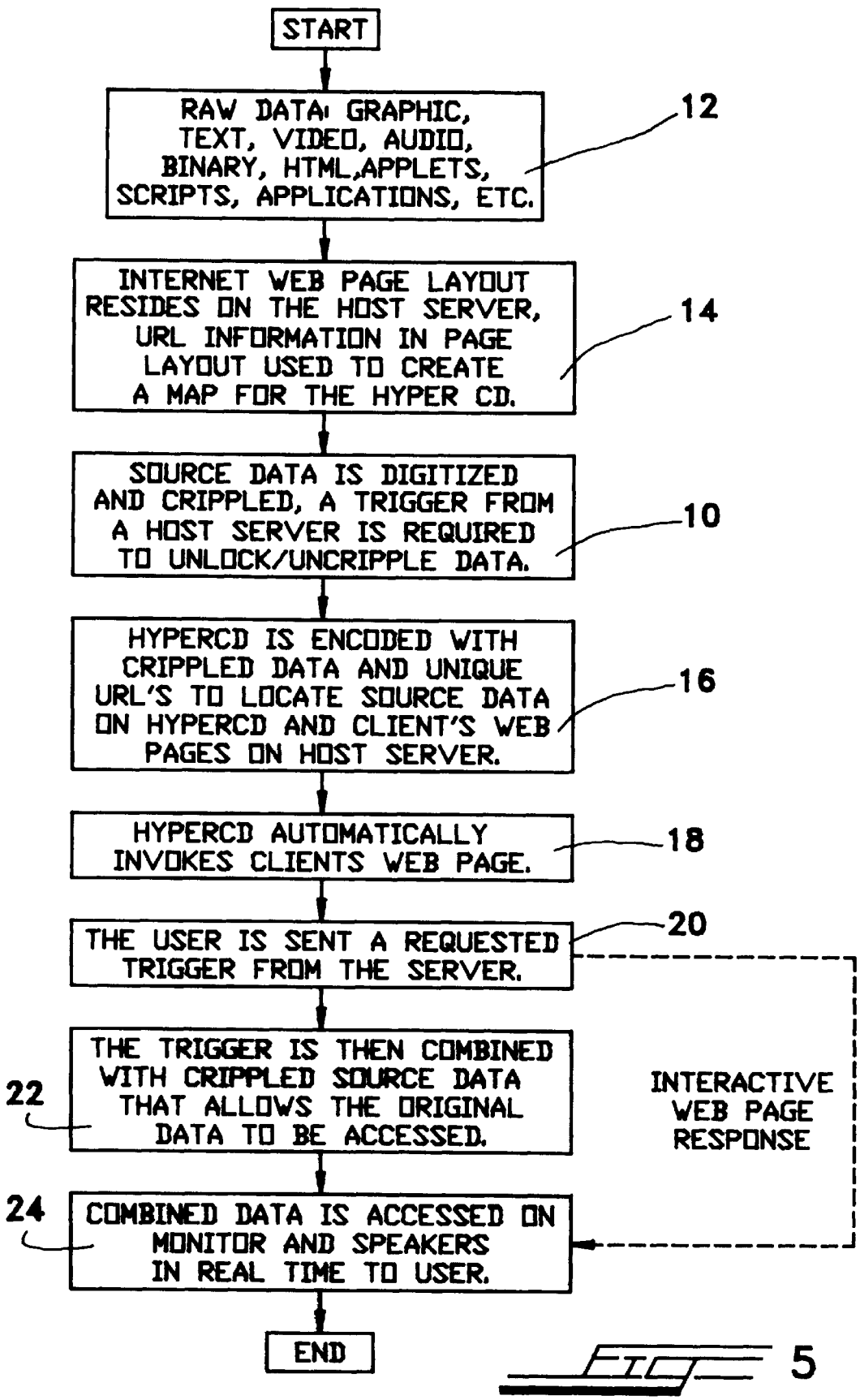
FIG. 5 is a block diagram showing the socket-to-socket connection for transmitting the de-crippling, triggering key for causing the display of the video images and/or audio data of a "HyperCD" at the end-user's PC over the Internet from a host computer combined with a targeted URL to a recipient or end-user's computer.
Figure 6:
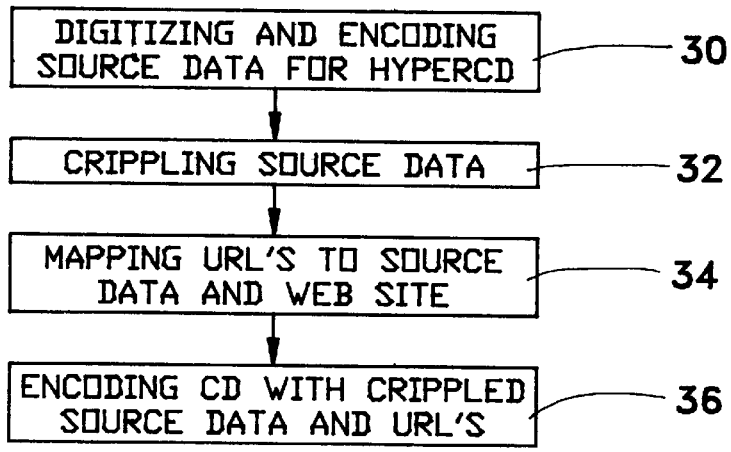
FIG. 6 is a block diagram showing the steps for forming on the CD-ROM the encoded video and audio data for use by the end-user recipient computer after having been crippled by removing the header-triggering key sent from the media files.
Figure 7:
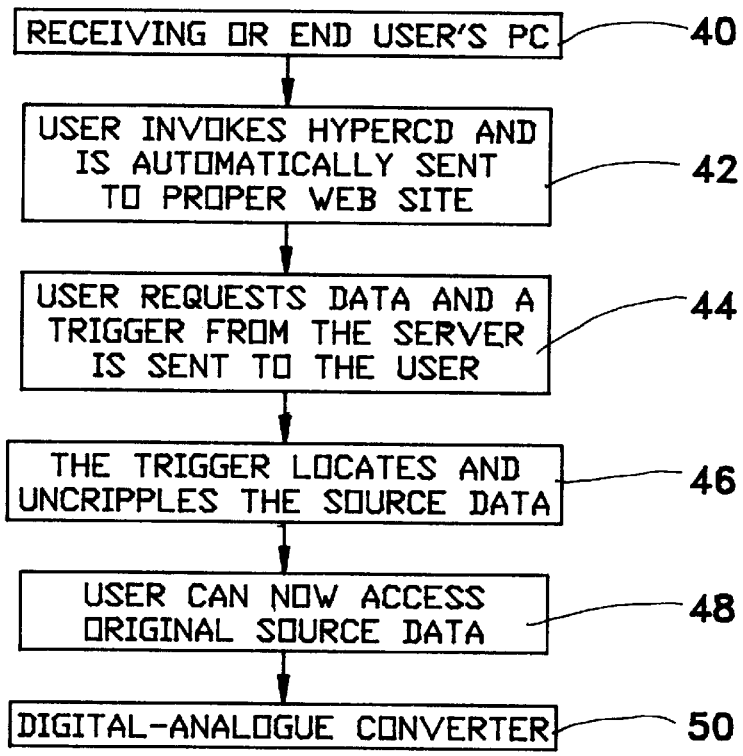
FIG. 7 is a block diagram showing the process of triggering in order to invoke "HyperCD" video and/or audio data at the receiving computer for playback.

Referring now to FIGS. 5–7, video images and/or audio are converted from analog to digital and stored in crippled fashion in digitized format (block 10) on CD-ROM 3. The crippling of the CD-ROM is achieved by removing critical information such as the video-audio header, whereupon such video/audio data is rendered unreadable by the end-user's computer. The "HyperCD" 3 is provided with the URL (web page) of the designated host computer, or server, (block 14), such, as for example: http://tekweb.com/hypercd/adver/lotto.html, which may be used on the CD-ROM for the Illinois Instant Lottery video advertising. Such digitized format may be existing computer memory files (block 12) that are already in binary format, or may be original files originated by recording the video and/or audio, as by a camcorder or tape, etc., and converting the analog signals into digital, or binary, code. In the case of originating files, the analog data may be converted to digital data using an INTEL "Smart Video Reorder Pro", for example. The raw binary data that is stored on the "HyperCD" (block 16) is crippled, so the only way to access the data is a socket-to-socket connection with the server of the web page of the host. By means of the process performed in block 14, the CD-ROM contains a code representing the URL web page of the host computer where the necessary de-crippling key is located. This data on the CD-ROM 3 will automatically call up and connect the end-user's computer to the host computer's server 7 on the Internet, whereby a socket-to-socket connection is made therebetween (block 18). Such an automatic connection is well-known, and will automatically find the end-user's browser, will call the Internet service provider, and pass the necessary links from the CD-ROM to the browser in order to get to the host's web page. Such software is available on the "Windows 95" operating system, such as "ActiveX". The host computer then sends back to the local server serving the end-user's computer the necessary, uncrippling trigger for the specific video/audio data on the end-user's CD-ROM (block 20). From the local server, the data is sent out directly over the Internet to the end-user, and, in particular, to the RAM 12 of the end-user's computer (block 22). In RAM, the trigger (block 22), and the data on the CD-ROM 3 are combined, and played back (block 24), as described above. However, as will be explained hereinbelow, since the key 5 is being sent via Internet 6, the end-user's computer 7 must be equipped with the requisite software which is capable of receiving data from the server 7 and which will ensure that the received encoded key 5 is placed safely in RAM 12, and not allowed to be otherwise saved in hard drive 11 where it may be captured and used in a way not authorized by the server 7.

Referring to FIG. 6, at the end-user computer end, the raw analog data of the audio/video is digitized (block 30), as explained above, and stored on CD-ROM 3 by conventional techniques. During the storage of the data on the key or critical information of the media file such as video-audio header associated with the video/audio files will be omitted from storage on the CD-ROM, whereupon the CD-ROM is crippled, or prevented from being read for playing back the video/audio files (block 32). The CD-ROM is provided with software for linking up the host-computer which has the necessary key 5 for uncrippling the video-audio files 4 on the CD-ROM 3, which linking software maps or automatically directs the end-user's computer to the host server via the Internet, such linking software having all of the necessary routing information for directing the Internet connection to the host computer's server and web page (URL) (Block 34). The encoding of the critical information such as "Header" trigger is achieved utilizing any conventional encoding program, such as, for example, RSA by Data Security (block 36). This encoding will create a trigger of a few bytes comprising all of the necessary information to trigger the CD-ROM, and to invoke the video and/or audio data.

Figure 8:
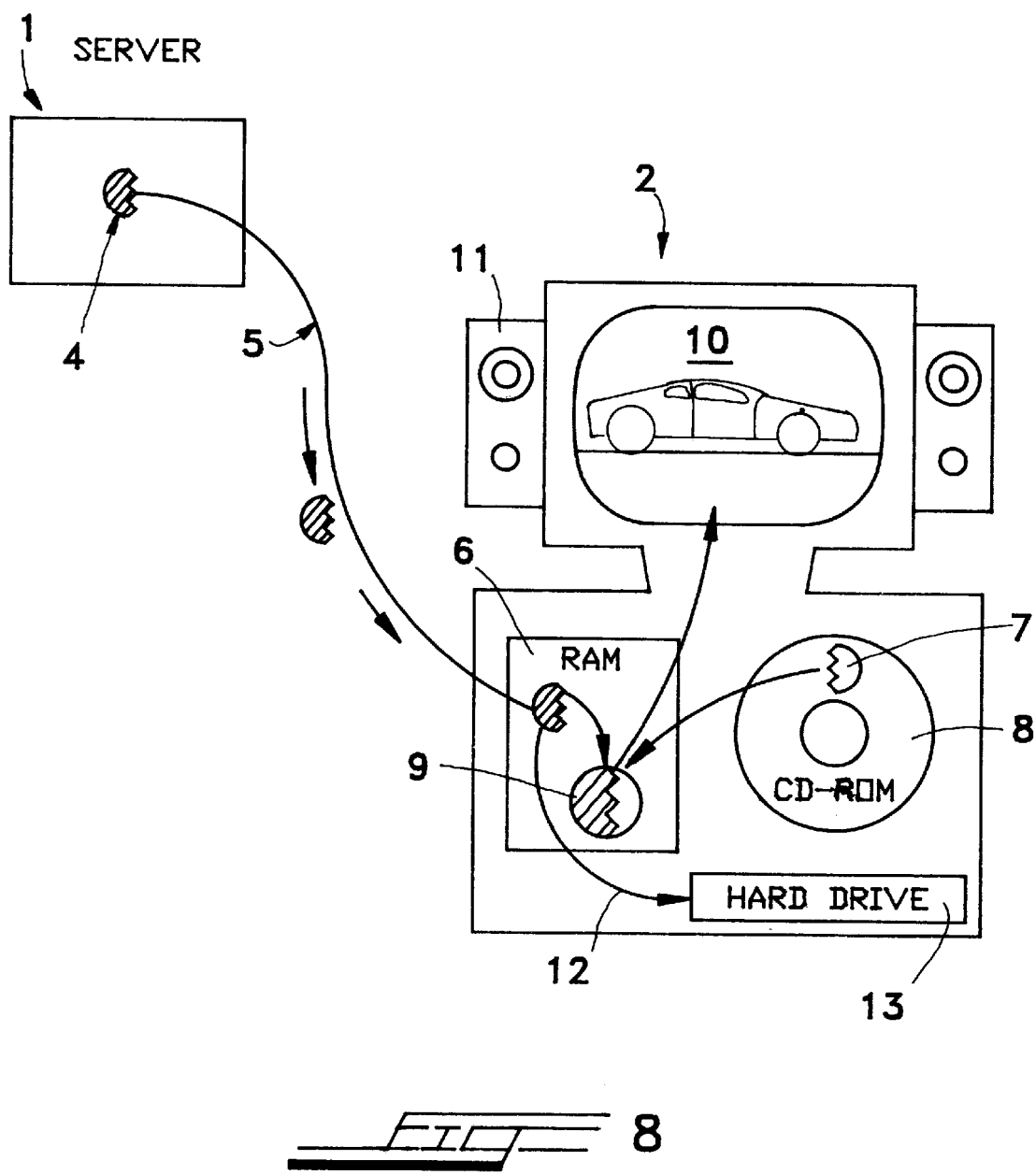
FIG. 8 is a pictorial representation of the hardware component and software processing involved.

FIG. 7 shows the steps involved for de-crippling the data on the CD-ROM 3 of a receiving or end-user's computer 1 (block 40). A socket-to-socket connection is made between the host, or sending, computer and the receiving, or end-user's computer by means of the linking software described above installed on the end-user's computer (block 42). The Internet Service Provider (ISP) of the end-user's computer's web of the Internet sends the data to the host computer's server over the Internet, which means that any number of local servers and gateways and routers will have been involved in transmitting the data, until it finally arrives at the server 7 serving the web associated with the host computer (block 42). As soon as this socket-to-socket connection is made, the encoded trigger 5 is sent, at a rate of about 3.6 kbytes a second (block 44). The end-user's computer has a specially-dedicated software program for catching the key, decrypting the key 5 from the server and data from the CD-ROM 3, combining the key and data and playing it back. This catcher is a software program discussed hereinbelow that will direct the incoming key, such as the header, to a random location in RAM 8 such as cache directory, of the computer (block 46) and the key will only be visible to the program. The catcher is necessary, since, if it were not present, it is the "nature" of personal computers to randomly dump data which has not had a specific destination assigned to it. Thus, without the catcher, the incoming data may be strewn into a different directory and/or sub-directories, to, thus, be irretrievably lost. As soon as the encoded key 5 arrives and is stored in RAM by means of the catcher program, a subroutine "player" in the program in the receiving computer begins to decode the trigger, in order to invoke the correct track of the CD-ROM (block 48), from which the data passes to the audio/video subsystem (8,13, FIG. 2), in order to play the video or audio (block 50). It is noted, and emphasized, that as soon as the key has been decoded, the video and/or audio data is immediately "played" back by the audio/video subsystems (8,13, FIG. 2), bypassing the necessity of having to first store the key, or other trigger, on a hard drive before playback. Referring specifically to FIG. 8, there are shown the server 1, the user computer 2, and the software processes 3 used for transmitting the uncrippling key 4 over a network 5, the combining in RAM 6 of the key 4 and crippled data 7 from the CD-ROM 8, the rendering or displaying of the media data 9 such as video/audio or animation on the display 10 or from the audio system 11, and the storing of the key 4 to non-volatile media 13, such as a hard drive, for permanent ownership of the encrypted CD media.

It is noted that it is possible to "cripple" the video/audio data on the CD-ROM by other means other than deleting the header thereof. For example, the file could be made a hidden file, with the trigger data from the host computer being a command to remove the hidden status. Alternatively, the video/audio file could have a changed extension, with the trigger data from the host computer being a command to change the extension. Moreover, the crippling of the video/audio file may be achieved by the use of ZIP file, with the trigger data from the host computer being a command to UNZIP the data. It is, also, within the scope and purview of the invention to use a floppy disk for storing the crippled file, as described above, for those applications requiring less disk-memory, with the uncrippling data from the host server being sent to the floppy-disk drive via the catcher program, as described above for uncrippling the data on the floppy-disk. Of course, the crippled file may also be stored on any storage medium, such as the hard drive 11, with the uncrippling data from the host server being sent to the drive for that storage medium via the catcher program, as explained above. The uncrippling data may also be stored directly in a hard drive or EPROM so that the user has permanent access to it whenever he wishes to uncripple the file; that is, if the user wishes to permanently retain the crippled nature of the data on the CD-ROM, or floppy, he may permanently store the downloaded uncrippling data in hard drive in order to temporarily uncripple the data on the CD-ROM or floppy every time that it is used, as long as such access is authorized by the server.

Figure 9:
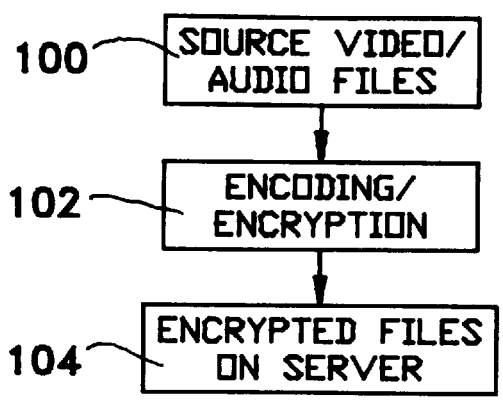
FIG. 9 is a flow chart showing the server-side of the Internet with the encrypted files thereat.
Figure 10:
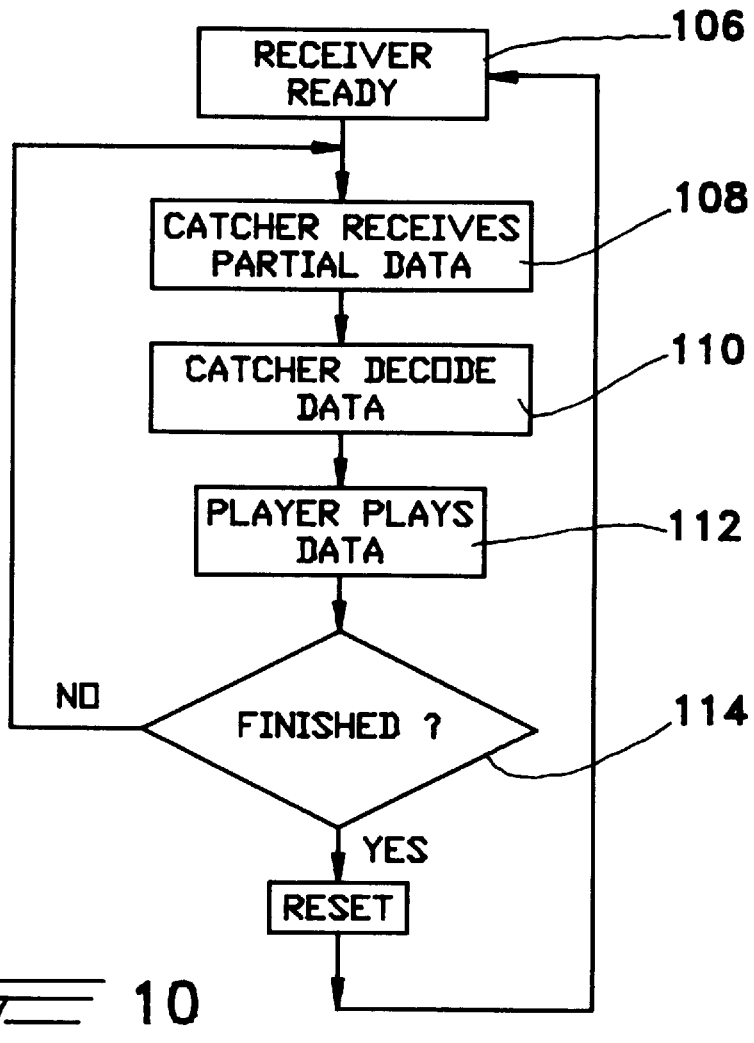
FIG. 10 is a flow chart showing the "catcher" program of the invention at the end-user's computer for playing back the receiving data immediately.
Figure 11:
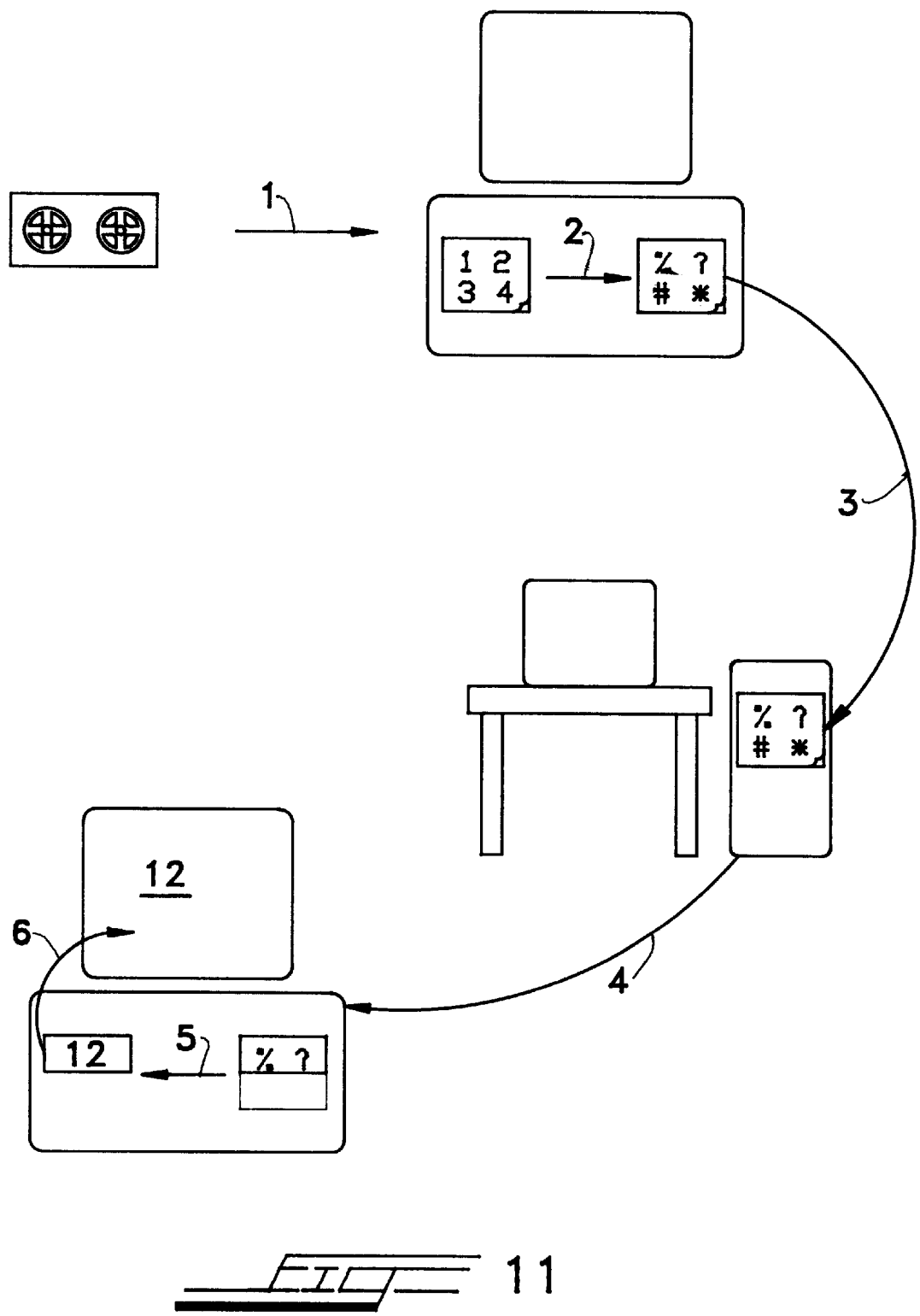
FIG. 11 is a block diagram of the catcher-program process.

Referring to FIGS. 9–11, the above-discussed "catcher" program is shown. Encrypted files, such as the header for the crippled CD-ROM data at an end-user's computer, is stored at a server associated with the Internet (block 100 in FIG.9). This header-trigger or other file is encoded and encrypted in a conventional manner at the server (blocks 102, 104). This encoding will create a header of about 50K or less comprising all of the necessary information necessary to the video and/or audio data on the CD-ROM, as is well-known in the art. Then, the encoded data is sent to the local web server (block 36) in order to be sent out over the Internet, and then to the end-user computer. When the end-user computer requests that the trigger be downloaded, according to the process described above (block 106 of FIG. 10), the catcher program at the end-user computer receives the partial data or trigger, such as a header for the CD-ROM file (block 108). The catcher program decodes the data, using a conventional decoder (block 110), and then sends the data directly the conventional player of end-user computer (block 112) for substantially immediate playback. As soon as the encoded header arrives and stored in the cache directory, the program entitled "player" in the receiving computer begins to decode the data, in order to regenerate the original binary code, from which the data passes to a conventional digital-to-analog converter, in order to play the video or audio. It is noted, and emphasized, that as soon as the header has been decoded, the video and/or audio data starts to play back by the digital-to-analog converter. That is, it is not necessary to store the trigger data on a hard drive, although it is possible to do so, if it is desired to allow the end-user unobstructed access to the video or audio files on the CD-ROM, or the like, at any time in the future.

Figure 12:
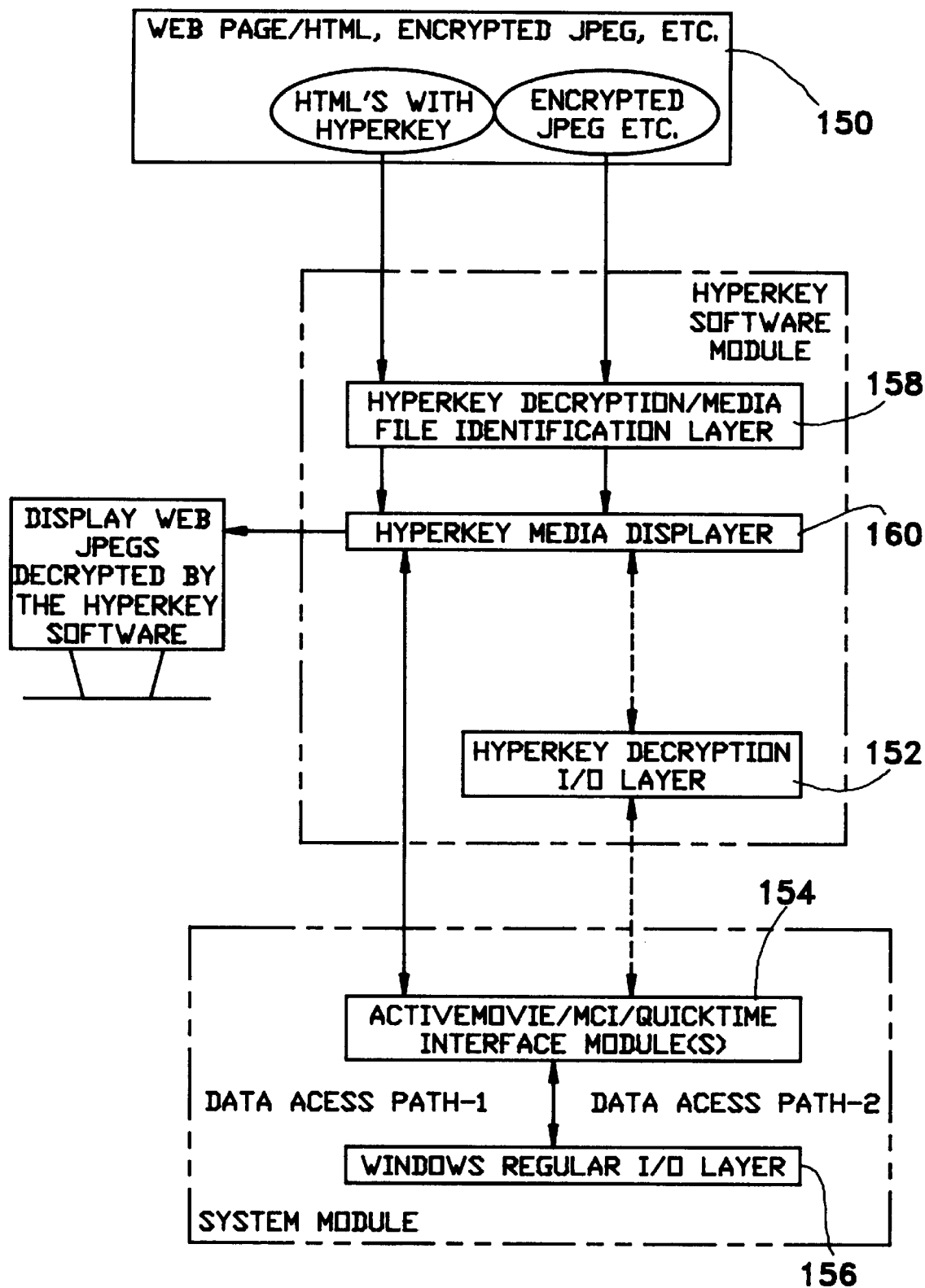
FIG. 12 is a block diagram of a modification of the invention where instead of using a CD-ROM, the video and/or other information is downloaded via the Internet from a Web page, which video and/or other information is encrypted with a key, with the user's computer storing the corresponding decryption key therefor.

Referring to FIG. 12, an alternative embodiment is shown. In this embodiment, the use of a hyperCD is obviated, and the video and/or audio, and other data, is downloaded via the Internet from a Web page (block 150). The video and/or audio, and other data, are encrypted with an encryption key. Each user who is to be able to access the data at that Web page will have a corresponding decryption key (block 152) for decrypting the data. In addition to the video or graphic or other data being sent, the Web site will also download the video player, such as JPEG, "QUICKTIME", or the like, to the user's computer via the Internet. The player, such as JPEG, is also encrypted, so that even after the end user has received the video and other data from the Web site via the Internet, the conventional player stored on the user's computer (block 154) will not be able to play the video. The data emanating from the Internet is first identified with the requesting file of the user's computer (block 158), and then sent to the media player for playback (block 160) using the encrypted player, downloaded from the Web site. The encrypted player, such as JPEG, is decrypted, like the video data, using the decryption key (block 152) provided by the provider of the Web site. It is noted that before the video is downloaded from the Web site via the Internet, the user must first enter his password or other protective feature. According to this embodiment of the invention, videos at a Web site are protected from being viewed without proper authorization, and if the downloaded video were stored in memory of the user's computer, it would not be playable without first downloading the encrypted player, such as JPEG, from the Web site. Thus, the Web provider is able to protect his video and/or graphic data from being copied by the end user's computer. Although the end user may be able to print out a graphic, this would be of very poor quality. It is also within scope and purview of the invention to download only the encrypted player, for playing back encrypted video and/or graphics already stored on the requesting, end user's computer. In this case, the video data ma be supplied to the end user in other forms besides the Internet or Intranet, but still may not be played back without use of the encrypted player downloaded from the Web site and then decrypted by the decrypting key at the end user's computer. Alternatively, the encrypted player may be provided to the end user, and only the encrypted video files may be sent over the Internet or Intranet.

The following is the software code listing for the server of the host computer's web for bursting the encoded "header" trigger data through the Internet.

```
.OJ OFF.PO1
                                                    SENDFILE.C
#!/usr/sbin/perl
# Get the input
read(STDIN, $buffer, $ENV§'CONTENT_LENGTH'†);
# Split the name-value pairs
@pairs = split(/&/, $buffer);
foreach $pair (@pairs)
§
                    ($name, $value) = split(/=/, $pair);
                    # UN-Webify plus signs and %-encoding
                    $value = ™ tr/+/ /;
                    $value = ™ s/%([a-fA-FO-9][a-fA-FO-9]) /pack("C",hex($1)) /eg;
                    $FORM§$name† = $value;
†
# Location of the CMC files
$CMCDIR = '/UL/people/CMC/'   .$FORM§'dir');
# If the $CMCDIR director is not found, exit
if( ! -d "$CMCDIR")
§
                    &Error("$CMCDIR not found on this system. Please check the path and try agai
n ®n");
†
# If there are no files in the CMC directory no point trying to transfer files
else
§
opendir( THISDIR, "$CMCDIR");
@allfiles = grep(/®.CMC/, readdir(THISDIR));
if( ! @allfiles ) §
                    &Error("There are currenly no CMC files in this directory. Try again later."); †
son @allfiles;
†
print ("HTTP/1.0 200 ®n");
print ("Content-type: multipart/x-mixed-replace;boundary=---ThisRandomString---®n®n");
print ("---ThisRandomString---®n");
#Send the First file with .IVD extension which invokes IVIDEO.EXE
print "Content-type: application/x-IVD ®N ®N";
$CONTENT = °cat$CMCDIR/CMC001.IVD°;
print $CONTENT;
```

-continued

```
print (" ®n---ThisRandomString--- ®n");
# Now send rest of the .CMC files which would call filehd1.exe
while (@allfiles)
§
                $file = shift @allfiles;
                print "Content-type: application/x-CMC ®n: ®n";
                print "$file ®n":
                $CONTENT = °cat$CMCDIR/$file°;
                print $CONTENT;
                print (" ®n---ThisRandomString--- ®n");
†
# Subroutine that tells whats wrong
sub Error
§
                print ("Content-type: texxt/html ®n ®n");
                print ("_Title¢Error_/Title¢ ®n");
                print ("_H1¢Error: _/H1¢_p¢ ®n");
                print (@_);
                print ("_p¢_p¢_hr¢_a    href= ®
                "mailto:cmcinter ®@suba.com ®"¢Contact webmaster _/ a¢");
                exit ();
†
                    COPYRIGHT - 1996 PLANET GRAPHICS, INC.
```

The following is the software code listing at the host-computer for encoding the "header" binary data into seven-digit ASCII text format, and also listed is the software code listing for the "player", or decoder, at each receiving, or end-user, computer, for decoding the encoded text format back into binary:

```
            .LSI
HOOK_MENU1 MENU LOADONCALL MOVEABLE DISCHARDABLE
§
POPUP "&File"
MENUITEM "&Encode...",1169
MENUITEM "&Decode...",1170
†
POPUP "&Actions"
MENUITEM "&Concatenate Files...",1171
MENUITEM "&View A Report FiIe...",1172
MENUITEM "C&lean Directories...",1173
MENUITEM SEPARATOR
MENUITEM "&Display Wincode Task",1174
MENUITEM "&Hide Wincode Task",1175
†
POPUP "&Options"
§
MENUITEM "&Encode...",1176
MENUITEM "&Decode...",1177
MENUITEM "&Wincode...",1178
MENUITEM "&Winsort...",1179
MENUITEM SEPARATOR
MENUITEM "&Viewer..",1180
MENUITEM SEPARATOR
MENUITEM "&ZIP/UNZIP...",1181
MENUITEM SEPARATOR
MENUITEM "&Hook App...",1182
†
POPUP "&Help"
§
MENUITEM "&Contents",1183
MENUITEM "&Search for Help on...",1184
MENUITEM "&How to Use Help",1185
MENUITEM "&Wincode FAQ",1186
MENUITEM "C&opyrights",1187
MENUITEM SEPARATOR
MENUITEM "O&rdering the Help file...",1188
MENUITEM SEPARATOR
MENUITEM "&About Wincode...",1189
†
MENUITEM SEPARATOR
MENUITEM "&UnHook Wincode",1190
MENUITEM SEPARATOR
MENUITEM "E&xitWincode",1191
†
```

-continued

HOOK_MENU2 MENU LOADONCALL MOVEABLE DISCARDABLE
§
POPUP "&File"
§
MENUITEM "&Encode..."2269
MENUITEM "&Decode..."2270
†
POPUP "&Actions"
§
MENUITEM "&Concatenate Files...",2271
MENUTTEM "&View A Report File...",2272
MENUITEM "C&lean Directories...",2273
MENUITEM SEPARATOR
MENUITEM "&Display Wincode Task",2274
MENUITEM "&Hide Wincode Task",2275
†
POPUP "&Options"
§
MENUITEM "&Encode..."2276
MENUITEM "&Decode..."2277
MENUITEM "&Wincode.."2278
MENUITEM "&Winsort..."2279
MENUITEM SEPARATOR
MENUITEM "&Viewer.."2280
MENUITEM SEPARATOR
MENUITEM "&ZIP/UNZIP...",2281
MENUITEM SEPARATOR
MENUITEM "&Hook App...",2282
†
POPUP "&Help"
§
MENUITEM "&Contents",2283
MENUITEM "&Search for Help on...",2284
MENUITEM "&Howto Use Help",2285
MENUITEM "&Wincode FAQ", 2286
MENUITEM "C&opyrights",2287
MENUITEM SEPARATOR
MENUITEM "O&rdering the Help file...",2288
MENUITEM "&About Wincode...",2289
†
MENUITEM SEPARATOR
MENUITEM "&UnHook Wincode",2290
MENUITEM SEPARATOR
MENUITEM "E&xitWincode",2291
†
HOOK_MENU3 MENU LOADONCALL MOVEABLE DISCARDABLE
(
POPUP "&File"
§
MENUITEM "&Encode...",3369
MENUITEM "&Decode...",3370
†
POPUP "&Actions"
§
MENUITEM "&Concatenate Files...",3371
MENUITEM "&View A Report File...",3372
MENUITEM "C&lean Directories...",3373
MENUITEM SEPARATOR
MENUITEM "&Display Wincode Task",3374
MENUITEM "Hide Wincode Task",3375
†
POPUP "&Options"
§
MENUITEM "&Encode...",3376
MENUITEM "&Decode...",3377
MENUITEM "&Wincode...",3378
MENUITEM "&Winsort...",3379
MENUITEM SEPARATOR
MENUITEM "&Viewer...",3380
MENUITEM SEPARATOR
MENUITEM "&ZIP/UNZIP...",3381
MENUITEM SEPARATOR
MENUITEM "&HookApp...",3382
†
POPUP "&Help"
§
MENUITEM "&Contents",3383
MENUITEM "&Search for Help on...",3384
MENUITEM "&How to Use Help",3385

-continued

```
MENUITEM "&Wincode FAQ", 3386
MENUITEM "C&opyrights",3387
MENUITEM SEPARATOR
MENUITEM "O&rdering the Help file...",3388
MENUITEM SEPARATOR
MENUITEM "&About Wincode...",3389
MENUITEM SEPARATOR
†
MENUITEM "&UnHook Wincode",3390
MENUITEM SEPARATOR
MENUITEM "E&xitWincode",3391
†
HOOK_WORKING DIALOG LOADONCALL MOVEABLE DISCARDABLE 100,89,141,55
STYLE WS_POPUP ¶ WS_VISIBLE ¶ WS_CAPTION
CAPTION "Wincode Working..."
FONT 8, "MS Sans Serif"
§
LTEXT "",103,81,19,27,8
LTEXT "",102,81,9,27,8
PUSHBUTTON "&Stop",104,18,37,45,13
PUSHBUTTON "&Quit",105,78, 37,45,13
RTEXT "Total Job:",-1,12,19,66,8
CONTROL "",-1, "STATIC",SS_BLACKFRAME
¶ WS_CHILD ¶ WS_VISIBLE, 6,6,129,25
RTEXT "",101,12,9,66,8
†
BASE64_TYPE DIALOG LOADONCALL MOVEABLE DISCARDABLE 71,26,123,181
STYLE DS_MODALFRAME ¶ WS_POPUP ¶ WS_CAPTION ¶ WS_SYSMENU
FONT 8, "MS Sans Serif"
§
DEFPUSHBUTTON "OK",1,12,163,45,13
RADIOBUTTON "Application: &Octet-Stream:,
301,12,19,99,12,BS_AUTORADIOBUTTON ¶ WS_TABSTOP
RADIOBUTTON "Application: &Postscript:, 302,12,34,99,12,BS_AUTORADIOBUTTON ¶ WS_TABSTOP
RADIOBUTTON "Image:&JPEG",303,12,49,99,12,BS_AUTORADIOBUTTON ¶ WS_TABSTOP
RADIOBUTTON "Image:&GIF",304,12,64,99,12,BS_AUTORADIOBUTTON ¶ WS TABSTOP
RADIOBUTTON "Image:&X-BMP",305,12,79,99,12 BS-AUTORADIOBUTTON ¶ WS_TABSTOP
RADIOBUTTON "Video:&MPEG",306,12,94,99,12,BS_AUTORADIOBUTTON ¶ WS_TABSTOP
RADIOBUTTON "Audio:X-&WAV",307,12,109,99,12,BS_AUTORADIOBUTTON ¶ WS_TABSTOP
PUSHBUTTON "Cancel", 2, 66, 163, 45, 13
GROUPBOX "Content-Type", 101,6,5,111,152,BS-GROUPBOX ¶ WS_GROUP
†
DESC_TEXT DIALOG LOADONCALL MOVEABLE DISCARDABLE 9,50,288,138
STYLE DS_MODALFRAME ¶ WS_POPUP ¶ WS_CAPTION ¶ WS_SYSMENU'
CAPTION "Descriptive Text wiII be added to first Encoded file..."
FONT 8, "MS Sans Serif"
§
EDITTEXT 201, 6, 6, 276, 108,ES_MULTILINE ¶ ES_AUTOVSCROLL ¶ ES_WANTRETURN
   ¶ WS_BORDER ¶ WS_VSCROLL ¶ WS_TABSTOP
DEFPUSHBUTTON "OK",1,69,120,60,13
PUSHBUTTON "Cancel",2,159,120,60,13
†
DIR_SELECT DIALOG LOADONCALL MOVEABLE DISCARDABLE 15,20,147,116
STYLE DS_MODALFRAME ¶ WS_OVERLAPPED ¶ WS_CAPTION ¶ WS_SYSMENU
FONT 8, "Helv"
§
EDITTEXT 101,42,5,98,12,ES_AUTOHSCROLL ¶ WS_BORDER ¶ WS_TABSTOP
DEFPUSHBUTTON "OK",1,88,22,50,14
LISTBOX 103,6,30,64,82,LBS_STANDARD ¶WS_TABSTOP
PUSHBUTTON "Cancel",2,88,41,50,14
LTEXT "D&irectories:",-1,6,18,64,10
LTEXT "&Directory:"-1,6,6,36,10
†
EXISTS DIALOG LOADONCALL MOVEABLE DISCARDABLE 41,34,177,54
STYLE DS_MODALFRAME ¶ WS_POPUP ¶ WS_CAPTION ¶ WS_SYSMENU
CAPTION "Wincode - Output File"
FONT 8, "MS Sans Serif"
§
PUSHBUTTON "&Overwrite",1,9,36,45,13
PUSHBUTTON "&Rename", 101,66,36,45,13
PUSHBUTTON "&SkipFile",2,123,36,45,13
CTEXT "",102,21,15,135,8
CONTROL "","STATIC",SS_BLACKFRAME ¶
WS_CHILD ¶ WS_VISIBLE, 15,6,147,21
†
FILE OPEN DIALOG LOADONCALL MOVEABLE DISCARDABLE 40,20,202,130
STYLE DS_MODALFRAME ¶ WS_OVERLAPPED
¶ WS_CAPTION ¶ WS_SYSMENU
FONT 8 "Helv"
```

-continued

§
EDITEXT 100,42,6,98,12,ES_AUTOHSCROLL ¶ WS_BORDER ¶ WS_TABSTOP
DEFPUSHBUTTON "OK",1,146,5,50,14
LISTBOX 102,6,44,64,82,LBS_STANDARD ¶ WS_TABSTOP
LISTBOX 103,76,44,64,82,LBS_STANDARD ¶ WS_TABSTOP
PUSHBUTTON "Cancel",2,146,23,50,14
LTEXT "File&name:",−1,6,8,36,10
LTEXT "Directory:",−1,6,20,36,10
LTEXT "",101,42,20,98,10
LTEXT "&Files:",−1,6,32,64,10
LTEXT "&Directories:",−1,76,32,64,10
†
RENAME DIALOG LOADONCALL MOVEABLE DISCARDABLE 34,31,199,57
STYLE DS_MODALFRAME ¶ WS_POPUP ¶ WS_CAPTION ¶ WS_SYSMENU
FONT 8, "MS Sans Serif"
§
EDITEXT 102,6,21,171,12 ES_AUTOHSCROLL ¶ WS_BORDER ¶ WS_TABSTOP
PUSHBUTTON "?",103,180,20,12,13
DEFPUSHBUTTON "OK",1,42,39,45,13
PUSHBUTTON "Cancel",2,111,39,45,13
LTEXT "Enter a VALID DOS filename:",104,6,6,159,9
†
VIEW_RPT DIALOG LOADONCALL MOVEABLE DISCARDABLE 20,43,300,154
STYLE DS-MODALFRAME ¶ WS_POPUP ¶ WS_CAPTION ¶ WS_SYSMENU
CAPTION "Wincode - Report File Viewer"
FONT 8, "MS Sans Serif"
§
DEFPUSHBUTTON "OK",2,111,135,78,13
EDITTEXT 101,6,15,288,99,ES_MULTILINE ¶ ES_READONLY
¶ WS_BORDER ¶ WS_VSCROLL ¶ WS_HSCROLL ¶ WS_TABSTOP
CHECKBOX "&Delete Report File After Viewing",103,6,117,138,12,BS-AUTOCHECKBOX ¶ WS_TABSTOP
LTEXT "File:",−1,7,5,15,8
LTEXT "",102,25,5,270,8
†
COPYRIGHT - 1996 PLANET GRAPHICS, INC.

The following is the software code listing at each receiving, or end-user, computer, for the catcher for receiving the uncrippling data in the cache directory of RAM and directing it to the proper drive:

```
MAIN_MENU MENU LOADONCALL MOVEABLE DISCARDABLE
§
POPUP "&File"
§
MENUITEM "&Encode..." 101
MENUITEM "&Decode..." 102
MENUITEM SEPARATOR
MENUITEM "E&xit",1
÷

POPUP "&Actions"
§
MENUITEM "&Concatenate Files..." 103
MENUITEM "&View a Report File..." 104
MENUITEM "C&lean Directories...",105
MENUITEM SEPARATOR
MENUITEM "&Interactive Drag/Drop", 121
MENUITEM SEPARATOR
MENUITEM "Hook Wincode",122
÷

POPUP "&Options"
§
MENUITEM "&Encode..." 106
MENUITEM "&Decode..." 107
MENUITEM "&Wincode..." 108
MENUITEM "W&insort..." 109
MENUITEM SEPARATOR
MENUITEM "&Viewer..." 110
MENUITEM SEPARATOR
MENUITEM "&ZIP/UNZIP...",111
MENUITEM SEPARATOR
MENUITEM "&Hook App..." 112
÷

POPUP "&Help"
§
MENUITEM "&Contents",113
```

```
MENUITEM "&Search for Help on...",114
MENUITEM "&How to Use Help",115
MENUITEM "&Wincode FAQ",116
MENUITEM "C&opyrights",117
MENUITEM SEPARATOR
MENUITEM "O&rdering the Help file...",118
MENUITEM SEPARATOR
MENUITEM "&About Wincode...",119
}

}
ABOUT DIALOG LOADONCALL MOVEABLE DISCARDABLE 76,55,135,141
STYLE DS_MODALFRAME ¶WS_POPUP ¶WS_CAPTION ¶WS_SYSMENU
CAPTION "About CMCCODE"
FONT 8,"MS Sans Serif"
{
DEFPUSHBUTTON "OK",2,14,123,45,13
PUSHBUTTON "More...",1,74,123,45,13
CTEXT "CMCCODE:",-1,45,9,45,8
CTEXT "Video Encoder/Decoder", -1,10,18,114,8
CTEXT "for the Internet", -1,34,27,66,8
CTEXT "Copyright*xA9 1993,1994",-1,24,72,87,8
CTEXT "Snappy_Inc.",-1,44,63,45,8
CONTROL "",-1,"STATIC",SS_BLACKFRAME ¶WS_CHILD ¶WS_VISIBLE, 6,6,123,111
CTEXT "Version 1.0",-1,40,37,54,8
CTEXT "Developers Kit Provided by:",-1,17,49,101,8
CTEXT "created by Caesar Collazo",-1,18,82,99,8
CTEXT "cmcinter@suba.com",-1,12,103,111,8
CTEXT "Questions...Comments...e-mail to:",-1,9,93,117,8
CONTROL "",-1,"STATIC",SS_BLACKFRAME ¶WS_CHILD ¶WS_VISIBLE, 12,47,111,1
CONTROL "",-1,"STATIC",SS_BLACKFRAME ¶WS_CHILD ¶WS_VISIBLE, 12,59,111,1
}

ALL_ONE DIALOG LOADONCALL MOVEABLE DISCARDABLE 35,31,132,60
STYLE DS_MODALFRAME ¶WS_POPUP ¶WS_CAPTION ¶WS_SYSMENU
CAPTION "CMCCODE - Encode Filename"
FONT 8,"MS Sans Serif"
{
EDITTEXT 101,28,23,75,12,ES_AUTOHSCROLL ¶WS_BORDER ¶WS_TABSTOP
```

```
DEFPUSHBUTTON "OK",1,12,42,45,13
PUSHBUTTON "Cancel",2,75,42,45,13
CTEXT "Enter a filename for ALL the files:",-1,6,7,120,9
}

BASE64_MODE DIALOG LOADONCALL MOVEABLE DISCARDABLE 93,54,111,69
STYLE DS_MODALFRAME ¦WS_POPUP ¦WS_CAPTION ¦WS_SYSMENU
CAPTION "BASE64 Method"
FONT 8,"MS Sans Serif"
§
DEFPUSHBUTTON "OK",1,6,51,45,13
RADIOBUTTON "&MIME Conformant",323,12,10,87,12,BS_AUTORADIOBUTTON ¦WS_GROUP ¦WS_TABSTOP
RADIOBUTTON "&Raw BASE 64",324,12,25,87,12,BS_AUTORADIOBUTTON ¦WS_TABSTOP
PUSHBUTTON "Cancel",2,60,51,45,13
GROUPBOX "",106,6,2,99,42,BS_GROUPBOX CHOOSE_V DIALOG LOADONCALL MOVEABLE DISCARDABLE 15,20,174,78
STYLE DS_MODALFRAME ¦WS_POPUP ¦WS_CAPTION ¦WS_SYSMENU
CAPTION "Select a Report File Viewer"
FONT 8,"MS Sans Serif"
§
DEFPUSHBUTTON "OK",1,36,60,45,13
RADIOBUTTON "&Wincode Internal File Viewer (32K Max.)",701,12,10,150,12,BS_AUTORADIOBUTTON ¦WS_GROUP ¦WS_TABSTOP
RADIOBUTTON "Windows &Notepad",702,12,24,150,12,BS_AUTORADIOBUTTON ¦WS_TABSTOP
RADIOBUTTON "&Other:",703,12,38,33,12,BS_AUTORADIOBUTTON ¦WS_TABSTOP
EDITTEXT 704,48,38,102,12,ES_AUTOHSCROLL ¦WS_BORDER ¦WS_TABSTOP
PUSHBUTTON "?",705,153,38,12,13
PUSHBUTTON "Cancel",2,93,60,45,13
GROUPBOX "",101,6,2,162,54,BS_GROUPBOX CLEAN_DIR DIALOG LOADONCALL MOVEABLE DISCARDABLE 52,51,228,162
STYLE DS_MODALFRAME ¦WS_POPUP ¦WS_CAPTION ¦WS_SYSMENU
CAPTION "Clean Directories"
FONT 8,"MS Sans Serif"
§
DEFPUSHBUTTON "OK",1,92,143,45,13
CHECKBOX "",601,12,19,192,12,BS_AUTOCHECKBOX ¦WS_TABSTOP
PUSHBUTTON "?",605,207,19,12,13
```

```
CHECKBOX    "",602,12,34,192,12,BS_AUTOCHECKBOX  | WS_TABSTOP
PUSHBUTTON  "?",606,207,34,12,13
CHECKBOX    "",603,12,49,192,12,BS_AUTOCHECKBOX  | WS_TABSTOP
PUSHBUTTON  "?",607,207,49,12,13
CHECKBOX    "",604,12,64,192,12,BS_AUTOCHECKBOX  | WS_TABSTOP
PUSHBUTTON  "?",608,207,64,12,13
CHECKBOX    "Empty the &Clipboard (release global memory)",612,12,102,192,12,BS_AUTOCHECKBOX  | WS_TABSTOP
PUSHBUTTON  "?",613,207,102,12,13
PUSHBUTTON  "Clean &All Directories",614,12,120,96,13
PUSHBUTTON  "&Report Files Only (*.rpt)",615,120,120,96,13
PUSHBUTTON  "Cancel",2,165,143,45,13
PUSHBUTTON  "&Help",611,19,143,45,13
GROUPBOX    "Select Directories to Clean",101,7,5,216,93,BS_GROUPBOX
LTEXT       "Status:",-1,12,83,27,8
LTEXT       "",610,42,83,177,8

DEC_CONFIG DIALOG LOADONCALL MOVEABLE DISCARDABLE 26,26,250,147
STYLE DS_MODALFRAME | WS_POPUP | WS_CAPTION | WS_SYSMENU
CAPTION "Decode Options"
FONT 8,"MS Sans Serif"

DEFPUSHBUTTON "OK",1,195,9,45,13
CHECKBOX    "Du&mp Files",301,12,9,69,12,BS_AUTOCHECKBOX  | WS_TABSTOP
CHECKBOX    "&Run Decoded",302,12,21,69,12,BS_AUTOCHECKBOX  | WS_TABSTOP
CHECKBOX    "&Error Checking",303,87,9,72,12,BS_AUTOCHECKBOX  | WS_TABSTOP
CHECKBOX    "Sort b&y Extension",304,87,21,72,12,BS_AUTOCHECKBOX  | WS_TABSTOP
PUSHBUTTON  "E&xtension(s)...",305,6,42,66,13
COMBOBOX    306,120,41,42,60,CBS_DROPDOWNLIST | WS_VSCROLL | WS_TABSTOP
EDITTEXT    307,12,70,132,9,ES_AUTOHSCROLL | NOT WS_BORDER | WS_TABSTOP
PUSHBUTTON  "?",308,147,67,12,13
RADIOBUTTON "Def&ault to location of Input file",309,12,99,132,12,BS_AUTORADIOBUTTON  | WS_GROUP | WS_TABSTOP
RADIOBUTTON "User select &on Decode",310,12,112,132,12,BS_AUTORADIOBUTTON  | WS_TABSTOP
RADIOBUTTON "&Set:",311,12,125,27,12,BS_AUTORADIOBUTTON  | WS_TABSTOP
EDITTEXT    312,42,125,102,12,ES_AUTOHSCROLL | WS_BORDER | WS_TABSTOP
PUSHBUTTON  "?",313,147,124,12,13
RADIOBUTTON "&Wincode select",314,174,110,66,12,BS_AUTORADIOBUTTON  | WS_GROUP | WS_TABSTOP
RADIOBUTTON "&User select",315,174,125,66,12,BS_AUTORADIOBUTTON  | WS_TABSTOP
PUSHBUTTON  "Cancel",2,195,27,45,13
```

```
PUSHBUTTON   "&Defaults",316,195,45,45,13
PUSHBUTTON   "&Help",317,195,63,45,13
GROUPBOX     "Decoded File Name",102,168,96,75,45,BS_GROUPBOX
LTEXT        "Code Type:",-1,78,44,39,8
GROUPBOX     "Decoded File Directory",101,6,87,156,54,BS_GROUPBOX
CONTROL      "",-1,"STATIC",SS_BLACKFRAME | WS_CHILD | WS_VISIBLE, 6,6,156,30
GROUPBOX     "Temp Directory",103,6,59,156,24,BS_GROUPBOX
}

DEC_EXT DIALOG LOADONCALL MOVEABLE DISCARDABLE 49,30,144,133
STYLE DS_MODALFRAME | WS_POPUP | WS_CAPTION | WS_SYSMENU
CAPTION "Decode File Extension(s)"
FONT 8,"MS Sans Serif"
{
EDITTEXT     318,12,25,45,12,ES_AUTOHSCROLL | WS_BORDER | WS_TABSTOP
PUSHBUTTON   "&Add",320,12,43,45,13
PUSHBUTTON   "&Delete",321,12,61,45,13
PUSHBUTTON   "A&ssociate",322,12,79,45,13
LISTBOX      319,73,26,58,69,LBS_NOTIFY | WS_BORDER | WS_BORDER | WS_VSCROLL
DEFPUSHBUTTON "OK",1,18,115,45,13
PUSHBUTTON   "Cancel",2,81,115,45,13
LTEXT        "Enter Decode Extension: (Max + 20)",-1,12,13,120,8
CONTROL      "",-1,"STATIC",SS_BLACKFRAME | WS_CHILD | WS_VISIBLE, 6,6,132,102
LTEXT        "Ext.Count:",-1,73,95,39,8
LTEXT        "" 323,114,95,16,8
}

DEL_FILES DIALOG LOADONCALL MOVEABLE DISCARDABLE 63,20,78,127
STYLE DS_MODALFRAME | WS_OVERLAPPED | WS_CAPTION | WS_SYSMENU
FONT 8,"Helv"
{
DEFPUSHBUTTON "OK",2,16,108,45,13
LISTBOX      609,7,19,64,82,LBS_STANDARD | WS_TABSTOP
CTEXT        "Files being deleted:",-1,4,7,69,10
}

DIR_SELECT DIALOG LOADONCALL MOVEABLE DISCARDABLE 15,20,147,116
STYLE DS_MODALFRAME | WS_OVERLAPPED | WS_CAPTION | WS_SYSMENU
FONT 8,"Helv"
{
EDITTEXT     101,42,5,98,12,ES_AUTOHSCROLL | WS_BORDER | WS_TABSTOP
```

```
DEFPUSHBUTTON  "OK",1,88,22,50,14
LISTBOX  103,6,30,64,82,LBS_STANDARD  ¶WS_TABSTOP
PUSHBUTTON  "Cancel",2,88,41,50,14
LTEXT  "D&irectories:",-1,6,18,64,10
LTEXT  "&Directory:",-1,6,6,36,10
}
DONE DIALOG LOADONCALL MOVEABLE DISCARDABLE 21,32,207,54
STYLE DS_MODALFRAME  ¶WS_POPUP  ¶WS_CAPTION  ¶WS_SYSMENU
CAPTION  "CMCCODE - Done!"
FONT 8, "MS Sans Serif"
§
CTEXT  "",101,12,14,184,9
CONTROL  "",-1,"STATIC",SS_BLACKFRAME  ¶WS_CHILD  ¶WS_VISIBLE, 6,6,195,25
DEFPUSHBUTTON  "OK",2,64,36,78,13
}
DONE_SHOW DIALOG LOADONCALL MOVEABLE DISCARDABLE 21,32,207,54
STYLE DS_MODALFRAME  ¶WS_POPUP  ¶WS_CAPTION  ¶WS_SYSMENU
CAPTION  "CMCCODE - Done!"
FONT 8, "MS Sans Serif"
§
DEFPUSHBUTTON  "OK",2,18,36,78,13
PUSHBUTTON  "&View Report File",1,111,36,78,13
CTEXT  "",101,12,14,184,9
CONTROL  "",-1,"STATIC",SS_BLACKFRAME  ¶WS_CHILD  ¶WS_VISIBLE, 6,6,195,25
}
DRAGDROP DIALOG LOADONCALL MOVEABLE DISCARDABLE 119,85,139,110
STYLE DS_MODALFRAME  ¶WS_POPUP  ¶WS_CAPTION  ¶WS_SYSMENU
CAPTION  "Interactive Drag & Drop"
FONT 8, "MS Sans Serif"
§
DEFPUSHBUTTON  "OK",1,18,92,45,13
RADIOBUTTON  "&Encode",802,13,39,48,12,BS_AUTORADIOBUTTON  ¶WS_GROUP  ¶WS_TABSTOP
RADIOBUTTON  "&Decode",803,13,53,48,12,BS_AUTORADIOBUTTON  ¶WS_TABSTOP
RADIOBUTTON  "E&xt. Based",804,13,67,48,12,BS_AUTORADIOBUTTON  ¶WS_TABSTOP
CHECKBOX  "&Zip First",805,75,39,54,12,BS_AUTOCHECKBOX  ¶WS_TABSTOP
CHECKBOX  "U&NZIP After",806,75,53,54,12,BS_AUTOCHECKBOX  ¶WS_TABSTOP
CHECKBOX  "&Winsort First",807,75,67,54,12,BS_AUTOCHECKBOX  ¶WS_TABSTOP
PUSHBUTTON  "Cancel",2,75,92,45,13
}
```

```
GROUPBOX    "Drop to:",101,7,26,57,57,BS_GROUPBOX
GROUPBOX    "Options:",102,70,26,63,57,BS_GROUPBOX
COMBOBOX    801,69,7,64,66,CBS_DROPDOWNLIST | WS_VSCROLL | WS_TABSTOP
LTEXT       "CMC Method:",-1,6,10,60,8

ENC_CONFIG DIALOG LOADONCALL MOVEABLE DISCARDABLE 10,23,262,189
STYLE DS_MODALFRAME | WS_POPUP | WS_CAPTION | WS_SYSMENU
CAPTION "Encode Options"
FONT 8, "MS Sans Serif"

DEFPUSHBUTTON "OK",1,206,9,46,13
CHECKBOX    "&Line CheckSums",201,12,9,72,12,BS_AUTOCHECKBOX | WS_TABSTOP
CHECKBOX    "&File CheckSums",202,12,24,72,12,BS_AUTOCHECKBOX | WS_TABSTOP
CHECKBOX    "Fil&e Headers",203,12,39,72,12
CHECKBOX    "File Desc&ription",204,12,54,72,12,BS_AUTOCHECKBOX | WS_TABSTOP
CHECKBOX    "Des&criptive Name",205,12,69,72,12,BS_AUTOCHECKBOX | WS_TABSTOP
CHECKBOX    "I&nclude Table",206,90,9,72,12,BS_AUTOCHECKBOX | WS_TABSTOP
CHECKBOX    "Make E&MBL Files",207,90,24,72,12
CHECKBOX    "Sin&gle File",208,90,39,72,12
CHECKBOX    "All &In One File",209,90,54,72,12
CHECKBOX    "Number b&y Ext.",210,90,69,72,12
EDITTEXT    211,123,90,42,12
EDITTEXT    212,123,107,42,12
RADIOBUTTON "Def&ault to location of input file",213,12,138,132,12,BS_AUTORADIOBUTTON | WS_GROUP | WS_TABSTOP
RADIOBUTTON "User select &on Encode",214,12,152,132,12,BS_AUTORADIOBUTTON | WS_TABSTOP
RADIOBUTTON "&Set:",215,12,166,27,12,BS_AUTORADIOBUTTON | WS_TABSTOP
EDITTEXT    216,42,166,105,12,ES_AUTOHSCROLL | WS_BORDER | WS_TABSTOP
PUSHBUTTON  "?",217,150,166,12,13
COMBOBOX    218,213,90,42,57,CBS_DROPDOWNLIST | WS_VSCROLL | WS_TABSTOP
COMBOBOX    219,213,107,42,39,CBS_DROPDOWNLIST | WS_VSCROLL | WS_TABSTOP
RADIOBUTTON "&Wincode select",220,177,148,69,12,BS_AUTORADIOBUTTON | WS_GROUP | WS_TABSTOP
RADIOBUTTON "&User select",221,177,164,69,12,BS_AUTORADIOBUTTON | WS_TABSTOP
PUSHBUTTON  "Cancel",2,206,27,46,13
PUSHBUTTON  "&Default",222,206,45,46,13
PUSHBUTTON  "&Help",223,206,63,46,13
CONTROL     "",-1,"STATIC",SS_BLACKFRAME | WS_CHILD | WS_VISIBLE, 6,6,159,78
LTEXT       "Bytes per File (Lines/File):", 103,6,93,114,8
LTEXT       "Extension for Encoded Files:",104,6,110,108,8
```

```
GROUPBOX  "Encoded File Name",102,171,132,84,51,BS_GROUPBOX
GROUPBOX  "Encoded File Directory",101,6,123,159,60,BS_GROUPBOX
LTEXT  "Code Type:",105,171,93,39,8
LTEXT  "File Type:",-1,171,110,39,8

EXT_INFO DIALOG LOADONCALL MOVEABLE DISCARDABLE 76,55,207,111
STYLE DS_MODALFRAME ¶WS_POPUP ¶WS_CAPTION ¶WS_SYSMENU
CAPTION "More About CMCCODE"
FONT 8, "MS Sans Serif"
§
DEFPUSHBUTTON  "OK",2,81,93,45,13
CONTROL  "",-1,"STATIC",SS_BLACKFRAME ¶WS_CHILD ¶WS_VISIBLE, 6,6,195,81
CONTROL  "",-1,"STATIC",SS_BLACKFRAME ¶WS_CHILD ¶WS_VISIBLE, 13,57,180,1
LTEXT  "CMCCODE Version:",-1,15,12,72,8
LTEXT  "WCodeDLL Version:",-1,15,23,72,8
LTEXT  "HookDLL Version:",-1,15,34,72,8
LTEXT  "Release Date:",-1,15,45,72,8
LTEXT  "Memory:",-1,15,62,72,8
LTEXT  "System Resources:",-1,15,73,72,8
LTEXT  "",701,90,12,105,8
LTEXT  "",702,90,23,105,8
LTEXT  "",703,90,34,105,8
LTEXT  "",704,90,45,105,8
LTEXT  "",705,90,62,105,8
LTEXT  "",706,90,73,105,8

EXT_INFO DIALOG LOADONCALL MOVEABLE DISCARDABLE 76,55,207,111
STYLE DS_MODALFRAME ¶WS_POPUP ¶WS_CAPTION ¶WS_SYSMENU
CAPTION "More About CMCCODE"
FONT 8, "MS Sans Serif"
§
DEFPUSHBUTTON  "OK",2,81,93,45,13
CONTROL  "",-1,"STATIC",SS_BLACKFRAME ¶WS_CHILD ¶WS_VISIBLE, 6,6,195,81
CONTROL  "",-1,"STATIC",SS_BLACKFRAME ¶WS_CHILD ¶WS_VISIBLE, 13,57,180,1
LTEXT  "CMCCODE Version:",-1,15,12,72,8
LTEXT  "WCodeDLL Version:",-1,15,23,72,8
LTEXT  "HookDLL Version:",-1,15,34,72,8
LTEXT  "Release Date:",-1,15,45,72,8
```

```
LTEXT "Memory:",-1,15,62,72,8
LTEXT "System Resources:",-1,15,73,72,8
LTEXT "",701,90,12,105,8
LTEXT "",702,90,23,105,8
LTEXT "",703,90,34,105,8
LTEXT "",704,90,45,105,8
LTEXT "",705,90,62,105,8
LTEXT "",706,90,73,105,8
}
FILE_O_ZIP DIALOG LOADONCALL MOVEABLE DISCARDABLE 40,20,202,130
STYLE DS_MODALFRAME ¶ WS_OVERLAPPED ¶ WS_CAPTION ¶ WS_SYSMENU
FONT 8,"Helv"
{
EDITTEXT 100,42,6,98,12,ES_AUTOHSCROLL ¶ WS_BORDER ¶ WS_TABSTOP
DEFPUSHBUTTON "OK",1,146,5,50,14
LISTBOX 102,6,44,64,82,LBS_STANDARD ¶ LBS_MULTIPLESEL ¶ LBS_EXTENDEDSEL ¶ WS_TABSTOP
LISTBOX 103,76,44,64,82,LBS_STANDARD ¶ WS_TABSTOP
PUSHBUTTON "&All Files",104,146,45,50,14
PUSHBUTTON "cc &Clipboard",105,146,63,50,14
CHECKBOX "&ZIP First",106,146,81,51,12,BS_AUTOCHECKBOX ¶ WS_TABSTOP
PUSHBUTTON "Cancel",2,146,23,50,14
LTEXT "File&name:",-1,6,8,36,10
LTEXT "Directory:",-1,6,20,36,10
LTEXT "",101,42,20,98,10
LTEXT "&Files:",-1,6,32,64,10
LTEXT "&Directories:",-1,76,32,64,10
PUSHBUTTON "&Options...",107,146,105,50,14
}
FILE_OPEN DIALOG LOADONCALL MOVEABLE DISCARDABLE 40,20,202,130
STYLE DS_MODALFRAME ¶ WS_OVERLAPPED ¶ WS_CAPTION ¶ WS_SYSMENU
FONT 8,"Helv"
{
EDITTEXT 100,42,6,98,12,ES_AUTOHSCROLL ¶ WS_BORDER ¶ WS_TABSTOP
DEFPUSHBUTTON "OK",1,146,5,50,14
LISTBOX 102,6,44,64,82,LBS_STANDARD ¶ WS_TABSTOP
LISTBOX 103,76,44,64,82,LBS_STANDARD ¶ WS_TABSTOP
PUSHBUTTON "Cancel",2,146,23,50,14
LTEXT "File&name:",-1,6,8,36,10
```

```
LTEXT "Directory:",-1,6,20,36,10
LTEXT "",101,42,20,98,10
LTEXT "&Files:",-1,6,32,64,10
LTEXT "&Directories:",-1,76,32,64,10
}
HEADER_TYPE DIALOG LOADONCALL MOVEABLE DISCARDABLE 93,54,111,81
STYLE DS_MODALFRAME ¶WS_POPUP ¶WS_CAPTION ¶WS_SYSMENU
CAPTION "Header Type"
FONT 8,"MS Sans Serif"
{
DEFPUSHBUTTON "OK",1,6,63,45,13
RADIOBUTTON "&Wincode Standard",224,12,10,87,12,BS_AUTORADIOBUTTON   ¶WS_GROUP ¶WS_TABSTOP
RADIOBUTTON "&MIME Conformant",225,12,25,87,12,BS_AUTORADIOBUTTON   ¶WS_TABSTOP
PUSHBUTTON "Cancel",2,60,63,45,13
GROUPBOX "",106,6,2,99,54,BS_GROUPBOX
CHECKBOX "&Guess Content-Type",226,12,40,87,12,BS_AUTOCHECKBOX ¶WS_TABSTOP
}
HOOK_APP DIALOG LOADONCALL MOVEABLE DISCARDABLE 10,74,277,117
STYLE DS-MODALFRAME ¶WS_POPUP ¶WS_CAPTION ¶WS_SYSMENU
CAPTION "Hook Application Options"
FONT 8,"MS Sans Serif"
{
DEFPUSHBUTTON "OK",1,222,9,45,13
EDITTEXT 901,75,6,135,12,ES_AUTOHSCROLL ¶WS_BORDER ¶WS_TABSTOP
EDITTEXT 902,75,24,120,12,ES_AUTOHSCROLL ¶WS_BORDER ¶WS_TABSTOP
PUSHBUTTON "?",903,198,24,12,13
CHECKBOX "&Case Sensitive Application Name",904,80,45,126,12,BS_AUTOCHECKBOX ¶WS_TABSTOP
CHECKBOX "&Prompt for Application on Hook",905,80,57,126,12,BS_AUTOCHECKBOX ¶WS_TABSTOP
CHECKBOX "H&ide Wincode when Hooked",906,80,69,126,12,BS_AUTOCHECKBOX ¶WS_TABSTOP
CHECKBOX "&Auto-Hook Wincode on Startup",907,80,81,126,12,BS_AUTOCHECKBOX ¶WS_TABSTOP
PUSHBUTTON "&Tune...",910,222,97,45,13
PUSHBUTTON "Cancel",2,222,27,45,13
PUSHBUTTON "&Default",908,222,45,45,13
PUSHBUTTON "&Help",909,222,63,45,13
LTEXT "Application Name:",-1,7,10,66,8
LTEXT "Application Path:",-1,7,27,66,8
CONTROL "",-1,"STATIC",SS_BLACKFRAME ¶WS_CHILD ¶WS_VISIBLE, 75,42,135,54
ICON "THOOK_ICON",-1,27,69,18,20
}
```

35

```
LTEXT "Advanced Options:",-1,7,45,66,8
LTEXT "If you are having problems Hooking an application, try this ----c",-1,7,100,213,8
†
HOOK_TUNE DIALOG LOADONCALL MOVEABLE DISCARDABLE 81,74,151,96
STYLE DS_MODALFRAME ¶WS_POPUP ¶WS_CAPTION ¶WS_SYSMENU
CAPTION "Hook Tuning"
FONT 8, "MS Sans Serif"
§
DEFPUSHBUTTON "OK",1,24,78,45,13
CHECKBOX "&Create Window List on Hook",911,12,11,126,12,BS_AUTOCHECKBOX ¶WS_TABSTOP
CHECKBOX "&Skip Opening Window",912,12,25,90,12,BS_AUTOCHECKBOX ¶WS_TABSTOP
EDITTEXT 913,108,39,30,12
COMBOBOX 914,108,54,30,39,CBS_DROPDOWNLIST ¶WS_TABSTOP
PUSHBUTTON "Cancel",2,81,78,45,13
CONTROL "",-1,"STATIC",SS_BLACKFRAME ¶WS_CHILD ¶WS_VISIBLE, 6,6,138,66
LTEXT "Set Hook Delay (seconds):",-1,12,42,93,8
LTEXT "Set Hook Menu Range:",-1,12,57,93,8
†
MEMORY_SWAP DIALOG LOADONCALL MOVEABLE DISCARDABLE 63,65,132,66
STYLE DS_MODALFRAME ¶WS_POPUP ¶WS_CAPTION ¶WS_SYSMENU
CAPTION "CMCCODE - Memory Swap"
FONT 8, "MS Sans Serif"
§
EDITTEXT 101,37,30,28,12,ES_AUTOHSCROLL ¶WS_BORDER ¶WS_TABSTOP
DEFPUSHBUTTON "OK",1,12,48,45,13
PUSHBUTTON "Cancel",2,75,48,45,13
CTEXT "Enter a memory allocation swap",-1,6,7,120,9
CTEXT "value(range + 256KB to 16MB):",-1,6,16,120,9
LTEXT "KBytes",-1,68,32,27,8
†
OP_TOOLBAR DIALOG LOADONCALL MOVEABLE DISCARDABLE 102,57,104,112
STYLE WS_POPUP ¶WS_VISIBLE ¶WS_CAPTION ¶WS_SYSMENU
CAPTION "Options Toolbar"
FONT 8, "MS Sans Serif"
§
PUSHBUTTON "&Encode..."1001,-1,0,105,14
PUSHBUTTON "&Decode..."1002,-1,14,105,14
PUSHBUTTON "&Wincode..."1003,-1,28,105,14
```

```
PUSHBUTTON  "W&insort..."1004,-1,42,105,14
PUSHBUTTON  "&Viewer..."1005,-1,56,105,14
PUSHBUTTON  "&ZIP/UNZIP...",1006,-1,70,105,14
PUSHBUTTON  "&Hook App..."1007,84,105,14
PUSHBUTTON  "E&xit Toolbar",2,-1,98,105,14
}

ORDER_HELP DIALOG LOADONCALL MOVEABLE DISCARDABLE 61,21,228,258
STYLE DS_MODALFRAME ¶WS_POPUP ¶WS_CAPTION ¶WS_SYSMENU
CAPTION "Ordering the Help file"
FONT 8,"MS Sans Serif"
{
DEFPUSHBUTTON "THANKS!",2,77,240,75,13
LTEXT "To order the Wincode Help file, send $5.00(U.S. Dollars) to: -1,13,9,204,8
CTEXT "CMC Interactive*xAE", -1,58,21,114,8
CTEXT "8 S. Michigan Ave.",-1,58,29,114,8
CTEXT "Suite 2003",-1,58,37,114,8
CTEXT "Chicago,IL 60606",-1,58,45,114,8
LTEXT "This price and address are guaranteed until 6/1/95.  If you",-1,13,57,204,8
LTEXT "wish to obtain the Help file after this date, please e-mail",-1,13,65,204,8
LTEXT "first for updated information.  Make checks payable to:",-1,13,73,204,8
CTEXT "CMC Interactive", -1,13,83,204,8
LTEXT "By ordering Help, you obtain the following:",-1,13,112,204,8
LTEXT " 1)The most recent version of Wincode with the Help file",-1,13,122,204,8
LTEXT " 2)Directly e-mailed pre-releases of future versions of",-1,13,130,204,8
LTEXT "    Wincode and the Help file",-1,13,138,204,8
LTEXT " 3)E-mail (only) technical support", -1,13,146,204,8
LTEXT "All files will be ELECTRONICALLY MAILED to you.  If you",-1,13,162,204,8
LTEXT "wish to have something sent through the US Postal service,",-1,13,170,204,8
LTEXT "please include a Self-Addressed-STAMPED Disk Mailer AND",-1,13,178,204,8
LTEXT "Disk with your order.  Multi-User pricing is available.",-1,13,186,204,8
LTEXT " Main Internet Address: cmcinter@suba.com", -1,13,203,204,8
LTEXT " America Online: cmcinter@aol.com", -1,13,214,204,8
CONTROL "",-1,"STATIC",SS_BLACKFRAME ¶WS_CHILD ¶WS_VISIBLE, 6,6,216,228
ICON "MAIN_ICON",-1,25,27,18,20,SS_ICON ¶WS_GROUP
ICON "ORDER_HELP_ICON", -1,187,27,18,20,SS_ICON ¶WS_GROUP
CTEXT "PLEASE" include a LEGIBLE E-MAIL address with all orders.",-1,13,98,204,8
CONTROL "",-1,"STATIC",SS_BLACKFRAME ¶WS_CHILD ¶WS_VISIBLE, 16,158,198,1
CONTROL "",-1,"STATIC",SS_BLACKFRAME ¶WS_CHILD ¶WS_VISIBLE, 16,93,198,1
```

```
CONTROL "",-1,"STATIC",SS_BLACKFRAME ¶WS_CHILD ¶WS_VISIBLE, 16,109,198,1

SEQUENCE DIALOG LOADONCALL MOVEABLE DISCARDABLE 27,37,237,147
STYLE DS_MODALFRAME ¶WS_POPUP¶ WS_CAPTION ¶WS_SYSMENU
CAPTION "Concatenate Files"
FONT 8,"MS Sans Serif"
§
EDITTEXT 750,6,16,168,12
DEFPUSHBUTTON "OK",1,183,9,45,13
PUSHBUTTON "-c &Encode",756,183,67,45,13
PUSHBUTTON "-c &Decode",757,183,85,45,13
LISTBOX 751,6,44,64,82,LBS_STANDARD ¶WS_TABSTOP
PUSHBUTTON "-c",752,77,65,18,13
PUSHBUTTON "_-",753,77,88,18,13
LISTBOX 754,111,44,64,82,LBS_STANDARD ¶WS_TABSTOP
PUSHBUTTON "Cancel",2,183,27,45,13
PUSHBUTTON "&Help",755,183,45,45,13
LTEXT "Concatenate all files into:",-1,6,6,87,8
LTEXT "Files:",-1,6,33,63,8
LTEXT "Sequence:",-1,111,33,63,8
CTEXT "1",-1,99,45,10,8
CTEXT "2",-1,99,53,10,8
CTEXT "3",-1,99,61,10,8
CTEXT "4",-1,99,69,10,8
CTEXT "5",-1,99,77,10,8
CTEXT "6",-1,99,85,10,8
CTEXT "7",-1,99,93,10,8
CTEXT "8",-1,99,101,10,8
CTEXT "9",-1,99,109,10,8
RTEXT "...",-1,99,117,10,8
LTEXT "Status:",-1,6,132,27,8
LTEXT "",758,36,132,195,8
PUSHBUTTON "cc",759,77,45,18,13
PUSHBUTTON "_",760,77,109,18,13
LTEXT "Count:",-1,183,118,24,8
LTEXT "",761,210,118,21,8
LTEXT "File",-1,183,109,48,8
```

```
WIN_CONFIG DIALOG LOADONCALL MOVEABLE DISCARDABLE 25,21,267,186
STYLE DS_MODALFRAME ¶WS_POPUP ¶WS_CAPTION ¶WS_SYSMENU
CAPTION "CMCCODE Options"
FONT 8,"MS Sans Serif"
§
DEFPUSHBUTTON "OK",1,213,9,45,13
CHECKBOX "C&reate Report File",401,12,9,78,12,BS_AUTOCHECKBOX ¶WS_TABSTOP
CHECKBOX "St&art as Icon",402,12,23,78,12,BS_AUTOCHECKBOX ¶WS_TABSTOP
CHECKBOX "Auto File & Overwrite",403,12,37,78,12,BS_AUTOCHECKBOX ¶WS_TABSTOP
CHECKBOX "A&lwaysOn Top",405,93,9,75,12,BS_AUTOCHECKBOX ¶WS_TABSTOP
CHECKBOX "Close When Do&ne",406,93,23,75,12,BS-AUTOCHECKBOX ¶WS_TABSTOP
CHECKBOX "&Memory Swapping",407,93,37,75,12
CHECKBOX "W&insort First",408,93,51,75,12,BS_AUTOCHECKBOX ¶WS_TABSTOP
COMBOBOX 409,117,72,54,39,CBS_DROPDOWNLIST ¶WS_VSCROLL ¶WS_TABSTOP
COMBOBOX 410,117,87,54,39,CBS_DROPDOWNLIST ¶WS_VSCROLL ¶WS_TABSTOP
EDITTEXT 411,12,114,141,9,ES_AUTOHSCROLL ¶NOT WS_BORDER ¶WS_TABSTOP
PUSHBUTTON "?",412,156,110,12,13
EDITTEXT 413,15,156,148,21,ES_MULTILINE ¶WS_BORDER ¶WS_VSCROLL ¶WS_TABSTOP
RADIOBUTTON "&Wincode Default",414,183,94,69,12,BS_AUTORADIOBUTTON ¶WS_GROUP ¶WS_TABSTOP
RADIOBUTTON "&Custom:",415,183,109,39,12,BS_AUTORADIOBUTTON ¶WS_TABSTOP
EDITTEXT 416,224,109,30,12
RADIOBUTTON "&Standard (Default)", 417,183,146,75,12,BS_AUTORADIOBUTTON ¶WS_GROUP ¶WS_TABSTOP
RADIOBUTTON "Cus&tom:",418,183,163,39,12,BS_AUTORADIOBUTTON ¶WS_TABSTOP
EDITTEXT 419,224,163,30,12
CHECKBOX "DOS Attri&butes", 404,12,51,78,12,BS_AUTOCHECKBOX ¶WS_TABSTOP
PUSHBUTTON "Cancel",2,213,27,45,13
PUSHBUTTON "&Defaults",420,213,45,45,13
PUSHBUTTON "&Help",421,213,63,45,13
GROUPBOX "Working Directory",103,6,102,165,24,BS_GROUPBOX
LTEXT "Enter sixty-four valid ASCII characters.",-1,15,145,132,9
CONTROL "",-1,"STATIC",SS_BLACKFRAME ¶WS_CHILD ¶WS_VISIBLE, 6,6,165,60
GROUPBOX "Mode",101,177,81,84,45,BS_GROUPBOX
GROUPBOX "Line Length",102,177,130,84,51,BS_GROUPBOX
GROUPBOX "Code Table",-1,6,130,165,51,BS_GROUPBOX
LTEXT "Interactive Mode Setting:",-1,6,90,90,8
LTEXT "Sound Effects Setting:",-1,6,76,81,8
†
WNS_CONFIG DIALOG LOADONCALL MOVEABLE DISCARDABLE 22,38,255,159
```

```
STYLE DS_MODALFRAME  ¶WS_POPUP  ¶WS_CAPTION  ¶WS_SYSMENU
CAPTION "Winsort Options"
FONT 8, "MS Sans Serif"
{
DEFPUSHBUTTON  "OK",1,201,9,45,13
EDITTEXT  501,42,19,126,12,ES_AUTOHSCROLL  ¶WS_BORDER  ¶WS_TABSTOP
EDITTEXT  502,42,35,126,12,ES_AUTOHSCROLL  ¶WS_BORDER  ¶WS_TABSTOP
CHECKBOX  "&Use Custom BEGIN/END", 503,12,54,123,12,BS_AUTOCHECKBOX  ¶WS_TABSTOP
EDITTEXT  504,12,93,117,9,ES_AUTOHSCROLL  ¶NOT WS_BORDER  ¶WS_TABSTOP
PUSHBUTTON  "?",505,132,89,12,13
EDITTEXT  506,12,121,117,9,ES_AUTOHSCROLL  ¶NOT WS_BORDER  ¶WS_TABSTOP
PUSHBUTTON  "?",507,132,117,12,13
CHECKBOX  "Execute Winsort in Silent & Mode",508,9,140,138,12,BS_AUTOCHECKBOX  ¶WS_TABSTOP
RADIOBUTTON  "&Standard Winsort",509,159,95,75,12,BS_AUTORADIOBUTTON  ¶WS_GROUP ¶WS_TABSTOP
RADIOBUTTON  "Flush &Left ONLY",510,159,110,75,12,BS_AUTORADIOBUTTON  ¶WS_TABSTOP
RADIOBUTTON  "Flush Left and Sort",511,159,125,75,12,BS_AUTORADIOBUTTON  ¶WS_TABSTOP
EDITTEXT  512,216,139,24,12
PUSHBUTTON  "Cancel",2,201,27,45,13
PUSHBUTTON  "&Defaults",513,201,45,45,13
PUSHBUTTON  "&Help",514,201,63,45,13
LTEXT  "END:",-1,12,38,24,8
LTEXT  "BEGIN:",-1,12,22,27,8
GROUPBOX  "Sort Options",101,153,81,96,72,BS_GROUPBOX
GROUPBOX  "Custom BEGIN/END", -1,6,6,168,66,BS_GROUPBOX
GROUPBOX  "Winsort Executable",102,6,81,141,24,BS_GROUPBOX
GROUPBOX  "Winsort Directory",103,6,109,141,24,BS_GROUPBOX
LTEXT  "Flush # Chars:",-1,159,141,54,8

Z_UZ_CONFIG DIALOG LOADONCALL MOVEABLE DISCARDABLE 27,24,240,151
STYLE DS_MODALFRAME  ¶WS_POPUP  ¶WS_CAPTION  ¶WS_SYSMENU
CAPTION "ZIP/UNZIP Options"
FONT 8, "MS Sans Serif"
{
DEFPUSHBUTTON  "OK",1,186,9,45,13
EDITTEXT  601,69,6,90,12,ES_AUTOHSCROLL  ¶WS_BORDER  ¶WS_TABSTOP
PUSHBUTTON  "?",602,162,5,12,13
EDITTEXT  603,69,23,105,12,ES_AUTOHSCROLL  ¶WS_BORDER  ¶WS_TABSTOP
EDITTEXT  604,69,39,90,12,ES_AUTOHSCROLL  ¶WS_BORDER  ¶WS_TABSTOP
```

```
PUSHBUTTON   "?",605,162,38,12,13
EDITTEXT     606,69,55,105,12,ES_AUTOHSCROLL  | WS_BORDER  | WS_TABSTOP
EDITTEXT     607,102,71,33,12
RADIOBUTTON  "Def&ault to location of input file",608,12,100,132,12,BS_AUTORADIOBUTTON   | WS_GROUP  | WS_TABSTOP
RADIOBUTTON  "User select &on UNZIP",609,12,114,132,12,BS_AUTORADIOBUTTON   | WS_TABSTOP
RADIOBUTTON  "&Set:",610,12,128,27,12,BS_AUTORADIOBUTTON   | WS_TABSTOP
EDITTEXT     611,42,128,99,12,ES_AUTOHSCROLL  | WS_BORDER  | WS_TABSTOP
PUSHBUTTON   "?",612,144,128,12,13
RADIOBUTTON  "&Normal",613,171,100,57,12,BS_AUTORADIOBUTTON   | WS_GROUP  | WS_TABSTOP
RADIOBUTTON  "&Minimized",614,171,114,57,12,BS_AUTORADIOBUTTON   | WS_TABSTOP
RADIOBUTTON  "Hidd&en",615,171,128,57,12,BS_AUTORADIOBUTTON   | WS_TABSTOP
PUSHBUTTON   "Cancel",2,186,27,45,13
PUSHBUTTON   "&Defaults",616,186,45,45,13
PUSHBUTTON   "&Help",617,186,63,45,13
GROUPBOX     "UNZIPped File(s) Directory", 101,6,87,153,57,BS_GROUPBOX
GROUPBOX     "Show Options", 102,165,87,69,57,BS_GROUPBOX
LTEXT        "ZIP Filename:",-1,6,10,57,8
LTEXT        "ZIP Param(s):", -1,6,26,57,8
LTEXT        "UNZIP Filename:",-1,6,42,60,8
LTEXT        "UNZIP Param(s):", -1,6,58,60,8
LTEXT        "Extension for ZIPped Files:",-1,6,74,93,8

ZIP_NAME DIALOG LOADONCALL MOVEABLE DISCARDABLE 35,31,132,60
STYLE DS_MODALFRAME  | WS_POPUP  | WS_CAPTION  | WS_SYSMENU
CAPTION "CMCCODE - ZIP Filename"
FONT 8, "MS Sans Serif"

EDITTEXT     101,31,23,51,12,ES_AUTOHSCROLL  | WS_BORDER  | WS_TABSTOP
DEFPUSHBUTTON "OK",1,12,42,45,13
PUSHBUTTON   "Cancel",2,75,42,45,13
CTEXT        "Enter a filename for the ZIP archive:",-1,4,7,123,9
LTEXT        "",102,84,25,24,8

STRINGTABLE LOADONCALL MOVEABLE DISCARDABLE

101, "Encode a data file..."
102, "Decode a data file..."
103, "Concatenate multiple files into a single file (specific ordering)..."
```

104, "View a Wincode Report file..."
105, "Clean Wincode directories by deleting files..."
106, "Set Encode options..."
107, "Set Decode options..."
108, "Set General Wincode options..."
109, "Set Winsort options..."
110, "Select a Report File viewer..."
111, "Set PKZIP/UNZIP options..."
}

STRINGTABLE LOADONCALL MOVEABLE DISCARDABLE
{
112, "Set the Application Hook options..."
113, "Wincode Help Contents..."
114, "Help file Keyword Search..."
115, "Help on using Windows Help files..."
116, "Wincode Internet Frequency Asked Questions..."
117, "Legal Copyrights for files..."
118, "Information on ordering the Wincode Help file..."
119, "Version and Author information..."
121, "Set Wincode Interactive Drag & Drop Mode..."
122, "Hook the Wincode Menu into a selected application..."
123, "Select the Options Toolbar to configure Wincode..."
124, "Exit the Wincode program..."
125, "Stop the current Operation..."
126, "Quit the entire Operation..."
127, "Encode, Decode, Exit..."
}

STRINGTABLE LOADONCALL MOVEABLE DISCARDABLE
{
128, "Concat, View, Clean, Drag&Drop Mode, Hook..."
129, "Encode, Decode, Wincodt, Winsort, Viewer, PKZIP/UNZIP, Hook App..."
130, "Help and related information..."
}

CLEAN_DOWN ICON LOADONCALL MOVEABLE DISCARDABLE
{
'..'
'..'
'..'
'..'
'..'
}

COPYRIGHT - 1996 PLANET GRAPHICS, INC.

The following is a second software listing for the catcher program of the invention.

```
//--------------------    ---------------------------    ---------------------
    File:           npshell.cpp Advanced Features:
                    * HyperCD HTML cOmmnad (H20) set
                    * stream capture
                    * encryption/decryption
                    * file handling
                    * multimedia io Programmer:     Plugin Empty Shell,              Netscape
                    Encryption/Decryption,           Planet Graphics
                    Multimedia I0                    Planet Graphics
//---------------------------------------------------------------------------
//                              HyperCD
//
// The architecture of HyperCD allows for
// authorized and secure rendering of encrypted multimedia
// from the fastest link. Such media may reside on a HyperCD
// CD-ROM, a server thru broad-band fiber optics or satelite streaming
// for speedy access. The encrypted HyperCD media is protected
// by crippling the media. Only authorized user can obtain
// trigger/keys from the server to unlock the HyperCD media.
//---------------------------------------------------------------------------
//
// The shell file defines a "shell" plugin that can be used as the
// basis for a real plugin. This shell just provides empty
// implementations of all functions that the plugin can implement
// that will be called by Netscape (the NPP_xxx methods defined in
// npapi.h).
//---------------------------------------------------------------------------
#ifndef _WIN32
#define _WIN 32
endif ifndef _NPAPI_H_
include "npapi.h"
#include "plgwnd.h"
#include "CHyperCD.h"
endif // mmio
include <mmsystem.h>
include <qtw.h>
#include <string.h>
#include <io.h>
#include <fcntl.h>
#include <sys/stat.h>
#include "xsystem.h"

LRESULT CALLBACK WndProc (HWND h Wnd, UINT message, WPARAM wParam, LPARAM l Param);
//---------------------------------------------------------------------------
// SysIO:
//---------------------------------------------------------------------------
void SysIO (char *szSYSFILE)
{
char szFileContent [MAXDIRCHAR];
char szMsg [MAX_STR*100];
int hFile, nRead, nFileLength;
int nLoc=0,i,ret;
char *pTemp;
if ( (hFile = _open (szSYSFILE, _O_RDONLY|_O_BINARY, _S_IREAD ) ) | = -1 )
```

```
{nFileLength=(int)_filelength hFile;
nRead = _read (hFile, szFileContent, (unsigned int )nFileLength );
_close ( hFile );
szFileContent[nFileLength-2] = '\0' ;
nFileLength - = 2;
SysFileControl (szFileContent,nFileLength, DEFAULT);
pTemp=szFileContent;

for (i=nDirItem=0; i <MAXDIRITEM; i++)
    {
    ret=sscanf(pTemp, "%s",szMsg);
    if(ret ==0)
        continue;
    else if (ret == EOF)
        break //not newline char
    if ((strcmp (szMsg,"\n") | = 0) && (strlen (szMsg) >0))
        {
        strcpy(Dir[nDirItem], szMsg);
        nDirItem++;
        }
    nLoc=strcspn (pTemp, "\n");
    pTemp = pTemp+nLoc+1;
    if (pTemp > szFileContent+nFileLength)
        break;}
}
else
    {
    MessageBox(NULL,MISSDBFILE, "Error", MB_OK);
    return;}
}
//-----------------------------------------------------------------
NPP_Initialize:
//-----------------------------------------------------------------
NPError NPP_Initialize (void)
{
        return NPERR_NO_ERROR;
}
//-----------------------------------------------------------------
//NPP_Shutdown:
//-----------------------------------------------------------------
void NPP_Shutdown (void)
{
        return;
}
//-----------------------------------------------------------------
// NPP_New:
//-----------------------------------------------------------------
NPError NP_LOADDS
NPP_New (NPMIMEType pluginType,
                        NPP instance,
                        uint 16 mode,
                        int16 argc,
                        char* argn[ ],
                        char* argv [ ],
                        NPSavedData* saved)
{
    if (instance == NULL)
        return NPERR_INVALID_INSTANCE_ERROR;

instance->pdata = NPN_MemAlloc(sizeof(PluginInstance));
PluginInstance* This = (PluginInstance*) instance->pdata;
if (This | = NULL)
```

```
{
This->window = NULL;
This->cHypercd = new CHyperCD( );
This->mode = mode;

This->bAutoStart = FALSE;
This->bLoop = FALSE;

int idx;char msg [MAX_STR], sSYSFILE [MAX_STR];
strcpy(msg," ");
strcpy (sSYSFILE.SYSFILE);
char *p1, *p2, cd_title[MAX_STR];

// parsing the web page embed tag and set hypercd tags
for ( idx =0; idx<argc; idx++)   {
    if (strcmp (strupr (argn [idx] ), "SRC") ==0)
        {
        p2=strstr(strupr (argv[idx]), ".Q");
        if (p2 = = NULL)
                { MessageBox (NULL,argv [idx], "Missing .q in file name", MB_OK);
        return 0;}
while ((*p2 | = '_' )&&(p2> argv[idx]))
        p2--;
if (*p2 == '_')
        {p1= --p2;

while ((*p1 | = '\\' || *p1 | = '/' ) && (p1> argv[idx]))
            p1--;
        for (int i=0;i<=(int) (p2-p1) ;i++)
            cd_title[i]=*(p1+1);
        cd_title[i]='\000' ;
        strcpy (sSYSFILE, "c:\\hypercd\\");
        strcat (sSYSFILE,cd_title);
        strcat (sSYSFILE, ".xdb");
        break;}
    }
}
SysIO (sSYSFILE);

for (idx =0; idx<argc; idx++) {
    if (|strcmpi (argn[idx], "autostart")) {
        if (|strcmpi (argv[idx], "true"))
        {This->bAutoStart = TRUE;
            PGZInfo.tag | = PGZEMBED_AUTO_START;}
    }
    if (|strcmpi (argn[idx], "loop")) {
        if (|strcmpi (argv[idx], "true") )
        {This->bLoop = TRUE;}
    }
    if (|strcmpi(argn[idx], "speaker")) {
        if (|strcmpi (argv[idx], "off"))
        { PGZInfo.tag | = PGZEMBED_NO_SPEAKER;}
}
/* Featres to be implemented
    other HyperCD HTML cOmmnad (H20) set:
    botton=true/false
    desolve/etc
*/
}
instance->pdata = This;     // save my data pointer in the instance pdata pointer
                            // this will be passed back to me in all calls so that I
                            // can extract it later
return NPERR_NO_ERROR;
```

```
    else
        return NPERR_OUT_OF_MEMORY_ERROR;
}
static void UnSubclass(PluginInstance *This)
{
    WNDPROC       OldWndProc;
    WNDPROC*      lplpfn = This->window-> GetSuperWndProcAddr( );

if( |*lplpfn )
    {
        ASSERT(0);
        return;
    }
    // Set the original window procedure
    OldWndProc = (WNDPROC)::SetWindowLong ( This->window->m_hWnd,
                                            GWL_WNDPROC, (LONG) *lplpfn );

// Asubclassed window's procedure is always AfxWndProc.
    // If this is not TRUE, then it's not a subclassed window.
    if (OldWndProc | = AfxWndProc)
        ASSERT (0);
}
static void KillHyperCDWindow (PluginInstance * This)
{
    if (This->cHypercd) {
        This->cHypercd -> Close ( );
        delete This -> cHypercd;
        This->cHypercd = NULL;

// deallocate all QT etc resources
        CleanupMultimedia ( );
    }
    // remove This
    UnSubclass (This);

if (This->window) {
        This->window->Detach ( ) ;
        delete This ->window;
        This->window = NULL;
    }
}
//---------------------------------------------------------------------
// NPP_Destroy:
//---------------------------------------------------------------------
NPError NP_LOADDS
NPP_Destroy (NPP instance, NPSavedData** save)
{
    if (instance == NULL)
        return NPERR_INVALID_INSTANCE_ERROR;

PluginInstance* This = (PluginInstance*) instance->pdata;

//
// Note: If desired, call NP_MemAlloc to create a
// NPSavedData structure containing any state information
// that you want restored if this plugin instance is later
// recreated.
//
```

```
if (This | = NULL)
{KillHyperCDWindow(This);
NPN_MemFree(instance->pdata);}
return NPERR_NO_ERROR;
//----------------------------------------
// NPP_SetWindow:
//----------------------------------------
NPError NP_LOADDS
NPP_SetWindow(NPP instance, NPWindow* np_window)
{
        if (instance == NULL)
            return NPERR_INVALID_INSTANCE_ERROR;

PluginInstance* This = (PluginInstance*) instance->pdata;
    //
    // Note: Before setting fWindow to point to the
    // new window, you may wish to compare the new window
    // info to the previous window (if any) to note window
    // size changes, etc.
    //
    if (|np_window)
       return NPERR_GENERIC_ERROR;

if (|instance)
       return NPERR_INVALID_INSTANCE_ERROR;

if (|This)
       return NPERR_GENERIC_ERROR;

if (|np_window->window && |This->window) // spurious entry
       return NPERR_NO_ERROR;

if(|np_window->window && This->window)
    {   // window went away
        KillHyperCDWindow(This);
        return NPERR_NO_ERROR;} if (|This->window && np_window->window)
    {   // First time in - - no window created by plugin yet
        This->window = (CPluginWindow *) new CPluginWindow ( );
        if (|This->window->SubclassWindow ((HWND) np_window->window))
        {
            MessageBox(NULL, "SubclassWindow Failed", "HyperCD", MB_OK);
            return NPERR_GENERIC_ERROR;
        }
        // Save This pointer in window class member variable..this lets the
        // window message handling have access to the data pointer easily
        This->window->StoreData(This);
    }
    // resize or moved window (or newly created)
    This->window->InvalidateRect(NULL);
    This->window->UpdateWindow( );
    return NPERR_NO_ERROR;
}
//----------------------------------------
//NPP_NewStream:
//----------------------------------------
NPError NP_LOADDS
NPP_NewStream(NPP instance,
                            NPMIMEType type.
```

```
                              NPStream *stream,
                              NPBool seekable,
                              uint16 *stype)
{
    if (instance == NULL)
        return NPERR_INVALID_INSTANCE_ERROR;
    PluginInstance* This = (PluginInstance*) instance->pdata;

*stype = NP_ASFILE:

return NPERR_NO_ERROR;
}
int32 STREAMBUFSIZE = 0X0FFFFFFF;    // If we are reading from a file in NPAsFile
                                      // mode so we can take any size stream in our
                                      // write call (since we ignore it)
//----------------------------------------------------------------
// NPP_WriteReady:
//----------------------------------------------------------------
int32 NP_LOADDS
NPP_WriteReady (NPP instance, NPStream * stream)
{ if (instance | = NULL)
    {
         PluginInstance* This = (PluginInstance*) instance->pdata;
    }
    return STREAMBUFSIZE;    // Number of bytes ready to accept in NPP_Write ( )
}

//----------------------------------------------------------------
// NPP_Write:
//----------------------------------------------------------------
int32 NP_LOADDS
NPP_Write (NPP instance, NPStream *stream, int32 offset, int32 len, void *buffer)
{ if (instance | = NULL)
    {
         PluginInstance* This = (PluginInstance*) instance->pdata;

} return len;           // The number of bytes accepted
}
//----------------------------------------------------------------
//NPP_DestroyStream:
//----------------------------------------------------------------
NPError NP_LOADDS
NPP_DestroyStream (NPP instance, NPStream *stream, NPError reason)
{
    if (instance == NULL)
        return NPERR_INVALID_INSTANCE_ERROR;
    PluginInstance* This = (PluginInstance*) instance->pdata;

return NPERR_NO_ERROR;
}
void GetFileType(char *szFile, LPPGZInfo lpPGZInfo)
{
    // read PGZ file info:size, version,type, etc
    lpPGZInfo = readPGZInfo (szFile,lpPGZInfo)
}
```

```
----------------------------------------------------------------
IOProc:
----------------------------------------------------------------
RESULT CALLBACK IOProc(LPMMIOINFO lpMMIOInfo, UINT uMessage, LPARAM lParam1, LPARAM
lParam2)
{
static BOOL alreadyOpened = FALSE;
PGZINFO PGZInfo;

PGZInfo.p1=lParam1;
PGZInfo.p2=lParam2;

switch (uMessage)
   {
   case MMIOM_OPEN
        if (alreadyOpened)
            return0;
        alreadyOpened = TRUE;

// Determine the size, version, type, etc of the mm file
        GetFileType (MYFILENAME,&PGZInfo);
        PGZIO (PGZIO_OPEN,  PGZInfo, lpMMIOInfo);
        return O;
   case MMIOM_CLOSE
      PGZIO (PGZIO_CLOSE, PGZInfo, lpMMIOInfo);
      alreadyOpened = FALSE;
      return O;
   case MMIOM_READ:
      PGZIO(PGZIO_READ,PGZInfo, lpMMIOInfo);
      return (lParam2);
   case MMIOM_SEEK:
      switch (lParam2)
         {
         case SEEK_SET:
            PGZIO (PGZIO_SEEK_SET,PGZInfo, lpMMIOInfo);
            break;
         case SEEK_CUR:
            PGZIO(PGZIO_SEEK_CUR,PGZInfo, lpMMIOInfo);
         case SEEK_END:
            PGZIO(PGZIO_SEEK_END,PGZInfo, lpMMIOInfo);
            break;
         }
      return lpMMIOInfor->lDiskOffset;
default;
      return -1; // Unexpected msgs.
   }
}//end of IOProc
//------------------------
//------------------------
int movPlayer (CWnd* pWnd, char * lpszCmdParam, PGZInfo pgzInfo )
{
    OSErr     ret;
    LONG      lFlags;
    STRING    message;
    HwND      hWnd;
    int       i;
if (pgzInfo.tflag | = PZGTYPE_QTPGZ && pgzInfo.tflag | = PZGTYPE_QTVIDEO)
      return O;
if (pgzInfo.tflag = = PZGTYPE_QTPGZ)
      InstallQTPGZware( );
hWnd = pWnd->m_hWnd;
```

50

```
//Establish links to QuickTime for Windows
if (QTInitialize (NULL) )
    {MessageBox (NULL, "QTInialize failure", "Error", MB_OK);
    return O;}
// Allocate memory required for playing movies
if (EnterMovies ( ) )
    {MessageBox (NULL, "EnterMovies failure", "Error", MB_OK);
    return O;}
// Instantiate the movie
if (OpenMovieFile (lpszCmdParam, &mfMovie, OF_READ) | = noErr)
    {MessageBox (NULL, "OpenMovieFile failure", "Error", MB_OK);
    return O;}
ret = NewMovieFromFile (&mMovie, mfMovie, NULL, NULL, O, NULL);
if (ret|=O)
    {MessageBox (NULL, "NewMovieFromFile failure", "error", MB_OK);}
ret = CloseMovieFile (mfMovie);
if (ret | = O)
    {MessageBox (NULL, "CloseMovieFile failure", "Error", MB_OK);}

// Instantiate the movie controller
GetMovieBox (mMove, &rcMovie);
OffsetRect (&rcMovie, -rcMovie.left, -rcMovie.top);

mcController = NewMovieController (mMovie, &reMovie,
    mcTopLeftMovie + mcScaleMovieToFit, (hWnd ) );
if ( mcController = = NULL)
    MessageBox (NULL, "NewMovieController failed", "Error", MB_OK);

// Make the movie paused initially
MCDoAction (mcController, mcActionPlay, O);

// Eliminate the grow box
SetRectEmpty (&rcMovie);
MCDoAction (mcController, mcActionSetGrowBoxBounds, &rcMovie);

// now set the controller to the parent
RECT recPlugin;
int left, y_value, w,h;
hWndController = GetWindow(hWnd,GW_CHILD);
SetParent (hWndController, GetParent (hWnd ) );
GetWindowRect (GetParent(hWnd), & recNavigator);
GetWindowRect (hWnd, & recPlugin);
GetWindowRect (hWndController, &rcController);
w=recPlugin.right-recPlugin.left;
h=rcController.bottom-rcController,top;
left = recPlugin.left-recNavigator.left;
y_value =recPlugin.bottom-recNavigator.top;
MoveWindow (hWndController, left, y_value,w,h,1);

// Make the movie active
SetMovieActive (mMove, TRUE);

// Make the main window visible
ShowWindow (hWnd, SW_SHOW);
UpdateWindow (hWnd);

// new make controller visible
McSetVisible (mcController, TRUE);

// Hide the speaker button
if (PGZInfo.tag & PGZEMBED_NO_SPEAKER)
    {
    MCDoAction (mcControlloer, mcActionGetFlags, (LPVOID) &lFlags);
    lFlags | = mcFlagSuppressSpeakerButton;
```

51

```
MCDoAction (mcController, mcActionSetFlags, (LPVOID) lFlags);}
// set auto start
if (PGZInfo.tag& PGZEMBED_AUTO_START)
    {LFIXED lfxRate;
    // Play the movie at the preferred rate
    lfxRate = GetMoviePreferredRate (mMovie);
    MCDoAction (mcController, mcActionPlay, (LPVOID) lfxRate);}
// controller
OldWndProc2 = (WNDPROC) ::SetWindowLong ( (hWnd), GWL_WNDPROC,  (LONG)WndProc );
return 1;
}
//-----------------------------------------------------------------------------
// NPP_StreamAsFile:
//-----------------------------------------------------------------------------
int XtractTrigger (const char *szFile, TRIGGERINFO *pTriggerStructure)
    {
    FILE*      pfFileName1;
    int        n;
/*********************************************
        Open trigger file
*********************************************/
if ((pfFileName1 = fopen (szFile, "rb")) = = NULL)

{MessageBox(NULL, "Error in trigger stream file", "Extract Trigger", MB_OK);
    return –1;}

//************ Decrypt the streamed information:
/*********************************************
        Extract information from the trigger file
        Streamed info:
        Xkey    :   security key
        Dkey    :   pointer to lists of uncrippling data keys.
        Counter :   usage counter
        MaxCounter: allowable usage,
                -1 for permanent ownership
*********************************************/
XtractTrigger(pfFileName1, pTriggerStructure);
/*********************************************
        Close trigger file
*********************************************/
fclose (pfFileName1);
return 0;}
//-----------------------------------------------------------------------------
// NPP_StreamAsFile:
//-----------------------------------------------------------------------------
void NP_LOADDS
NPP_StreamAsFile (NPP instance, NPStream stream, const char* szStream)
    {   int        nTriggerIndex, nType, nRet;
        char       szFile[MAX_STR], szMessage[MAX_STR];
        char       szMsg [MAX_STR];
        char       *pTemp, szPath [MAX_STR];
        STRING     szIniStr;
        FILE       *pfINIFile;
        PGZINFO    PGZInfo;
        TRIGGERINFO TriggerStructure;

if (instance = = NULL)
            return
PluginInstance* This = (PluginInstance*) instance->pdata
if (This->cHypercd)
    {
```

```
//------------------        -------------------------------    --------------------
//                          HyperCD
// The architecture of HyperCD allows for
// authorized and secure rendering of encrypted multimedia
// from the fastest link. Such media may reside on a HyperCD
// CD-ROM, a server thru broad-band fiber optics or satelite streaming
// for speedy access. The encrypted HyperCD media is protected
// by crippling the media. Only authorized user can obtain
// trigger/keys from the server to unlock the HyperCD media.
//-----------------------------------------------------------------------------

// get the initial trigger info
XtractTrigger (szStream, & TriggerStructure);

// security exchange & obtain additional pgz-ware
Xchange (TriggerStructure, &AdditionalStructure);

// assemble pgz-ware, keys, etc
Xssemble (PGZInfo,TriggerStructure, AdditionalStructure);

// obtain HyperCD file path/name/type etc, based upon the trigger/keys etc
getHyperCDInfo (PGZInfo);

// determine the external type of the file
checkFileType (PGZInfo.sFile, &nType);

// take action
if (nType = = HCD_EXE)
    {if (INI_DEBUG )
        MessageBox (NULL,szFile, "Executing...", MB_OK);
    WinExec (szFile, SW_SHOWNORMAL);
    return;}

// pgz type
else if (nType = = HCD_PGZ)
   {
   Prepare PGZIO (szFile);
   GetFileType (szFile,&PGZInfo);

if (PGZInfo.T==PZGTYPE_AVIVIDEO)
          This->cHypercd->Open(This->window,szMsg,"AVIVideo");

else if (PGZInfo.T= = PZGTYPE_QTVIDEO)
           {nRet = movPlayer( This->window, szFile, PGZInfo);
           if (nRet = = 0)//fail to open movie
                   return;}
      }
else if (nType = = HCD_MOV)
           {nRet = movPlayer( This->window, szFile, PGZInfo);
           if (nRet = = 0)//fail to open movie
                   return;}
else if (nType = = HCD_MPG)
           This->cHypercd->Open (This->window,szFile, "MPEGVideo");
else
           This->cHypercd->Open (This->window,szFile, "AVIVideo");

if ( (nType != HCD_PGZ || (PGZInfo.T! = 3) )        //not MOV_PGZ

{if (This->mode = = NP_FULL)
             This ->cHypercd->Center ( );
         This->cHypercd->Update ( ) ;
         This->cHypercd->Start(This->bLoop);}
```

```
//--------------------------------
// NPP_Print:
//--------------------------------
void NP_LOADDS
NPP_Print(NPP instance, NPPrint* printInfo)

if (printInfo == NULL)    // trap invalid parm
            return;

if (instance != NULL)
        {
        PluginInstance* This = (PluginInstance*) instance->pdata;

if (printInfo->mode == NP_FULL)
            {
            // Note: If your plugin would like to take over
            // printing completely when it is in full-screen mode,
            // set printInfor->pluginPrinted to TRUE and print your
            // plugin as you see fit. If your plugin wants Netscape
            // to handle printing in this case, set printInfo->pluginPrinted
            // to FALSE (the default) and do nothing. If you do want
            // to handle printing yourself, printOne is true if the
            // print button (as opposed to the print menu) was clicked.
            // On the Macintosh, platformPrint is a THPrint; on Windows,
            // platformPrint is a structure (defined in npapi.h) containing
            // the printer name, port, etc.
            //
            void* platformPrint = printInfo->print.fullPrint.platformPrint;
            NPBool printOne = printInfo->print.fullPrint.printOne;

printInfo->print.fullPrint.pluginPrinted = FALSE; // Do the default
        }
        else    // If not fullscreen, we must be embedded
        {

// Note: If your plugin is embedded, or is full-screen
            // but you returned false in pluginPrinted above, NPP_Print
            // will be called with mode == NP_EMBED. The NPWindow
            // in the printInfo gives the location and dimensions of
            // the embedded plugin on the printed page. On the Macintosh,
            // platforPrint is the printer port; on Windows, platforPrint
            // is the handle to the printing device context.
            //
            NPWindow* printWindow = &(printInfo->print.embedPrint.window);
            void* platformPrint = printInfo->print.embedPrint.platformPrint;
        }
    }
}

//--------------------------------
// NPP_HandleEvent:
// Mac-only.
//--------------------------------
int16 NPP_HandleEvent(NPP instance, void* event)
{
        NPBool eventHandled = FALSE;
        if (instance == NULL)
            return eventHandled;

PluginInstance* This = (PluginInstance*) instance->pdata;

// Note: The "event" passed in is a Macintosh
        // EventRecord*. The event. what field can be any of the
        // normal Mac event types, or one of the following additional
```

```
// types defined in npapi.h: getFocusEvent, loseFocusEvent,
// adjustCursorEvent. The focus events inform you plugin
// that it will become, or is no longer, the recepient of
// key events. If your plugin doesn't want to receive key
// events, return false when passed at getFocusEvent. The
// adjustCursorEvent is passed repeatedly when the mouse is
// over your plugin; if your plugin doesn't want to set the
// cursor, return false. Handle the standard Mac events as
// normal. The return value for all standard events is currently
// ignored except for the key event: for key events, only return
// true if your plugin has handled that particular key event.
// return eventHandled;
}
//long FAR PASCAL __export WndProc (HWND hWnd, UINT message, WPARAM wParam,LPARAM lParam)
LRESULT CALLBACK WndProc (HWND hWnd, UINT message, WPARAM wParam, LPARAM l Param)
        {
        PAINSTRUCT ps;
        LONG lFlags;
        STRING msg;
        int i;
        RECT recPlugin;
        int left,y_value,w,h;
// Drive the movie controller
    if (MCIsPlayerMessage (mcController, hWnd, message, wParam, lParam) )
        return 0;

// Process the windows message
    switch (message)
        {
        case WM_PAINT;
                Get WindowRect(GetParent(hWnd), &recNavigator);
                GetWindowRect(hWnd,&recPlugin);
                w=recPlugin.right-recPlugin.left;
                h=rcController.bottom-rcController.top;
                left = recPlugin.left-recNavigator.left;
                y_value =recPlugin.bottom-recNavigator.top;
                MoveWindow (hWndController, left,y_value,w,h,1);

if (!BeginPaint (hWnd, &ps) )
                        return 0;
                EndPaint (hWnd, &ps);
                        return 0;

case WM_DESTROY:
                PostQuitMessage (0);
                        return 0;
        }
return DefWindowProc (hWnd, message, wParam, lParam);
}
```

```
------------------------------
        File:   CHyperCD.cpp
    Advanced Features:

This file implements a CHyperCD class which can be used to display
        HyperCD movie files.  This file contains some basic code
        from the Netscape plugin sdk.
------------------------------
include "stdafx.h"
include "CHyperCD.h"
include <mmsystem.h> ifdef WIN32
   #include <digitalv.h>
endif
ifdef_DEBUG
indef THIS_FILE
tatic char BASED_CODE THIS_FILE [ ] = _FILE_;
endif /*----------------------------------
                The constructor
------------------------------
HyperCD::CHyperCD ( )                                                   */
{
        mOpen = FALSE;
        mPlaying = FALSE;
        mDeviceID = O;
        mErrorCode = O;
        mMCIErrorCode = OL;
}
CHyperCD::~CHyperCD ( )
{
}
/*----------------------------------
This function opens the HyperCD movie file for playback and display the first
frame. It requires the HyperCD movie file name and a pointer to the window to draw into
------------------------------                                          */
BOOL CHyperCD;; Open (CWnd *pWnd, Cstring Filename, Cstring Type)
{
        DWORD RetCode;
        MCI_ANIM_OPEN_PARMS OpenParms;
        MCI_ANIM_WINDOW_PARMS WindowParms;

// Close any device that is already open.
        if (mDeviceID) {
           Close ( );
        }
  // Open a device for playback.
  OpenParms.dwCallback = NULL;
  OpenParms.wDeviceID = O;
  OpenParms.lpstrDeviceType = Type;
  OpenParms.lpstrElementName = Filename.GetBuffer (1);
  OpenParms.lpstrAlias = "HyperCD";// can use an array of aliases
  OpenParms.dwStyle = WS_CHILD | WS_VISIBLE;
  OpenParms.hWndParent = pWnd->m_hWnd;
  DWORD flags= (DWORD) MCI_OPEN_ELEMENT | MCI_ANIM_OPEN_PARENT | MCI_ANIM_OPEN_WS;
  if (Type == "AVIVideo" || Type== "QTWVideo" || Type == "MPEGVideo")
```

```
        flags | = MCI_OPEN_TYPE if (RetCode=mciSendCommand (O,MCI_OPEN, flags, (DWORD) (LPVOID) & OpenParms) ) {
        mMCIErrorCode = RetCode;
        char szBuf [256];
        mciGetErrorString(RetCode,szBuf,256);
        char msg [200];
        strcpy(msg, "Error Opening :"); strcat(msg, Filename);
        MessageBox (NULL.szBuf,msg,MB_OK);
        return FALSE;
    }
    // The device was opened, get the device ID.
    mDeviceID = OpenParms.wDeviceID;
    WindowParms.dwCallback = NULL;
    WindowParms.hWnd = pWnd->m_Wnd;
    WindowParms.nCmdShow = SW_SHOW;
    WindowParms.lpstrText = (LPSTR) NULL;
    If (RetCode = mciSendCommand (mDeviceID, MCI_WINDOW, MCI_ANIM_WINDOW_HWND, (DWORD)
        (LPVOID) &WindowParms) ) {
            m(MCIErrorCode = RetCode;
            return FALSE;
    }
    mMovieWnd = WindowParms.hWnd;

mOpen = TRUE;
    return = TRUE;
}
/*-------------------------------------------------------------------------
        Stop any HyperCD movie, close any open device IDs.
---------------------------------------------------------------------------*/
void CHyperCD::Close (void)
{// Closing a device ID will stop the video playback.
        if (mDeviceID)
            mciSendCommand (mDeviceID, MCI_CLOSE, OL, NULL);

mOpen = FALSE;
        mPlaying = FALSE;}
void CHyperCD::Update ( )
{
        MCI_ANIM_UPDATE_PARMS UpdateParams;

UpdateParams.dwCallback = NULL;
        UpdateParams.hDC = :: GetDC(mMovieWnd);
        if (mDeviceID)
            mciSendCommand (mDeviceId, MCI_UPDATE, MCI_ANIM_UPDATE_HDC, (DWORD)
(LPVOID)&UpdataParms);

:: Release DC (mMovieWnd,UpdateParams.hDC);
        mOpen = FALSE;
        mPlaying = FALSE;
}
/*-------------------------------------------------------------------------
        Start the video playback.
        This function immediately returns control back to the program.
---------------------------------------------------------------------------*/
BOOL CHyperCD::Start (BOOL bLoop)
{
        DWORD RetCode, dwFlags = OL;
        MCI_ANIM_PLAY_PARMS PlayParms;

// Start playback using the MCI_PLAY command.
        PlayParms.dwCallback = NULL
        PlayParms.dwFrom = PlayParms.dwTo = O;
```

```
#ifdef WIN32
    if (bLoop) dwFlags = MCI_DGV_PLAY_REPEAT;
#endif
    if (RetCode = mciSendCommand (mDeviceID, MCI_PLAY, dwFlags, (DWORD) (LPVOID) & PlayParms) ) {
        mMCIErrorCode = RetCode;
        char szBuf [256];
        mciGetErrorString(RetCode,szBuf,256);
        mciSendCommand (mDeviceID, MCI_CLOSE, 0L, NULL);
        mOpen = FALSE
        return FALSE;
    }
mPlaying = TRUE;
    return TRUE;

BOOL CHyperCD::Realize (void)

// plugins must realize their palette as a background palette
    DWORD RetCode =
        mciSendCommand (mDeviceID, MCI_REALIZE, MCI_ANIM_REALIZE_BKGD, NULL);
    return RetCode;
}
/*--------------------------------------------------------------------------------
    Pause a video, different from close.
--------------------------------------------------------------------------------*/
BOOL CHyperCD::Stop (void)
{
    DWORD RetCode;

// Stop playback by sending the MCI_PAUSE command.
    if (RetCode = mciSendCommand (mDeviceID, MCI_PAUSE, 0L, NULL) ) {
        mMCIErrorCode = RetCode;
        mciSendCommand (mDeviceID, MCI_CLOSE, 0L, NULL);
        mOpen = FALSE
        return FALSE;
    }
mPlaying = FALSE;
return TRUE:
}
/*--------------------------------------------------------------------------------
Rewind the video to the beginning and display the first frame.
--------------------------------------------------------------------------------*/
BOOL CHyperCD::Rewind (void)
{
    DWORD RetCode;

// If the video is playing you must stop it first.
    if (mPlaying)
        if (!Stop ( ) )
            return FALSE;

// Use the MCI_SEEK command to return to the beginning of the file.
if (RetCode = mciSendCommand (mDeviceID, MCI_SEEK, MCI_SEEK_TO_START, (DWORD) (LPVOID)
NULL ) ) {
    mMCIErrorCode = RetCode;
    mciSendCommand (mDeviceID, MCI_CLOSE, 0L, NULL);
    mOpen = FALSE;
    return FALSE;
    }
return TRUE;
}
/*--------------------------------------------------------------------------------
Forward the video to the end and display the last frame.
```

```
BOOL CHyperCD :: Forward (void)

DWORD RetCode;
// If the video is playing you must stop it first.
if (mPlaying)
    if (!Stop( ) )
       return FALSE;

// Use the MCI_SEEK command to go to the end of the file.
if (RetCode = mciSendCommand (mDeviceID, MCI_SEEK, MCI_SEEK_TO_END, (DWORD) (LPVOID)
NULL)){
        mMCIErrorCode = RetCode;
        mciSendCommand (mDeviceID, MCI_CLOSE_OL, NULL);
        mOpen = FALSE;
        return FALSE;
        }
return TRUE;
}
/*-------------------------------------------------------------------------------
Forward the video by one frame.
-------------------------------------------------------------------------------*/
BOOL CHyperCD: : FrameForward (void)
{       DWORD RetCode;
        MCI_ANIM_STEP_PARMS StepParms;
        MCI_STATUS_PARMS StatusParms;
        DWORD Length, Position;

// If the video is playing you must stop it first.
        if (mPlaying)
           if (!Stop ( ) )
                return FALSE;
        // Determine the length in frames of the file.
        StatusParms.dwItem = MCI_STATUS_LENGTH;
        if (RetCode = mciSendCommand (mDeviceID, MCI_STATUS, MCI_STATUS_ITEM, (DWORD)
(LPVOID) &StatusParms) ) {
            mMCIErrorCode = RetCode;
            mciSendCommand (mDeviceID,  MCI_CLOSE, OL, NULL);
            return FALSE;}
        Length = StatusParms.dwReturn;

// Determine the current position of the file.
        StatusParms.dwItem = MCI_STATUS_POSITION;
        if (RetCode = mciSendCommand (mDeviceID, MCI_STATUS, MCI_STATUS_ITEM, (DWORD)
(LPVOID) &StatusParms) ) {
            mMCIError Code = RetCode;
            mciSendCommand (mDeviceID, MCI_CLOSE, OL, NULL);
            return FALSE;
        }
        Position = StatusParms.dwReturn;

// If we're already at the end return.
        if (Length = = Position)
            return TRUE;

// If not already at the end use MCI_STEP to move forward one frame.
        StepParms.dwFrames = 1L;
        if (RetCode = mciSendCommand (mDevice ID, MCI-STEP,  MCI_ANIM_STEP_FRAMES, (DWORD)
(LPVOID) &StepPharms)
{mMCIErrorCode = RetCode;
        mciSendCommand (mDevice ID, MCI_CLOSE, OL, NULL);
        mOpen = FALSE;
        return FALSE;} return TRUE;}
```

```
/*----------------     ---------------------------------    -----------------------
Step back the video by one frame.
----------------------------------------------------------------------------------*/
BOOL CHyperCD : : FrameBack (void)
{
        DWORD RetCode;
        MCI_ANIM_STEP_PARMS StepParms;

// If the video is playing you must stop it first.
        if (mPlaying)
                if (!Stop ( ) )
                    return FALSE;

// Use MCI-STEP to move back one frame.
        StepParms.dwFrames = 1L;
        if (RetCode = mciSendCommand (mDeviceID, MCI_STEP, MCI_ANIM_STEP_REVERSE, (DWORD)
(LPVOID) &StepParms){
                mMCIErrorCode = RetCode;
                mciSendCommand (mDeviceID, MCI_CLOSE, OL, NULL);
                mOpen = FALSE;
                return FALSE;
            }
return TRUE:

DWORD CHyperCD : : GetLength (void)

DWORD RetCode;
        // Make sure a device is open.
        if (!mDeviceID)
                return 0;

MCI_STATUS_PARMS StatusParms;
        // Determine the length in frames of the file.
        StatusParms.dwItem = MCI_STATUS_LENGTH;
        if (RetCode = mciSendCommand (mDeviceID, MCI_STATUS, MCI_STATUS_ITEM, (DWORD)
(LPVOID) &StatusParms) ) {
                mMCIErrorCode = RetCode;
                mciSendCommand (mDeviceID, MCI_CLOSE, OL, NULL);
                return FALSE;
            }
return (int) StatusPharms.dwReturn;
}
DWORD CHyperCD : : GetPosition (void)
{
        DWORD RetCode
        // Make sure a device is open.
        if (!mDeviceID)
                return O;

MCI_STATUS_PARMS StatusParms;
        // Determine the current position of the file.
        StatusParms.dwItem = MCI_STATUS_POSITION;
        if (RetCode = mciSendCommand (mDeviceID, MCI_STATUS, MCI_STATUS_ITEM, (DWORD)
(LPVOID) &StatusParms) )
                mMCIErrorCode – RetCode;
                mciSendCommand (mDeviceID, MCI_CLOSE, OL, NULL);
                return FALSE;}
return (int) StatusParms.dwReturn;}
int CHyperCD : : Get Width (void)
{// Make sure a device is open.
        if (!mDeviceID)
                return O;
        MCI_ANIM_RECT_PARMS RectParms;
```

```
//Use MCI_WHERE to get the video window rectangle.
mciSendCommand (mDeviceID, MCI_WHERE, (DWORD) MCI_ANIM_WHERE_SOURCE, (DWORD)
(LPVOID) &RectParms);
return (int) Rectparms.re.right;

int CHyperCD : : GetHeight (void)

// Make sure a device is open.
        if (!mDeviceID)
            return 0:

MCI_ANIM_RECT_PARMS RectParms;

// Use MCI_WHERE to get the video window rectangle.
mciSendCommand (mDeviceID, MCI_WHERE, (DWORD) MCI_ANIM_WHERE_SOURCE, (DWORD)
(LPVOID) & RectParms);

return (int) RectParms.rc.bottom;
}
CString CHyperCD : : GetErrorString (void)
{       static const char *Strings[ ] ={
        "Could not set the position for the video in the window.",}
        char ErrorBuffer[MAXERRORLENGTH];

// An error was generated from within the CHyperCD class.
if (mErrorCode == 1)
        return (CString) Strings [0];
// An error was generated from a MCI function call.
else if (mciGetErrorString (mMCIErrorCode, (LPSTR) ErrorBuffer, MAXERRORLENGTH) )
        return (CString) ErrorBuffer;
// There is no error.
else.
        return (CString) ("There is no error or the error is undefined.");
}
/*--------------------------------------------------------------------------
A private function that simply positions the video window in the
center of the parent window.
--------------------------------------------------------------------------*/
BOOL CHyperCD : : Center (void)
{
        DWORD RetCode;
        CRect BoundsRect, MovieRect, WindowRect;
        MCI_ANIM_RECT_PARMS RectParms;

// Use MCI_WHERE to get the video window rectangle.
        if (RetCode = mciSendCommand (mDeviceID, MCI_WHERE, (DWORD)
MCI_ANIM_WHERE_SOURCE, (DWORD) (LPVOID) RectParms) )
            return FALSE;

// Determine the parameters for the playback window.
        BoundsRect = RectParms.rc;
        MovieRect.left = 0;
        MovieRect.top = 0;
        MovieRect.right = MovieRect.left + BoundsRect.right;
        MovieRect.bottom = MovieRect.top + BoundsRect.bottom;

: : Get WindowRect (mMovieWnd,&WindowRect);
        // Move the playback window.
        MoveWindow (mMovieWnd, (WindowRect.Width( ) – MovieRect.Width( ) ) /2,
                        (Window.Rect.Height( ) – Movie Rect.Height( ) ) /2m
                        BoundsRect.right, BoundsRect.bottom, TRUE);

return TRUE;
}
```

```
/*----------------- -----------------------   -----------------------
        File:    NpWIN.cpp
------------------------------------------------------------------ */
include "windows.h"
include "npapi.h"
include "npupp.h"

#define DEBUG_PROC 0
#idef WIN 32
        #define NP_EXPORT
#else
        #define NP_EXPORT_export
endif static NPNetscapeFuncs* g_pNavigatorFuncs = NULL;

//      PLUGIN DLL entry points
//      These are the Windows specific DLL entry points,
//      not the "normal" ones are in NPSHELL.CPP
//      fills in the func table used by Navigator
//      to call entry points in plugin DLL.
//      Note that these entry points ensure that DS
//      is loaded by using the NP_LOADDS macro,
//      when compiling for Win 16

NPError WINAPI NI_EXPORT NP_GetEntryPoints (NPPluginFuncs* pFuncs)
{
        // trap a NULL ptr
        if (pFuncs = = NULL)
                return NPERR_INVALID_FUNCTABLE_ERROR // if the plugin's function table is smaller than the plugin expects,
        // then they are incompatible, and should return an error
        if (pFuncs->size < sizeof NPPluginFuncs)
        return NPERR_INVALID_FUNCTABLE_ERROR;

pFuncs->version        = (NP_VERSION_MAJOR << 8) | NP_VERSION_MINOR;
        pFuncs->newp           = NPP_New;
        pFuncs->destroy        = NPP_Destroy;
        pFuncs->setwindow      = NPP_SetWindow;
        pFuncs->newstream      = NPP_NewStream;
        pFuncs->destroystream  = NPP_DestroyStream;
        pFuncs->asfile         = NPP_StreamAsFile;
        pFuncs->.writeready    = NPP_WriteReady;
        pFuncs->write          = NPP_Write;
        pFuncs->print          = NPP_Print;
        pFuncs->event          = NULL;      // reserved return NPERR_NO_ERROR;
}
//      called immediately after the plugin DLL is loaded
NPError WINAPI NP-EXPORT NP_Initialize (NPNetscapeFuncs* pFuncs)
{
  // trap a NULL ptr
  if (pFuncs = = NULL)
     return NPERR_INVALID_FUNCTABLE_ERROR;

// save it for future reference
  g_pNavigatorFuncs = pFuncs;
```

```c
// if the plugin's major version is lower than the Navigator's,
// then they are incompatible, and should return an error
if (HIBYTE (pFuncs->version) > NP_VERSION_MAJOR)
    return NPERR_INCOMPATIBLE_VERSION_ERROR;

// if the Navigator's function table is smaller than the plugin expects,
//   then they are incompatible, and should return an error
if (pFuncs->size <sizeof NPNetscapeFuncs)
    return NPERR_INVALID_FUNCTABLE_ERROR;

if (DEBUG_PROC) MessageBox (NULL,"WINAPI NP_EXPORT NP_Initialize", "DEBUG_PROC", MB_OK;
return NPP_Initialize ( );
}
//      called immediately before the plugin DLL is unloaded
NPError WINAPI NP_EXPORT NP_Shutdown ( )
{
    if (DEBUG_PROC) MessageBox (NULL, "WINAPI NP_EXPORT NP_Shutdown", "DEBUG_PROC",
MB_OK);

NPP_Shutdown ( );
    g_pNavigatorFuncs = NULL;
    return NPERR_NO_ERROR;
}
//      NAVIGATOR Entry points
//      These entry points expect to be called from within the plugin. The
//      noteworthy assumption is that DS has already been set to point to the
//      plugins DLL data segment. Don't call these functions from outside
//      the plugin without ensuring DS is set to the DLLs data segment first,
//      typically using the NP_LOADDS macro
//
//      returns the major/minor version numbers of the Plugin API for the plugin
//      and the Navigator void NPN_Version (int* plugin_major, int* plugin_minor, int* netscape_major, int* netscape_minor)
{
        *plugin_major   =  NP_VERSION_MAJOR;
        *plugin_minor   =  NP_VERSION_MINOR;
        *netscape_major =  HIBYTE (g_pNavigatorFuncs->version);
        *netscape_minor =  LOBYTE (g_pNavigatorFuncs->version);
}
//      causes the specified URL to be fetched and streamed in
NPError NPN_GetURL (NPP instance, const char *url, const char *window)
{
    return g_pNavigatorFuncs->geturl (instance, url, window);
}
NPError NPN_PostURL (NPP instance, const char* url, const char* window, uint32 len, const char* buf, NPBool
file)
{
    return g_pNavigatorFuncs->posturl (instance, url, window, len, buf, file);
}
//      Requests that a number of bytes be provided on a stream. Typically
//      this would be used if a stream was in "pull" mode. An optional
//      position can be provided for streams which are seekable.

NPError NPN_RequestRead (NPStream* stream, NPByteRange* rangeList)
{
    return g_pNavigatorFuncs->requestread (stream, rangeList);
}
//      Creates a new stream of data from the plug-in to be interpreted
//      by Netscape in the current window.
NPError NPN_NewStream (NPP instance, NPMIMEType type, NPStream *stream)
{
```

```
    return g_pNavigatorFuncs->newstream (instance, type, stream);
}
//     Provides len bytes of data.
int32 NPN_Write (NPP instance, NPStream *stream,
        int32 len, void *buffer)

return g_pNavigatorFuncs->write (instance, stream, len, buffer);

//     Closes a stream object.
//     reason indicates why the stream was closed.
NPError NPN_DestroyStream (NPP instance, NPStream* stream, NPError reason)
{
    return g_pNavigatorFuncs->destroystream (instance, stream, reason);
}
//     Provides a text status message in the Netscape client user interface
void NPN_Status (NPP instance, const char *message);
{
    g_pNavigatorFuncs->status (instance, message);
}
//     returns the user agent string of Navigator, which contains version info
const char* NPN_UserAgent (NPP instance)
{
    return g_pNavigatorFuncs->uagent (instance);
}
//     allocates memory from the Navigator's memory space. Necessary so that
//     saved instance data may be freed by Navigator when exiting.
void* NPN_MemAlloc(uint32 size)
{
    return g_pNavigatorFuncs->memalloc(size);
}
//     reciprocal of MemAlloc( ) above
void NPN_MemFree (void* ptr)
{
    g_pNavigatorFuncs-> memfree(ptr);
}
//     private function to Netscape. do not use!
void NPN_ReloadPlugins (NPBool reloadPages)
{
    g_pNavigatorFuncs-> reloadplugins (reloadPages);
}
```

The following is the software code listing for the requesting end-user's computer for the embodiment of Fig. 12.
```
/*-----------------------------------------------------------------
- ----

File:
                            NpHcd.cpp

Functions:              Just the
MFC shell....

/*-----------------------------------------------------------------
- ----*/ include "stdafx.h"
include "nphcd.h"

#ifdef _DEBUG
#undef THIS_FILE
static char BASED_CODE THIS_FILE[] = __FILE__;
#endif
/////////////////////////////////////////////////////////////////
/ ////////
// CJunkApp BEGIN_MESSAGE_MAP(CHcdPluginApp, CWinApp)
                        //{{AFX_MSG_MAP(CJunkApp)
                                                        // NOTE
- the ClassWizard will add and remove mapping macros here.
                                                        //   DO
NOT EDIT what you see in these blocks of generated code!
                        //}}AFX_MSG_MAP
END_MESSAGE_MAP()
/////////////////////////////////////////////////////////////////
/ ////////
// CJunkApp construction CHcdPluginApp::CHcdPluginApp()
{
                        // TODO: add construction code here,
                        // Place all significant
initialization in InitInstance
}
/////////////////////////////////////////////////////////////////
/ ////////
// The one and only CHcdPluginApp object CHcdPluginApp theApp;
/*-----------------------------------------------------------------
//
```

```
//                                                              HyperKey
//
// The architecture of HyperKey allows for
// authorized and secure rendering of encrypted multimedia object
// from the protected web site.  The encrypted HyperKey media
object is protected
// by crippling the media.   Only authorized user can obtain
// trigger/keys from the server to unlock the HyperKey media.
//
-----------------------------------------------------------------
- --*/ ifndef _WIN32
define _WIN32
endif ifndef _NPAPI_H_
include "npapi.h"
#include "plgwnd.h"
#include "CHyperCD.h"
endif // mmio
include <mmsystem.h>
include <qtw.h> include <time.h>
include <string.h>
#include <io.h>
#include <fcntl.h>
#include <sys/stat.h>
//---------------------------------------------------------------
- -----------------
// NPP_Initialize:
//---------------------------------------------------------------
- -----------------
NPError NPP_Initialize(void)
{
                                DEBUG_TEST("NPP_Initialize")
    return NPERR_NO_ERROR;
}

//---------------------------------------------------------------
- -----------------
// NPP_Shutdown:
```

```
//----------------------------------------------------------------
- -----------------
void NPP_Shutdown(void)
{
                                DEBUG_TEST("NPP_Shutdown")
                                return;
}
//----------------------------------------------------------------
- -----------------
// NPP_New:
//----------------------------------------------------------------
- -----------------

NPError NP_LOADDS
NPP_New(NPMIMEType pluginType,
                NPP instance,
                uint16 mode,
                int16 argc,
                char* argn[],
                char* argv[],
                NPSavedData* saved)
{
                                DEBUG_TEST("NPP_New")

if (instance == NULL)
        return NPERR_INVALID_INSTANCE_ERROR;

instance->pdata = NPN_MemAlloc(sizeof(PluginInstance));
    PluginInstance* This = (PluginInstance*) instance->pdata;
    if (This != NULL)
    {
        This->window = NULL;
        This->cHypercd = new CHyperCD();

This->mode = mode;
                                                            This-
>bAutoStart = FALSE;
        This->bLoop = FALSE;
        strcpy( This->InformationField,"HyperCD");

int idx;
                                                            STRING
sSYSFILE;

strcpy(sSYSFILE,SYSFILE);
                                                            char
*p1,*p2;
                                                            STRING
szArg, szValue,cd_title;
                                                            for (
idx =0; idx<argc; idx++) {
```

```
                        strcpy(szArg, argn[idx]);
                        strcpy(szValue, argv[idx]);
                                                        //
Check web tags and set HyperKey flags
                        SetHyperKeyFlags(szArg, szValue);

if(bDemandHyperKey)
                        goto parsing_embed_tags;

for (
idx =0; idx<argc; idx++) {
                        strcpy(szArg, argn[idx]);
                        strcpy(szValue, argv[idx]);

ParseHyperKeyTags1(szArg,szValue);
                                                        } if(!bDemandHyperKey)
                        SysIO(sSYSFILE);
        for (idx =0; idx<argc; idx++)
                        {
                        strcpy(szArg, argn[idx]);
                        strcpy(szValue, argv[idx]);
                        ParseHyperKeyTags2(szArg,szValue);
                                                        }
parsing_embed_tags:
                        instance->pdata = This;
                                                        return
NPERR_NO_ERROR;
                        }
    else
        return NPERR_OUT_OF_MEMORY_ERROR;
}
```

```
static void UnSubclass(PluginInstance *This)
{
    WNDPROC     OldWndProc;
    WNDPROC*    lplpfn = This->window->GetSuperWndProcAddr();
                            DEBUG_TEST("UnSubclass")

if ( !*lplpfn )
    {
        ASSERT(0);
        return;
    }

// Set the original window procedure
    OldWndProc = (WNDPROC)::SetWindowLong( This->window->m_hWnd, GWL_WNDPROC, (LONG) *lplpfn );

// A subclassed window's procedure is always AfxWndProc.
    // If this is not TRUE, then it's not a subclassed window.
    if ( OldWndProc != AfxWndProc )
        ASSERT(0);
} static void KillHyperCDWindow(PluginInstance *This)
{
                            DEBUG_TEST("KillHyperCDWindow")

if (This->cHypercd) {
        This->cHypercd->Close();
        delete This->cHypercd;
        This->cHypercd = NULL;
    }

CleanUpHyperKey();
    UnSubclass(This);

if (This->window) {
        This->window->Detach();
        delete This->window;
        This->window = NULL;
    }
}

//-----------------------------------------------------------------
- -----------------
```

```
// NPP_Destroy:
//---------------------------------------------------------------
- -----------------
NPError NP_LOADDS
NPP_Destroy(NPP instance, NPSavedData** save)
{
                            if (instance == NULL)
        return NPERR_INVALID_INSTANCE_ERROR;

PluginInstance* This = (PluginInstance*) instance->pdata;

//
    // Note: If desired, call NP_MemAlloc to create a
    // NPSavedData structure containing any state information
    // that you want restored if this plugin instance is later
    // recreated.
    // if (This != NULL)
    {
                            KillHyperCDWindow(This);
        NPN_MemFree(instance->pdata);
    } return NPERR_NO_ERROR;
}

//---------------------------------------------------------------
- -----------------
// NPP_SetWindow:
//---------------------------------------------------------------
- -----------------
NPError NP_LOADDS
NPP_SetWindow(NPP instance, NPWindow* np_window)
{
                            DEBUG_TEST("NPP_SetWindow")

if (instance == NULL)
        return NPERR_INVALID_INSTANCE_ERROR;

PluginInstance* This = (PluginInstance*) instance->pdata;

//
    // Note: Before setting fWindow to point to the
    // new window, you may wish to compare the new window
    // info to the previous window (if any) to note window
    // size changes, etc.
```

```
    //
    if (!np_window)
        return NPERR_GENERIC_ERROR;

if (!instance)
        return  NPERR_INVALID_INSTANCE_ERROR;

if (!This)
        return NPERR_GENERIC_ERROR;

if (!np_window->window && !This->window) // spurious entry
        return NPERR_NO_ERROR;

if (!np_window->window && This->window)
    {   // window went away
        KillHyperCDWindow(This);
        return NPERR_NO_ERROR;
    }
    if (!This->window && np_window->window)
    {   // First time in -- no window created by plugin yet
        This->window = (CPluginWindow *) new CPluginWindow();
        if (!This->window->SubclassWindow((HWND)np_window->window))
        {
            MessageBox(NULL,"SubclassWindow
Failed","HyperCD",MB_OK);
            return NPERR_GENERIC_ERROR;
        }
        // Save This pointer in window class member variable..this lets the
        // window message handling have access to the data pointer easily
        This->window->StoreData(This);
    }

// resize or moved window (or newly created)
    This->window->InvalidateRect(NULL);
    This->window->UpdateWindow();
    return NPERR_NO_ERROR;
}

//-----------------------------------------------------------------------
// NPP_NewStream:
//-----------------------------------------------------------------------
NPError NP_LOADDS
NPP_NewStream(NPP instance,
                          NPMIMEType type,
                          NPStream *stream,
                          NPBool seekable,
                          uint16 *stype)
```

71

```
{
                            DEBUG_TEST("NPP_NewStream")

if (instance == NULL)
        return NPERR_INVALID_INSTANCE_ERROR;
    PluginInstance* This = (PluginInstance*) instance->pdata;

*stype = NP_ASFILE;

return NPERR_NO_ERROR;
} int32 STREAMBUFSIZE = 0X0FFFFFFF;   // If we are reading from a file
in NPAsFile
                                    // mode so we can take any size
stream in our
                                    // write call (since we ignore
it)
//-------------------------------------------------------------------
- -----------------
// NPP_WriteReady:
//-------------------------------------------------------------------
- -----------------
int32 NP_LOADDS
NPP_WriteReady(NPP instance, NPStream *stream)
{
                            DEBUG_TEST("NPP_WriteReady")

if (instance != NULL)
    {
        PluginInstance* This = (PluginInstance*) instance->pdata;
    }
    return STREAMBUFSIZE;   // Number of bytes ready to accept in
NPP_Write()
}

//-------------------------------------------------------------------
- -----------------
// NPP_Write:
//-------------------------------------------------------------------
- -----------------
int32 NP_LOADDS
NPP_Write(NPP instance, NPStream *stream, int32 offset, int32 len,
void *buffer)
{
```

```
                            DEBUG_TEST("NPP_Write")

if (instance != NULL)
    {
        PluginInstance* This = (PluginInstance*) instance->pdata;

} return len;             // The number of bytes accepted
}
//------------------------------------------------------------------
- ----------------
// NPP_DestroyStream:
//------------------------------------------------------------------
- ----------------
NPError NP_LOADDS
NPP_DestroyStream(NPP instance, NPStream *stream, NPError reason)
{
                            DEBUG_TEST("NPP_DestroyStream")

if (instance == NULL)
        return NPERR_INVALID_INSTANCE_ERROR;
    PluginInstance* This = (PluginInstance*) instance->pdata;

return NPERR_NO_ERROR;
}

//------------------------------------------------------------------
- ----------------
// NPP_StreamAsFile:
//------------------------------------------------------------------
- ----------------
void NP_LOADDS
NPP_StreamAsFile(NPP instance, NPStream *stream, const char*
szStream)
{
                            int
                            nTriggerIndex, nType;
                            char
                            szFile[MAX_STR],szMessage[MAX_STR];
                            char
                            szMsg[200];
                            char                    *pTemp,
szPath[MAX_STR];

DEBUG_TEST("NPP_StreamAsFile")
                            if (instance == NULL)
```

```c
                                                                return;
        PluginInstance* This = (PluginInstance*) instance->pdata;
        if (!This->cHypercd)
                                                                return;

// Obtain object/keys
                                ObtainKey(Object,   szStream);
                                if(bDemandHyperKey)
                                                                {
                                if(ObjectType(Object) == PGI_HYPERKEY)
// file in bDemandHyperKey
                                                                        {//
1. check we have permission
                                Permission =
PermissionFromWebtoUseHyperKey();
                                                                        //
if our right is lower than the permitted, return
                                if(Permission.right > User.right)
                                return;
                                                                        //
2. if we have permission, get the access path
strcpy(szPath,   GetAccessPath(Permission));
                                                                        //
3. retrieve the object   and wait
                                RetrieveHyperKeyObject(szPath);
                                        return;
                                        }
                                                                // B.
check if the streamed file is PGI_MEDIA
                                                                else if(
ObjectType(Object) == PGI_MEDIA) // jpeg, avi, encrypted media type
                                                                {
                                DisplayObject(Object   );
                                                                        }
                                                                else //
anything else under bDemandHyperKey, is not valid
                                return;
                                                                }
```

```
                                    else// for this version, return and
not process other command
                                                                return;
}

//------------------------------------------------------------------
- -----------------
// NPP_Print:
//------------------------------------------------------------------
- -----------------
void NP_LOADDS
NPP_Print(NPP instance, NPPrint* printInfo)
{
                                DEBUG_TEST("NPP_Print")

if(printInfo == NULL)    // trap invalid parm
        return;

if (instance != NULL)
    {
        PluginInstance* This = (PluginInstance*) instance->pdata;

if (printInfo->mode == NP_FULL)
        {
            //
            // Note: If your plugin would like to take over
            // printing completely when it is in full-screen mode,
            // set printInfo->pluginPrinted to TRUE and print your
            // plugin as you see fit.  If your plugin wants Netscape
            // to handle printing in this case, set printInfo-
>pluginPrinted
            // to FALSE (the default) and do nothing.  If you do
want
            // to handle printing yourself, printOne is true if the
            // print button (as opposed to the print menu) was
clicked.
            // On the Macintosh, platformPrint is a THPrint; on
Windows,
            // platformPrint is a structure (defined in npapi.h)
containing
            // the printer name, port, etc.
            //
            void* platformPrint = printInfo-
>print.fullPrint.platformPrint;
            NPBool printOne = printInfo->print.fullPrint.printOne;

printInfo->print.fullPrint.pluginPrinted = FALSE; // Do
the default
        }
        else    // If not fullscreen, we must be embedded
```

```
              {
                  //
                  // Note: If your plugin is embedded, or is full-screen
                  // but you returned false in pluginPrinted above,
NPP_Print
                  // will be called with mode == NP_EMBED.  The NPWindow
                  // in the printInfo gives the location and dimensions of
                  // the embedded plugin on the printed page.  On the
Macintosh,
                  // platformPrint is the printer port; on Windows,
platformPrint
                  // is the handle to the printing device context.
                  //
                  NPWindow* printWindow = &(printInfo-
>print.embedPrint.window);
                  void* platformPrint = printInfo-
>print.embedPrint.platformPrint;

}
         }
}

//---------------------------------------------------------------------
- -----------------
// NPP_HandleEvent:
// Mac-only.
//---------------------------------------------------------------------
- -----------------
int16 NPP_HandleEvent(NPP instance, void* event)
{
    NPBool eventHandled = FALSE;
    if (instance == NULL)
        return eventHandled;

PluginInstance* This = (PluginInstance*) instance->pdata;

//
    // Note: The "event" passed in is a Macintosh
    // EventRecord*.  The event.what field can be any of the
    // normal Mac event types, or one of the following additional
    // types defined in npapi.h: getFocusEvent, loseFocusEvent,
    // adjustCursorEvent.  The focus events inform your plugin
    // that it will become, or is no longer, the recepient of
    // key events.  If your plugin doesn't want to receive key
    // events, return false when passed at getFocusEvent.  The
    // adjustCursorEvent is passed repeatedly when the mouse is
    // over your plugin; if your plugin doesn't want to set the
    // cursor, return false.  Handle the standard Mac events as
    // normal.  The return value for all standard events is
currently
    // ignored except for the key event: for key events, only return
    // true if your plugin has handled that particular key event.
    //
```

```
    return eventHandled;
}

// stdafx.cpp : source file that includes just the standard includes
//                              HyperCD.pch will be the pre-compiled
header
//                              stdafx.obj will contain the pre-
compiled type information include "stdafx.h"

/*
 *  npapi.h $Revision: 1.57 $
 *  Netscape client plug-in API spec
 */ ifndef _NPAPI_H_
define _NPAPI_H_

/* XXX this needs to get out of here */
#if defined(__MWERKS__)
#ifndef XP_MAC
#define XP_MAC
#endif
endif /*
 *  Version constants
 */ define NP_VERSION_MAJOR 0
define NP_VERSION_MINOR 6

/*
 *  Basic types
 */ ifndef _UINT16
typedef unsigned short uint16;
#endif
#ifndef _UINT32
typedef unsigned long uint32;
#endif
#ifndef _INT16
typedef short int16;
#endif
#ifndef _INT32
typedef long int32;
```

```
endif ifndef FALSE
define FALSE (0)
#endif
#ifndef TRUE
#define TRUE (1)
#endif
#ifndef NULL
#define NULL (0L)
endif typedef unsigned char    NPBool;
typedef void*            NPEvent;
typedef int16            NPError;
typedef char*            NPMIMEType;

/*
 *  NPP is a plug-in's opaque instance handle
 */
typedef struct _NPP
{
    void*   pdata;              /* plug-in private data */
    void*   ndata;              /* netscape private data */
} NPP_t;

typedef NPP_t*   NPP;

typedef struct _NPStream
{
    void*       pdata;          /* plug-in private data */
    void*       ndata;          /* netscape private data */
    const char* url;
    uint32      end;
    uint32      lastmodified;
} NPStream;

typedef struct _NPByteRange
{
    int32                offset;             /* negative
offset means from the end */
    uint32               length;
    struct _NPByteRange* next;
} NPByteRange;

typedef struct _NPSavedData
{
    int32 len;
    void* buf;
} NPSavedData;
```

```
typedef struct _NPRect
{
    uint16  top;
    uint16  left;
    uint16  bottom;
    uint16  right;
} NPRect;

typedef struct _NPWindow
{
    void*   window;             /* platform specific window handle */
    uint32  x;                  /* position of top left corner relative to a netscape page */
    uint32  y;
    uint32  width;              /* maximum window size */
    uint32  height;
    NPRect  clipRect;           /* clipping rectangle in port coordinates */
} NPWindow;

typedef struct _NPFullPrint
{
    NPBool      pluginPrinted;  /* Set TRUE if plugin handled fullscreen printing */
    NPBool      printOne;       /* TRUE if plugin should print one copy to default printer */
    void*       platformPrint;  /* Platform-specific printing info */
} NPFullPrint;

typedef struct _NPEmbedPrint
{
    NPWindow    window;
    void*       platformPrint;  /* Platform-specific printing info */
} NPEmbedPrint;

typedef struct _NPPrint
{
    uint16          mode;       /* NP_FULL or NP_EMBED */
    union
    {
        NPFullPrint     fullPrint;   /* if mode is NP_FULL */
        NPEmbedPrint    embedPrint;  /* if mode is NP_EMBED */
    } print;
} NPPrint;
```

```
#ifdef XP_MAC

/*
 * Mac-specific structures and definitions.
 */ include <Quickdraw.h>
include <Events.h> typedef struct NP_Port
{
    CGrafPtr    port;       /* Grafport */
    int32       portx;      /* position inside the topmost
window */
    int32       porty;
} NP_Port;

/*
 * Non-standard event types that can be passed to HandleEvent
 */
#define getFocusEvent       (osEvt + 16)
#define loseFocusEvent      (osEvt + 17)
#define adjustCursorEvent   (osEvt + 18)

endif /* XP_MAC */ define NP_EMBED        1
define NP_FULL         2
define NP_BACKGROUND   3 define NP_NORMAL       1
define NP_SEEK         2
define NP_ASFILE       3 define NP_MAXREADY (((unsigned)(~0)<<1)>>1)

/*
 * Error and reason code definitions.
 */ define NP_NOERR  0
define NP_EINVAL 1
define NP_EABORT 2 define NPERR_BASE                      0
define NPERR_NO_ERROR                  (NPERR_BASE + 0)
#define NPERR_GENERIC_ERROR             (NPERR_BASE + 1)
#define NPERR_INVALID_INSTANCE_ERROR    (NPERR_BASE + 2)
```

```
#define NPERR_INVALID_FUNCTABLE_ERROR    (NPERR_BASE + 3)
#define NPERR_MODULE_LOAD_FAILED_ERROR   (NPERR_BASE + 4)
#define NPERR_OUT_OF_MEMORY_ERROR        (NPERR_BASE + 5)
#define NPERR_INVALID_PLUGIN_ERROR       (NPERR_BASE + 6)
#define NPERR_INVALID_PLUGIN_DIR_ERROR   (NPERR_BASE + 7)
#define NPERR_INCOMPATIBLE_VERSION_ERROR (NPERR_BASE + 8)

#define NPRES_BASE                       0
#define NPRES_NETWORK_ERR                (NPRES_BASE + 0)
#define NPRES_USER_BREAK                 (NPRES_BASE + 1)
#define NPRES_DONE                       (NPRES_BASE + 3)

/*
 * Function prototypes.
 * Functions beginning with 'NPP' are functions provided by the
plugin that Netscape will call.
 * Functions beginning with 'NPN' are functions provided by
Netscape that the plugin will call.
 */ if defined(_WINDOWS) && !defined(WIN32)
define NP_LOADDS  _loadds
#else
#define NP_LOADDS
endif ifdef __cplusplus
extern "C" {
#endif

NPError            NPP_Initialize(void);
void               NPP_Shutdown(void);
NPError   NP_LOADDS NPP_New(NPMIMEType pluginType, NPP instance,
uint16 mode, int16 argc, char* argn[], char* argv[], NPSavedData*
saved);
NPError   NP_LOADDS NPP_Destroy(NPP instance, NPSavedData** save);
NPError   NP_LOADDS NPP_SetWindow(NPP instance, NPWindow* window);
NPError   NP_LOADDS NPP_NewStream(NPP instance, NPMIMEType type,
NPStream* stream, NPBool seekable, uint16* stype);
NPError   NP_LOADDS NPP_DestroyStream(NPP instance, NPStream*
stream, NPError reason);
int32     NP_LOADDS NPP_WriteReady(NPP instance, NPStream*
stream);
int32     NP_LOADDS NPP_Write(NPP instance, NPStream* stream,
int32 offset, int32 len, void* buffer);
void      NP_LOADDS NPP_StreamAsFile(NPP instance, NPStream*
stream, const char* fname);
void      NP_LOADDS NPP_Print(NPP instance, NPPrint*
platformPrint);
int16              NPP_HandleEvent(NPP instance, void* event);
```

```
void        NPN_Version(int* plugin_major, int* plugin_minor, int*
netscape_major, int* netscape_minor);
NPError     NPN_GetURL(NPP instance, const char* url, const char*
window);
NPError     NPN_PostURL(NPP instance, const char* url, const char*
window, uint32 len, const char* buf, NPBool file);
NPError     NPN_RequestRead(NPStream* stream, NPByteRange*
rangeList);
NPError     NPN_NewStream(NPP instance, NPMIMEType type, NPStream*
stream);
int32       NPN_Write(NPP instance, NPStream* stream, int32 len,
void* buffer);
NPError     NPN_DestroyStream(NPP instance, NPStream* stream,
NPError reason);
void        NPN_Status(NPP instance, const char* message);
const char* NPN_UserAgent(NPP instance);
void*       NPN_MemAlloc(uint32 size);
void        NPN_MemFree(void* ptr);
uint32      NPN_MemFlush(uint32 size);
void
                        NPN_ReloadPlugins(NPBool reloadPages);

#ifdef __cplusplus
} /* end extern "C" */
endif endif /* _NPAPI_H_ */

/*
 * npupp.h $Revision: 1.24 $
 * function call mecahnics needed by platform specific glue code.
 */ ifndef _NPUPP_H_
define _NPUPP_H_ ifndef GENERATINGCFM
define GENERATINGCFM 0
endif ifndef _NPAPI_H_
include "npapi.h"
#endif

/*******************************************************************
 *********************
    plug-in function table macros
                                      for each function in and out
of the plugin API we define
                  typedef NPP_FooUPP
```

```
                                                     #define
NewNPP_FooProc
                                                     #define
CallNPP_FooProc
                                                         for
mac, define the UPP magic for PPC/68K calling
*********************************************************************
* ********************/

/* NPP_Initialize */ if GENERATINGCFM
typedef UniversalProcPtr NPP_InitializeUPP;

enum {
                           uppNPP_InitializeProcInfo =
kThinkCStackBased                                        |
STACK_ROUTINE_PARAMETER(1, SIZE_CODE(0))                 |
RESULT_SIZE(SIZE_CODE(0))
};
#define NewNPP_InitializeProc(FUNC)                             \
                              (NPP_InitializeUPP)
NewRoutineDescriptor((ProcPtr)(FUNC), uppNPP_InitializeProcInfo,
GetCurrentArchitecture())
#define CallNPP_InitializeProc(FUNC)                            \
                              (void)CallUniversalProc((UniversalProc
Ptr)(FUNC), uppNPP_InitializeProcInfo)

else typedef void (*NPP_InitializeUPP)(void);
define NewNPP_InitializeProc(FUNC)                             \
                              ((NPP_InitializeUPP) (FUNC))
#define CallNPP_InitializeProc(FUNC)                            \
                              (*(FUNC))()

#endif

/* NPP_Shutdown */ if GENERATINGCFM
typedef UniversalProcPtr NPP_ShutdownUPP;
```

83

```
enum {
                              uppNPP_ShutdownProcInfo =
kThinkCStackBased                                           |
STACK_ROUTINE_PARAMETER(1, SIZE_CODE(0))                    |
                                                            |
RESULT_SIZE(SIZE_CODE(0))
};

#define NewNPP_ShutdownProc(FUNC)                           \
                              (NPP_ShutdownUPP)
NewRoutineDescriptor((ProcPtr)(FUNC), uppNPP_ShutdownProcInfo,
GetCurrentArchitecture())
#define CallNPP_ShutdownProc(FUNC)                          \
                              (void)CallUniversalProc((UniversalProc
Ptr)(FUNC), uppNPP_ShutdownProcInfo)

else typedef void (*NPP_ShutdownUPP)(void);
define NewNPP_ShutdownProc(FUNC)                           \
                              ((NPP_ShutdownUPP) (FUNC))
#define CallNPP_ShutdownProc(FUNC)                          \
                              (*(FUNC))()

#endif

/* NPP_New */ if GENERATINGCFM
typedef UniversalProcPtr NPP_NewUPP;

enum {
                              uppNPP_NewProcInfo = kThinkCStackBased
                                                            |
STACK_ROUTINE_PARAMETER(1, SIZE_CODE(sizeof(NPMIMEType)))   |
                                                            |
STACK_ROUTINE_PARAMETER(2, SIZE_CODE(sizeof(NPP)))          |
                                                            |
STACK_ROUTINE_PARAMETER(3, SIZE_CODE(sizeof(uint16)))       |
                                                            |
STACK_ROUTINE_PARAMETER(4, SIZE_CODE(sizeof(int16)))        |
                                                            |
STACK_ROUTINE_PARAMETER(5, SIZE_CODE(sizeof(char **)))      |
                                                            |
STACK_ROUTINE_PARAMETER(6, SIZE_CODE(sizeof(char **)))      |
                                                            |
STACK_ROUTINE_PARAMETER(7, SIZE_CODE(sizeof(NPSavedData *)))
```

```
RESULT_SIZE(SIZE_CODE(sizeof(NPError)))
};

#define NewNPP_NewProc(FUNC)                                    \
                                (NPP_NewUPP)
NewRoutineDescriptor((ProcPtr)(FUNC), uppNPP_NewProcInfo,
GetCurrentArchitecture())
#define CallNPP_NewProc(FUNC, ARG1, ARG2, ARG3, ARG4, ARG5, ARG6,
ARG7) \

(NPError)CallUniversalProc((UniversalP
rocPtr)(FUNC), uppNPP_NewProcInfo, \

(ARG1), (ARG2), (ARG3), (ARG4), (ARG5), (ARG6), (ARG7))
else typedef NPError             (*NPP_NewUPP)(NPMIMEType pluginType,
NPP instance, uint16 mode, int16 argc, char* argn[], char* argv[],
NPSavedData* saved);
#define NewNPP_NewProc(FUNC)                                    \
                                ((NPP_NewUPP) (FUNC))
#define CallNPP_NewProc(FUNC, ARG1, ARG2, ARG3, ARG4, ARG5, ARG6,
ARG7)                                                           \
                                (*(FUNC))((ARG1), (ARG2), (ARG3),
(ARG4), (ARG5), (ARG6), (ARG7))

#endif

/* NPP_Destroy */ if GENERATINGCFM typedef UniversalProcPtr NPP_DestroyUPP;
enum {
                                uppNPP_DestroyProcInfo =
kThinkCStackBased
STACK_ROUTINE_PARAMETER(1, SIZE_CODE(sizeof(NPP)))
STACK_ROUTINE_PARAMETER(2, SIZE_CODE(sizeof(NPSavedData **)))
RESULT_SIZE(SIZE_CODE(sizeof(NPError)))
};
#define NewNPP_DestroyProc(FUNC)                                \
                                (NPP_DestroyUPP)
```

```
NewRoutineDescriptor((ProcPtr)(FUNC), uppNPP_DestroyProcInfo,
GetCurrentArchitecture())
#define CallNPP_DestroyProc(FUNC, ARG1, ARG2)                          \

(NPError)CallUniversalProc((UniversalP
rocPtr)(FUNC), uppNPP_DestroyProcInfo, (ARG1), (ARG2))
else typedef NPError             (*NPP_DestroyUPP)(NPP instance,
NPSavedData** save);
#define NewNPP_DestroyProc(FUNC)                                       \

((NPP_DestroyUPP) (FUNC))
#define CallNPP_DestroyProc(FUNC, ARG1, ARG2)                          \

(*(FUNC))((ARG1), (ARG2))

#endif

/* NPP_SetWindow */ if GENERATINGCFM typedef UniversalProcPtr NPP_SetWindowUPP;
enum {
                                uppNPP_SetWindowProcInfo =
kThinkCStackBased
                                                                       |
STACK_ROUTINE_PARAMETER(1, SIZE_CODE(sizeof(NPP)))
                                                                       |
STACK_ROUTINE_PARAMETER(2, SIZE_CODE(sizeof(NPWindow *)))
                                                                       |
RESULT_SIZE(SIZE_CODE(sizeof(NPError)))
};
#define NewNPP_SetWindowProc(FUNC)                                     \

(NPP_SetWindowUPP)
NewRoutineDescriptor((ProcPtr)(FUNC), uppNPP_SetWindowProcInfo,
GetCurrentArchitecture())
#define CallNPP_SetWindowProc(FUNC, ARG1, ARG2)                        \

(NPError)CallUniversalProc((UniversalP
rocPtr)(FUNC), uppNPP_SetWindowProcInfo, (ARG1), (ARG2))

else typedef NPError             (*NPP_SetWindowUPP)(NPP instance,
NPWindow* window);
#define NewNPP_SetWindowProc(FUNC)                                     \

((NPP_SetWindowUPP) (FUNC))
#define CallNPP_SetWindowProc(FUNC, ARG1, ARG2)                        \
```

```
                                                (*(FUNC))((ARG1), (ARG2))

#endif

/* NPP_NewStream */ if GENERATINGCFM typedef UniversalProcPtr NPP_NewStreamUPP;
enum {
                                        uppNPP_NewStreamProcInfo =
kThinkCStackBased
                                                                            |
STACK_ROUTINE_PARAMETER(1, SIZE_CODE(sizeof(NPP)))
                                                                            |
STACK_ROUTINE_PARAMETER(2, SIZE_CODE(sizeof(NPMIMEType)))
                                                                            |
STACK_ROUTINE_PARAMETER(3, SIZE_CODE(sizeof(NPStream *)))
                                                                            |
STACK_ROUTINE_PARAMETER(4, SIZE_CODE(sizeof(NPBool)))
                                                                            |
STACK_ROUTINE_PARAMETER(5, SIZE_CODE(sizeof(uint16 *)))
                                                                            |
RESULT_SIZE(SIZE_CODE(sizeof(NPError)))
};
#define NewNPP_NewStreamProc(FUNC)                                          \

(NPP_NewStreamUPP)
NewRoutineDescriptor((ProcPtr)(FUNC), uppNPP_NewStreamProcInfo,
GetCurrentArchitecture())
#define CallNPP_NewStreamProc(FUNC, ARG1, ARG2, ARG3, ARG4, ARG5)
                                                                            \

(NPError)CallUniversalProc((UniversalP
rocPtr)(FUNC), uppNPP_NewStreamProcInfo, (ARG1), (ARG2), (ARG3),
(ARG4), (ARG5))
else typedef NPError            (*NPP_NewStreamUPP)(NPP instance,
NPMIMEType type, NPStream* stream, NPBool seekable, uint16* stype);
#define NewNPP_NewStreamProc(FUNC)                                          \

((NPP_NewStreamUPP) (FUNC))
#define CallNPP_NewStreamProc(FUNC, ARG1, ARG2, ARG3, ARG4, ARG5) \

(*(FUNC))((ARG1), (ARG2), (ARG3),
(ARG4), (ARG5))
#endif

/* NPP_DestroyStream */
```

```
if GENERATINGCFM typedef UniversalProcPtr NPP_DestroyStreamUPP;
enum {
                            uppNPP_DestroyStreamProcInfo =
kThinkCStackBased
                                                                    |
STACK_ROUTINE_PARAMETER(1, SIZE_CODE(sizeof(NPP)))
                                                                    |
STACK_ROUTINE_PARAMETER(2, SIZE_CODE(sizeof(NPStream *)))
                                                                    |
STACK_ROUTINE_PARAMETER(3, SIZE_CODE(sizeof(NPError)))
                                                                    |
RESULT_SIZE(SIZE_CODE(sizeof(NPError)))
};
#define NewNPP_DestroyStreamProc(FUNC)                              \

(NPP_DestroyStreamUPP)
NewRoutineDescriptor((ProcPtr)(FUNC), uppNPP_DestroyStreamProcInfo,
GetCurrentArchitecture())
#define CallNPP_DestroyStreamProc(FUNC,   NPParg, NPStreamPtr,
NPErrorArg)                                                         \

(NPError)CallUniversalProc((UniversalP
rocPtr)(FUNC), uppNPP_DestroyStreamProcInfo, (NPParg),
(NPStreamPtr), (NPErrorArg))

else typedef NPError            (*NPP_DestroyStreamUPP)(NPP instance,
NPStream* stream, NPError reason);
#define NewNPP_DestroyStreamProc(FUNC)                              \

((NPP_DestroyStreamUPP) (FUNC))
#define CallNPP_DestroyStreamProc(FUNC,   NPParg, NPStreamPtr,
NPErrorArg)                                                         \

(*(FUNC))((NPParg), (NPStreamPtr),
(NPErrorArg))

#endif

/* NPP_WriteReady */ if GENERATINGCFM typedef UniversalProcPtr NPP_WriteReadyUPP;
enum {
                            uppNPP_WriteReadyProcInfo =
kThinkCStackBased
                                                                    |
STACK_ROUTINE_PARAMETER(1, SIZE_CODE(sizeof(NPP)))
```

```
          STACK_ROUTINE_PARAMETER(2, SIZE_CODE(sizeof(NPStream *)))

RESULT_SIZE(SIZE_CODE(sizeof(int32)))
   };
   #define NewNPP_WriteReadyProc(FUNC)                              \
                                    (NPP_WriteReadyUPP)
   NewRoutineDescriptor((ProcPtr)(FUNC), uppNPP_WriteReadyProcInfo,
   GetCurrentArchitecture())
   #define CallNPP_WriteReadyProc(FUNC,  NPParg, NPStreamPtr)       \
                                    (int32)CallUniversalProc((UniversalPro
   cPtr)(FUNC), uppNPP_WriteReadyProcInfo, (NPParg), (NPStreamPtr))

else typedef int32 (*NPP_WriteReadyUPP)(NPP instance, NPStream* stream);
   #define NewNPP_WriteReadyProc(FUNC)                              \
                                    ((NPP_WriteReadyUPP) (FUNC))
   #define CallNPP_WriteReadyProc(FUNC,  NPParg, NPStreamPtr)       \
                                    (*(FUNC))((NPParg), (NPStreamPtr))

#endif

/* NPP_Write */ if GENERATINGCFM typedef UniversalProcPtr NPP_WriteUPP;
   enum {
                                    uppNPP_WriteProcInfo =
   kThinkCStackBased
   STACK_ROUTINE_PARAMETER(1, SIZE_CODE(sizeof(NPP)))

STACK_ROUTINE_PARAMETER(2, SIZE_CODE(sizeof(NPStream *)))

STACK_ROUTINE_PARAMETER(3, SIZE_CODE(sizeof(int32)))

STACK_ROUTINE_PARAMETER(4, SIZE_CODE(sizeof(int32)))

STACK_ROUTINE_PARAMETER(5, SIZE_CODE(sizeof(void*)))

RESULT_SIZE(SIZE_CODE(sizeof(int32)))
   };
   #define NewNPP_WriteProc(FUNC)                                   \
                                    (NPP_WriteUPP)
   NewRoutineDescriptor((ProcPtr)(FUNC), uppNPP_WriteProcInfo,
   GetCurrentArchitecture())
```

```
#define CallNPP_WriteProc(FUNC, NPParg, NPStreamPtr, offsetArg,
lenArg, bufferPtr)                                              \
                                (int32)CallUniversalProc((UniversalPro
cPtr)(FUNC), uppNPP_WriteProcInfo, (NPParg), (NPStreamPtr),
(offsetArg), (lenArg), (bufferPtr))

else typedef int32 (*NPP_WriteUPP)(NPP instance, NPStream* stream, int32
offset, int32 len, void* buffer);
#define NewNPP_WriteProc(FUNC)                                  \
                                ((NPP_WriteUPP) (FUNC))
#define CallNPP_WriteProc(FUNC, NPParg, NPStreamPtr, offsetArg,
lenArg, bufferPtr)                                              \
                                (*(FUNC))((NPParg), (NPStreamPtr),
(offsetArg), (lenArg), (bufferPtr))

#endif

/* NPP_StreamAsFile */ if GENERATINGCFM typedef UniversalProcPtr NPP_StreamAsFileUPP;
enum {
                                uppNPP_StreamAsFileProcInfo =
kThinkCStackBased                                               |

STACK_ROUTINE_PARAMETER(1, SIZE_CODE(sizeof(NPP)))              |

STACK_ROUTINE_PARAMETER(2, SIZE_CODE(sizeof(NPStream *)))       |

STACK_ROUTINE_PARAMETER(3, SIZE_CODE(sizeof(const char *)))     |

RESULT_SIZE(SIZE_CODE(0))
};
#define NewNPP_StreamAsFileProc(FUNC)                           \
                                (NPP_StreamAsFileUPP)
NewRoutineDescriptor((ProcPtr)(FUNC), uppNPP_StreamAsFileProcInfo,
GetCurrentArchitecture())
#define CallNPP_StreamAsFileProc(FUNC, ARG1, ARG2, ARG3)        \
                                (void)CallUniversalProc((UniversalProc
Ptr)(FUNC), uppNPP_StreamAsFileProcInfo, (ARG1), (ARG2), (ARG3))

else typedef void (*NPP_StreamAsFileUPP)(NPP instance, NPStream* stream,
const char* fname);
```

```
#define NewNPP_StreamAsFileProc(FUNC)                               \
                                ((NPP_StreamAsFileUPP) (FUNC))
#define CallNPP_StreamAsFileProc(FUNC,  ARG1, ARG2, ARG3)           \
                                (*(FUNC))((ARG1), (ARG2), (ARG3))
endif /* NPP_Print */ if GENERATINGCFM typedef UniversalProcPtr NPP_PrintUPP;
enum {
                                uppNPP_PrintProcInfo =
kThinkCStackBased
                                                                    |
STACK_ROUTINE_PARAMETER(1, SIZE_CODE(sizeof(NPP)))
                                                                    |
STACK_ROUTINE_PARAMETER(2, SIZE_CODE(sizeof(NPPrint *)))
                                                                    |
RESULT_SIZE(SIZE_CODE(0))
};
#define NewNPP_PrintProc(FUNC)                                      \
                                (NPP_PrintUPP)
NewRoutineDescriptor((ProcPtr)(FUNC), uppNPP_PrintProcInfo,
GetCurrentArchitecture())
#define CallNPP_PrintProc(FUNC,  NPParg, voidPtr)                   \
                                (void)CallUniversalProc((UniversalProc
Ptr)(FUNC), uppNPP_PrintProcInfo, (NPParg), (voidPtr))

else typedef void (*NPP_PrintUPP)(NPP instance, NPPrint* platformPrint);
define NewNPP_PrintProc(FUNC)                                      \
                                ((NPP_PrintUPP) (FUNC))
#define CallNPP_PrintProc(FUNC,  NPParg, NPPrintArg)                \
                                (*(FUNC))((NPParg), (NPPrintArg))

#endif

/* NPP_HandleEvent */ if GENERATINGCFM typedef UniversalProcPtr NPP_HandleEventUPP;
enum {
```

```
                                    uppNPP_HandleEventProcInfo =
kThinkCStackBased                                                    |
STACK_ROUTINE_PARAMETER(1, SIZE_CODE(sizeof(NPP)))                   |
STACK_ROUTINE_PARAMETER(2, SIZE_CODE(sizeof(void *)))                |
RESULT_SIZE(SIZE_CODE(sizeof(int16)))
};
#define NewNPP_HandleEventProc(FUNC)                                 \
                                    (NPP_HandleEventUPP)
NewRoutineDescriptor((ProcPtr)(FUNC), uppNPP_HandleEventProcInfo,
GetCurrentArchitecture())
#define CallNPP_HandleEventProc(FUNC,  NPParg, voidPtr)              \
                                    (int16)CallUniversalProc((UniversalPro
cPtr)(FUNC), uppNPP_HandleEventProcInfo, (NPParg), (voidPtr))

else typedef int16 (*NPP_HandleEventUPP)(NPP instance, void* event);
define NewNPP_HandleEventProc(FUNC)                                 \
                                    ((NPP_HandleEventUPP) (FUNC))
#define CallNPP_HandleEventProc(FUNC,  NPParg, voidPtr)              \
                                    (*(FUNC))((NPParg), (voidPtr))

#endif

/*
 *  Netscape entry points
 */

/* NPN_GetUrl */ if GENERATINGCFM typedef UniversalProcPtr NPN_GetURLUPP;
enum {
                                    uppNPN_GetURLProcInfo =
kThinkCStackBased                                                    |
STACK_ROUTINE_PARAMETER(1, SIZE_CODE(sizeof(NPP)))                   |
STACK_ROUTINE_PARAMETER(2, SIZE_CODE(sizeof(const char*)))           |
STACK_ROUTINE_PARAMETER(3, SIZE_CODE(sizeof(const char*)))
```

```
RESULT_SIZE(SIZE_CODE(sizeof(NPError)))
};
#define NewNPN_GetURLProc(FUNC)                                          \
                                (NPN_GetURLUPP)
NewRoutineDescriptor((ProcPtr)(FUNC), uppNPN_GetURLProcInfo,
GetCurrentArchitecture())
#define CallNPN_GetURLProc(FUNC, ARG1, ARG2, ARG3)                       \
                                (NPError)CallUniversalProc((UniversalP
rocPtr)(FUNC), uppNPN_GetURLProcInfo, (ARG1), (ARG2), (ARG3))
else typedef NPError              (*NPN_GetURLUPP)(NPP instance, const
char* url, const char* window);
#define NewNPN_GetURLProc(FUNC)                                          \
                                ((NPN_GetURLUPP) (FUNC))
#define CallNPN_GetURLProc(FUNC, ARG1, ARG2, ARG3)                       \
                                (*(FUNC))((ARG1), (ARG2), (ARG3))
endif /* NPN_PostUrl */ if GENERATINGCFM typedef UniversalProcPtr NPN_PostURLUPP;
enum {
                                uppNPN_PostURLProcInfo =
kThinkCStackBased
STACK_ROUTINE_PARAMETER(1, SIZE_CODE(sizeof(NPP)))
STACK_ROUTINE_PARAMETER(2, SIZE_CODE(sizeof(const char*)))
STACK_ROUTINE_PARAMETER(3, SIZE_CODE(sizeof(const char*)))
STACK_ROUTINE_PARAMETER(4, SIZE_CODE(sizeof(uint32)))
STACK_ROUTINE_PARAMETER(5, SIZE_CODE(sizeof(const char*)))
STACK_ROUTINE_PARAMETER(6, SIZE_CODE(sizeof(NPBool)))
RESULT_SIZE(SIZE_CODE(sizeof(NPError)))
};
#define NewNPN_PostURLProc(FUNC)                                         \
                                (NPN_PostURLUPP)
NewRoutineDescriptor((ProcPtr)(FUNC), uppNPN_PostURLProcInfo,
GetCurrentArchitecture())
```

```
#define CallNPN_PostURLProc(FUNC, ARG1, ARG2, ARG3, ARG4, ARG5,
ARG6) \
                                (NPError)CallUniversalProc((UniversalP
rocPtr)(FUNC), uppNPN_PostURLProcInfo, (ARG1), (ARG2), (ARG3),
(ARG4), (ARG5), (ARG6))
else typedef NPError (*NPN_PostURLUPP)(NPP instance, const char* url,
const char* window, uint32 len, const char* buf, NPBool file);
#define NewNPN_PostURLProc(FUNC)                                    \
                                ((NPN_PostURLUPP) (FUNC))
#define CallNPN_PostURLProc(FUNC, ARG1, ARG2, ARG3, ARG4, ARG5,
ARG6) \
                                (*(FUNC))((ARG1), (ARG2), (ARG3),
(ARG4), (ARG5), (ARG6))
endif /* NPN_RequestRead */ if GENERATINGCFM typedef UniversalProcPtr NPN_RequestReadUPP;
enum {
                                uppNPN_RequestReadProcInfo =
kThinkCStackBased                                               |
STACK_ROUTINE_PARAMETER(1, SIZE_CODE(sizeof(NPStream *)))       |
STACK_ROUTINE_PARAMETER(2, SIZE_CODE(sizeof(NPByteRange *)))    |
RESULT_SIZE(SIZE_CODE(sizeof(NPError)))
};
#define NewNPN_RequestReadProc(FUNC)                                \
                                (NPN_RequestReadUPP)
NewRoutineDescriptor((ProcPtr)(FUNC), uppNPN_RequestReadProcInfo,
GetCurrentArchitecture())
#define CallNPN_RequestReadProc(FUNC, stream, range)                \
                                (NPError)CallUniversalProc((UniversalP
rocPtr)(FUNC), uppNPN_RequestReadProcInfo, (stream), (range))

else typedef NPError              (*NPN_RequestReadUPP)(NPStream*
stream, NPByteRange* rangeList);
#define NewNPN_RequestReadProc(FUNC)                                \
                                ((NPN_RequestReadUPP) (FUNC))
#define CallNPN_RequestReadProc(FUNC, stream, range)                \
```

94

```
                                    (*(FUNC))((stream), (range))

#endif

/* NPN_NewStream */ if GENERATINGCFM typedef UniversalProcPtr NPN_NewStreamUPP;
enum {
                                    uppNPN_NewStreamProcInfo =
kThinkCStackBased STACK_ROUTINE_PARAMETER(1, SIZE_CODE(sizeof(NPP )))

STACK_ROUTINE_PARAMETER(2, SIZE_CODE(sizeof(NPMIMEType)))

STACK_ROUTINE_PARAMETER(3, SIZE_CODE(sizeof(NPStream *)))

STACK_ROUTINE_PARAMETER(4, SIZE_CODE(sizeof(NPBool)))

STACK_ROUTINE_PARAMETER(5, SIZE_CODE(sizeof(uint16*)))

RESULT_SIZE(SIZE_CODE(sizeof(NPError)))
};
#define NewNPN_NewStreamProc(FUNC)                                         \
                                    (NPN_NewStreamUPP)
NewRoutineDescriptor((ProcPtr)(FUNC), uppNPN_NewStreamProcInfo,
GetCurrentArchitecture())
#define CallNPN_NewStreamProc(FUNC, npp, type, stream)                     \
                                    (NPError)CallUniversalProc((UniversalP
rocPtr)(FUNC), uppNPN_NewStreamProcInfo, (npp), (type), (stream))

else typedef NPError             (*NPN_NewStreamUPP)(NPP instance,
NPMIMEType type, NPStream* stream);
#define NewNPN_NewStreamProc(FUNC)                                         \
                                    ((NPN_NewStreamUPP) (FUNC))
#define CallNPN_NewStreamProc(FUNC, npp, type, stream)                     \
                                    (*(FUNC))((npp), (type), (stream))

#endif

/* NPN_Write */
```

```
if GENERATINGCFM typedef UniversalProcPtr NPN_WriteUPP;
enum {
                                    uppNPN_WriteProcInfo =
kThinkCStackBased                                                       |
STACK_ROUTINE_PARAMETER(1, SIZE_CODE(sizeof(NPP )))                     |
STACK_ROUTINE_PARAMETER(2, SIZE_CODE(sizeof(NPStream *)))               |
STACK_ROUTINE_PARAMETER(3, SIZE_CODE(sizeof(int32)))                    |
STACK_ROUTINE_PARAMETER(4, SIZE_CODE(sizeof(void*)))                    |
RESULT_SIZE(SIZE_CODE(sizeof(int32)))
};
#define NewNPN_WriteProc(FUNC)                                         \
                                    (NPN_WriteUPP)
NewRoutineDescriptor((ProcPtr)(FUNC), uppNPN_WriteProcInfo,
GetCurrentArchitecture())
#define CallNPN_WriteProc(FUNC, npp, stream, len, buffer)              \
                                    (int32)CallUniversalProc((UniversalPro
cPtr)(FUNC), uppNPN_WriteProcInfo, (npp), (stream), (len), (buffer))

else typedef int32 (*NPN_WriteUPP)(NPP instance, NPStream* stream, int32
len, void* buffer);                                                    \
#define NewNPN_WriteProc(FUNC)
                                    ((NPN_WriteUPP) (FUNC))
#define CallNPN_WriteProc(FUNC, npp, stream, len, buffer)              \
                                    (*(FUNC))((npp), (stream), (len),
(buffer))

#endif

/* NPN_DestroyStream */ if GENERATINGCFM typedef UniversalProcPtr NPN_DestroyStreamUPP;
enum {
                                    uppNPN_DestroyStreamProcInfo =
kThinkCStackBased                                                       |
STACK_ROUTINE_PARAMETER(1, SIZE_CODE(sizeof(NPP )))
```

```
        STACK_ROUTINE_PARAMETER(2, SIZE_CODE(sizeof(NPStream *)))

STACK_ROUTINE_PARAMETER(3, SIZE_CODE(sizeof(NPError)))

RESULT_SIZE(SIZE_CODE(sizeof(NPError)))
};
#define NewNPN_DestroyStreamProc(FUNC)                              \
                            (NPN_DestroyStreamUPP)
NewRoutineDescriptor((ProcPtr)(FUNC), uppNPN_DestroyStreamProcInfo,
GetCurrentArchitecture())
#define CallNPN_DestroyStreamProc(FUNC, npp, stream, err)           \
                            (NPError)CallUniversalProc((UniversalP
rocPtr)(FUNC), uppNPN_DestroyStreamProcInfo, (npp), (stream), (err))

else typedef NPError (*NPN_DestroyStreamUPP)(NPP instance, NPStream*
stream, NPError reason);
#define NewNPN_DestroyStreamProc(FUNC)                              \
                            ((NPN_DestroyStreamUPP) (FUNC))
#define CallNPN_DestroyStreamProc(FUNC, npp, stream, err)           \
                            (*(FUNC))((npp), (stream), (err))

#endif

/* NPN_Status */ if GENERATINGCFM typedef UniversalProcPtr NPN_StatusUPP;
enum {
                            uppNPN_StatusProcInfo =
kThinkCStackBased
        STACK_ROUTINE_PARAMETER(1, SIZE_CODE(sizeof(NPP)))

STACK_ROUTINE_PARAMETER(2, SIZE_CODE(sizeof(char *)))
};

#define NewNPN_StatusProc(FUNC)                                     \
                            (NPN_StatusUPP)
NewRoutineDescriptor((ProcPtr)(FUNC), uppNPN_StatusProcInfo,
GetCurrentArchitecture())
#define CallNPN_StatusProc(FUNC, npp, msg)                          \
```

97

```
                                (void)CallUniversalProc((UniversalProc
Ptr)(FUNC), uppNPN_StatusProcInfo, (npp), (msg))

else typedef void (*NPN_StatusUPP)(NPP instance, const char* message);
define NewNPN_StatusProc(FUNC)                                        \
                        ((NPN_StatusUPP) (FUNC))
#define CallNPN_StatusProc(FUNC, npp, msg)                             \
                        (*(FUNC))((npp), (msg))

#endif

/* NPN_UserAgent */
if GENERATINGCFM typedef UniversalProcPtr NPN_UserAgentUPP;
enum {
        uppNPN_UserAgentProcInfo = kThinkCStackBased
                | STACK_ROUTINE_PARAMETER(1, SIZE_CODE(sizeof(NPP)))
                | RESULT_SIZE(SIZE_CODE(sizeof(const char *)))
};

#define NewNPN_UserAgentProc(FUNC)                      \
                (NPN_UserAgentUPP)
NewRoutineDescriptor((ProcPtr)(FUNC), uppNPN_UserAgentProcInfo,
GetCurrentArchitecture())
#define CallNPN_UserAgentProc(FUNC, ARG1)               \
                (const
char*)CallUniversalProc((UniversalProcPtr)(FUNC),
uppNPN_UserAgentProcInfo, (ARG1))

else typedef const char*     (*NPN_UserAgentUPP)(NPP instance);
define NewNPN_UserAgentProc(FUNC)                      \
                ((NPN_UserAgentUPP) (FUNC))
#define CallNPN_UserAgentProc(FUNC, ARG1)               \
                (*(FUNC))((ARG1))

#endif

/* NPN_MemAlloc */
if GENERATINGCFM typedef UniversalProcPtr NPN_MemAllocUPP;
enum {
                                uppNPN_MemAllocProcInfo =
kThinkCStackBased
```

```
                                STACK_ROUTINE_PARAMETER(1, SIZE_CODE(sizeof(uint32)))       |
                                                                                            |
RESULT_SIZE(SIZE_CODE(sizeof(void *)))
};

#define NewNPN_MemAllocProc(FUNC)                                                           \
                                (NPN_MemAllocUPP)
NewRoutineDescriptor((ProcPtr)(FUNC), uppNPN_MemAllocProcInfo,
GetCurrentArchitecture())
#define CallNPN_MemAllocProc(FUNC, ARG1)                                                    \
                                (void*)CallUniversalProc((UniversalPro
cPtr)(FUNC), uppNPN_MemAllocProcInfo, (ARG1))

else typedef void* (*NPN_MemAllocUPP)(uint32 size);
define NewNPN_MemAllocProc(FUNC)                                                           \
                                ((NPN_MemAllocUPP) (FUNC))
#define CallNPN_MemAllocProc(FUNC, ARG1)                                                    \
                                (*(FUNC))((ARG1))

#endif

/* NPN__MemFree */ if GENERATINGCFM typedef UniversalProcPtr NPN_MemFreeUPP;
enum {
                                uppNPN_MemFreeProcInfo =
kThinkCStackBased                                                                           |
STACK_ROUTINE_PARAMETER(1, SIZE_CODE(sizeof(void *)))
};

#define NewNPN_MemFreeProc(FUNC)                                                            \
                                (NPN_MemFreeUPP)
NewRoutineDescriptor((ProcPtr)(FUNC), uppNPN_MemFreeProcInfo,
GetCurrentArchitecture())
#define CallNPN_MemFreeProc(FUNC, ARG1)                                                     \
                                (void)CallUniversalProc((UniversalProc
Ptr)(FUNC), uppNPN_MemFreeProcInfo, (ARG1))

else typedef void (*NPN_MemFreeUPP)(void* ptr);
```

```
#define NewNPN_MemFreeProc(FUNC)                                        \
                                ((NPN_MemFreeUPP) (FUNC))
#define CallNPN_MemFreeProc(FUNC, ARG1)                                 \
                                (*(FUNC))((ARG1))

#endif

/* NPN_MemFlush */ if GENERATINGCFM typedef UniversalProcPtr NPN_MemFlushUPP;
enum {
                                uppNPN_MemFlushProcInfo =
kThinkCStackBased
                                                                        |
STACK_ROUTINE_PARAMETER(1, SIZE_CODE(sizeof(uint32)))
                                                                        |
RESULT_SIZE(SIZE_CODE(sizeof(uint32)))
};

#define NewNPN_MemFlushProc(FUNC)                                       \
                                (NPN_MemFlushUPP)
NewRoutineDescriptor((ProcPtr)(FUNC), uppNPN_MemFlushProcInfo,
GetCurrentArchitecture())
#define CallNPN_MemFlushProc(FUNC, ARG1)                                \
                                (uint32)CallUniversalProc((UniversalPr
ocPtr)(FUNC), uppNPN_MemFlushProcInfo, (ARG1))

else typedef uint32 (*NPN_MemFlushUPP)(uint32 size);
define NewNPN_MemFlushProc(FUNC)                                       \
                                ((NPN_MemFlushUPP) (FUNC))
#define CallNPN_MemFlushProc(FUNC, ARG1)                                \
                                (*(FUNC))((ARG1))

#endif

/* NPN_ReloadPlugins */ if GENERATINGCFM typedef UniversalProcPtr NPN_ReloadPluginsUPP;
enum {
```

100

```
                           uppNPN_ReloadPluginsProcInfo =
kThinkCStackBased

STACK_ROUTINE_PARAMETER(1, SIZE_CODE(sizeof(NPBool)))

RESULT_SIZE(SIZE_CODE(0))
};

#define NewNPN_ReloadPluginsProc(FUNC)                              \

(NPN_ReloadPluginsUPP)
NewRoutineDescriptor((ProcPtr)(FUNC), uppNPN_ReloadPluginsProcInfo,
GetCurrentArchitecture())
#define CallNPN_ReloadPluginsProc(FUNC, ARG1)                       \

(void)CallUniversalProc((UniversalProc
Ptr)(FUNC), uppNPN_ReloadPluginsProcInfo, (ARG1))

else typedef void (*NPN_ReloadPluginsUPP)(NPBool reloadPages);
define NewNPN_ReloadPluginsProc(FUNC)                              \

((NPN_ReloadPluginsUPP) (FUNC))
#define CallNPN_ReloadPluginsProc(FUNC, ARG1)                       \

(*(FUNC))((ARG1))

#endif

/***********************************************************************
* *********************
 * The actual plugin function table definitions

***********************************************************************
* *********************/ typedef struct _NPPluginFuncs {
                            uint16 size;
                            uint16 version;
    NPP_NewUPP newp;
    NPP_DestroyUPP destroy;
    NPP_SetWindowUPP setwindow;
    NPP_NewStreamUPP newstream;
    NPP_DestroyStreamUPP destroystream;
                            NPP_StreamAsFileUPP asfile;
    NPP_WriteReadyUPP writeready;
    NPP_WriteUPP write;
    NPP_PrintUPP print;
    NPP_HandleEventUPP event;
} NPPluginFuncs;
```

101

```
typedef struct _NPNetscapeFuncs {
                            uint16 size;
                            uint16 version;
    NPN_GetURLUPP geturl;
    NPN_PostURLUPP posturl;
    NPN_RequestReadUPP requestread;
    NPN_NewStreamUPP newstream;
    NPN_WriteUPP write;
    NPN_DestroyStreamUPP destroystream;
    NPN_StatusUPP status;
    NPN_UserAgentUPP uagent;
                            NPN_MemAllocUPP memalloc;
                            NPN_MemFreeUPP memfree;
                            NPN_MemFlushUPP memflush;
                            NPN_ReloadPluginsUPP reloadplugins;
} NPNetscapeFuncs;

#ifdef XP_MAC
/***************************************************************
* *********************
* Mac platform-specific plugin glue stuff

****************************************************************
* *********************/

/*
* Main entry point of the plugin.
* This routine will be called when the plugin is loaded. The function
* tables are passed in and the plugin fills in the NPPluginFuncs table
* and NPPShutdownUPP for Netscape's use.
*/ if GENERATINGCFM typedef UniversalProcPtr NPP_MainEntryUPP;
enum {
                            uppNPP_MainEntryProcInfo =
kThinkCStackBased
STACK_ROUTINE_PARAMETER(1, SIZE_CODE(sizeof(NPNetscapeFuncs*)))
STACK_ROUTINE_PARAMETER(2, SIZE_CODE(sizeof(NPPluginFuncs*)))
STACK_ROUTINE_PARAMETER(3, SIZE_CODE(sizeof(NPP_ShutdownUPP*)))
RESULT_SIZE(SIZE_CODE(sizeof(NPError)))
};
#define NewNPP_MainEntryProc(FUNC)                                    \
```

```
                                (NPP_MainEntryUPP)
NewRoutineDescriptor((ProcPtr)(FUNC), uppNPP_MainEntryProcInfo,
GetCurrentArchitecture())
#define CallNPP_MainEntryProc(FUNC, netscapeFunc, pluginFunc,
shutdownUPP)                                                        \
                                    CallUniversalProc((UniversalProcPtr)(F
UNC), (ProcInfoType)uppNPP_MainEntryProcInfo, (netscapeFunc),
(pluginFunc), (shutdownUPP))

else typedef NPError (*NPP_MainEntryUPP)(NPNetscapeFuncs*,
NPPluginFuncs*, NPP_ShutdownUPP*);
#define NewNPP_MainEntryProc(FUNC)                                  \
                                ((NPP_MainEntryUPP) (FUNC))
#define CallNPP_MainEntryProc(FUNC, netscapeFunc, pluginFunc,
shutdownUPP)                                                        \
                                (*(FUNC))((netscapeFunc),
(pluginFunc), (shutdownUPP))

#endif
endif /* MAC */ ifdef _WINDOWS ifdef __cplusplus
extern "C" {
#endif

/* plugin meta member functions */

NPError WINAPI NP_GetEntryPoints(NPPluginFuncs* pFuncs);

NPError WINAPI NP_Initialize(NPNetscapeFuncs* pFuncs);

NPError WINAPI NP_Shutdown();

#ifdef __cplusplus
}
endif endif /* _WINDOWS */ endif /* _NPUPP_H_ */
//-----------------------------------------------------------------
- ----
//
```

```
//                                                        File:
                                CHyperCD.h
//
                                Functions:
                                HyperCD movie playing routines
//
//-----------------------------------------------------------------
- ----

// HyperCD Error Codes
#define AEC_POSITIONFAIL       1

// CHyperCD class
class CHyperCD
{

// Construction
public:
                                CHyperCD ();
                                ~CHyperCD ();

// Attributes
public:
                                BOOL                         mOpen;
                                BOOL
                                mPlaying;
                                mMovieWnd;
    HWND
    BOOL                        mDisableRButtonDown;

private:
                                UINT
                                mDeviceID;
                                int
                                mErrorCode;
                                DWORD
                                mMCIErrorCode;

// Operations
public:
    BOOL                        Realize (void);
                                BOOL                         Open
(CWnd *, CString, CString);
                                void                         Close
(void);
    void                        Update(void);
                                BOOL                         Start
(BOOL bLoop);
                                BOOL                         SurePlay
(BOOL bLoop);
                                BOOL                         Stop
(void);
                                BOOL                         Rewind
(void);
```

```
                    BOOL             Forward
(void);
                    BOOL
                    FrameForward (void);
                    BOOL
                    FrameBack (void);
                    int
                    GetWidth (void);
                    int
                    GetHeight (void);
                    DWORD
                    GetLength (void);
                    DWORD
                    GetPosition (void);
                    DWORD            GetSpeed
(void);
                    CString GetErrorString (void);
                    BOOL             Center
(void);
                    BOOL             Full
(void);
                    BOOL
                    InstallXioModule(void);
                    BOOL
                    RemoveXioModule(void);
                    void
                    GetFile(char* pszFile);
private:
};

#ifndef __PLGWND_H__
define __PLGWND_H__ include "npapi.h"
include "stdafx.h"
////////////////////////////////////////////////////////////////////////
/ //////// define ID_VIDEO_PLAY          1000
define ID_VIDEO_STOP          1001
#define ID_VIDEO_REWIND        1002
#define ID_VIDEO_FORWARD       1003
#define ID_VIDEO_FRAME_BACK    1004
define ID_VIDEO_FRAME_FORWARD 1005 class CPluginWindow;
class CHyperCD;

//
// Instance state information about the plugin.
//
```

```
// *Note*:                                              Use this
struct to hold per-instance
//              information that you'll need in the
//              various functions in this file.
//
typedef struct _PluginInstance {
    CPluginWindow *window;              // platform specific
window handle:
    CHyperCD * cHypercd;
                                                        //
see the NPWindow structure in
    BOOL bAutoStart;
                                                        //
                        NPAPI.H for the shell window
structure
    BOOL bLoop;
    char InformationField[128];
    uint16 mode;
    uint16      fMode;
} PluginInstance;

// CPluginWindow:
//
class CPluginWindow : public CWnd
{
protected:
    PluginInstance * m_data;
    CWnd * m_videoWnd;
public:
                        CPluginWindow();
    void StoreData(PluginInstance *);
    virtual WNDPROC* GetSuperWndProcAddr();

//{{AFX_MSG( CMainWindow )
                        afx_msg void OnPaint();
                        afx_msg void OnPaletteChanged(CWnd*
pWnd);
                        afx_msg void OnLButtonDown(UINT flags,
CPoint point);
    afx_msg void OnRButtonDown(UINT flags, CPoint point);
    afx_msg void OnPlay();
    afx_msg void OnStop();
    afx_msg void OnRewind();
    afx_msg void OnForward();
    afx_msg void OnFrameBack();
    afx_msg void OnFrameForward();
                        //}}AFX_MSG

DECLARE_MESSAGE_MAP()
};

#endif
// stdafx.h : include file for standard system include files,
```

```
//   or project specific include files that are used frequently, but
//       are changed infrequently
// include <afxwin.h>         // MFC core and standard components
include <afxext.h>            // MFC extensions
#include <afxole.h>            // MFC OLE classes
#include <afxodlgs.h>          // MFC OLE dialog classes
#include <afxdisp.h>           // MFC OLE automation classes
#include <afxdb.h>             // MFC database classes
```

COPYRIGHT - 1997 PLANET GRAPHICS

What we claim is:

1. A method of transmitting video and/or graphic data files over the Internet or Intranet from a Web site, comprising:
   (a) encrypting the video and/or graphic data and storing it at a Web site associated with a server;
   (b) encrypting a video player and storing it at the Web site;
   (c) downloading the encrypted video and/or graphic data and encrypted video player of said steps (a) and (b) to a requesting computer via the Internet or Intranet;
   (d) prior to said step (c), requesting the downloading of said encrypted video and/or graphic data and encrypted video player by the requesting computer;
   (e) decrypting the video and/or graphic data and video player at the requesting computer; and
   (f) playing back the decrypted video and/or graphic data via the decrypted video player.

2. A method of playing encrypted video and/or graphic data transmitted over the Internet or Intranet from a Web site, comprising:
   (a) requesting by an end user's computer the downloading of encrypted video and/or graphic data and an encrypted video player from a Web site of the Internet or Intranet;
   (b) receiving the requested encrypted video and/or graphic data and an encrypted video player from the Web site of the Internet or Intranet;
   (c) decrypting the encrypted video and/or graphic data and encrypted video player at the requesting computer; and
   (f) playing back the decrypted video and/or graphic data via the decrypted video player at the end user's computer.

3. A method of preventing unauthorized use of video and/or graphic data, comprising:
   (a) encrypting the video and/or graphic data;
   (b) encrypting a video player;
   (c) storing at least one of the encrypted video and encrypted player of said steps (a) and (b) at a Web site of the Internet or Intranet;
   (d) downloading at least one of the encrypted video and encrypted video player of said steps (a) and (b) to a requesting computer via the Internet or Intranet;
   (e) decrypting the encrypted video and/or graphic data and encrypted video player at the requesting computer; and
   (f) playing the decrypted video and/or graphic at the requesting computer via the decrypted player.

4. The method of preventing unauthorized use of video and/or graphic data according to claim 3, wherein said step (c) comprises storing both the encrypted video and encrypted player of said steps (a) and (b) at the Web site of the Internet or Intranet.

5. The method of preventing unauthorized use of video and/or graphic data according to claim 3, wherein said step (c) comprises storing the encrypted player of said step (b) at the Web site of the Internet or Intranet, said step (d) comprising transmitting the encrypted player to the requesting computer.

6. The method of preventing unauthorized use of video and/or graphic data, according to claim 5, wherein said step (a) comprises storing the encrypted video files at a requesting end-user's computer.

7. The method of preventing unauthorized use of video and/or graphic data, according to claim 3, wherein said step (c) comprises storing the encrypted video and/or graphic data of said step (a) at the Web site of the Internet or Intranet, said step (d) comprising transmitting the encrypted video and/or graphic data to the requesting computer.

8. The method of preventing unauthorized use of video and/or graphic data, according to claim 7, wherein said step (b) comprises storing the encrypted player at a requesting end-user's computer.

* * * * *